United States Patent
Aritake et al.

[11] Patent Number: 5,872,590
[45] Date of Patent: Feb. 16, 1999

[54] IMAGE DISPLAY APPARATUS AND METHOD FOR ALLOWING STEREOSCOPIC VIDEO IMAGE TO BE OBSERVED

[75] Inventors: Hirokazu Aritake; Manabu Ishimoto; Junji Tomita; Satoshi Maeda; Takahiro Matsuda; Satoshi Iwata; Masato Nakashima, all of Kawasaki, Japan

[73] Assignee: Fujitsu Ltd., Kawasaki, Japan

[21] Appl. No.: 832,781

[22] Filed: Apr. 4, 1997

[30] Foreign Application Priority Data

Nov. 11, 1996 [JP] Japan .................................. 8-298524

[51] Int. Cl.⁶ .................................................. H04N 13/04
[52] U.S. Cl. .................................................. 348/57; 348/54
[58] Field of Search ........................... 348/51, 54, 55, 348/56, 57; 359/462, 464, 465; H04N 13/04

[56] References Cited

U.S. PATENT DOCUMENTS

| | | | |
|---|---|---|---|
| 5,568,314 | 10/1996 | Omori | 348/51 |
| 5,742,332 | 4/1998 | Imai | 348/51 |
| 5,771,121 | 6/1998 | Hentschke | 348/51 |
| 5,774,261 | 6/1998 | Omori | 348/51 |

Primary Examiner—Howard Britton
Attorney, Agent, or Firm—Staas & Halsey

[57] ABSTRACT

A position of an observer in a stereoscopic observing region is detected by a position detecting unit. A right-eye image and a left-eye image which are seen from the detecting position are formed by an image forming unit and displayed on a display. By setting an aperture position of a projection optical system, the right-eye image is projected to the right-eye position of the observer and the left-eye image is projected to the left-eye position, thereby allowing a stereoscopic image to be observed. Further, an aperture is set so as to project the right-eye image or left-eye image to a position different from the detecting position of the observer, thereby allowing a same image to be seen to both eyes of another observer and allowing a two-dimensional image to be observed.

27 Claims, 57 Drawing Sheets

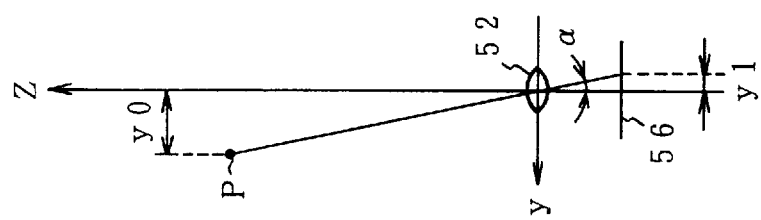
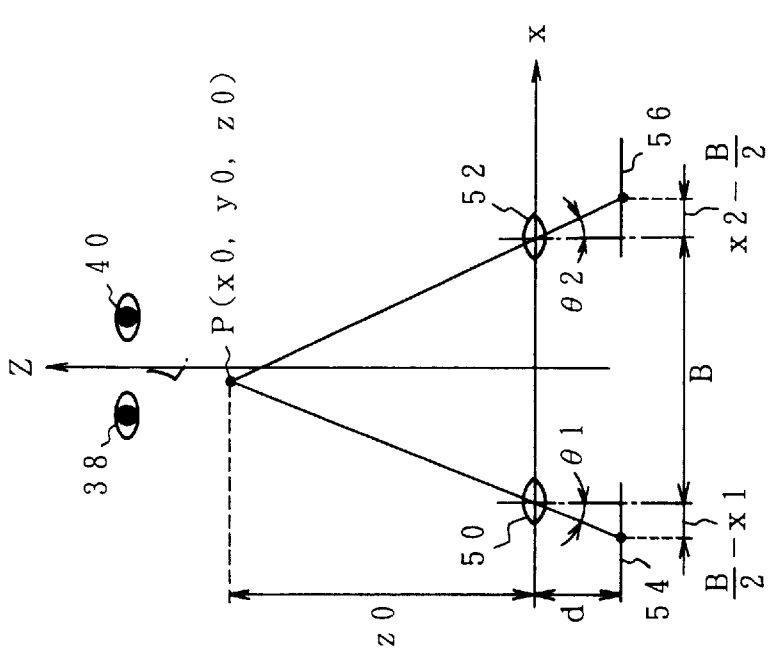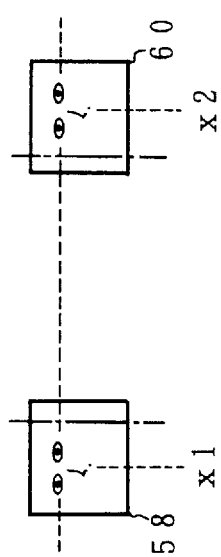
FIG.10C
FIG.10A
FIG.10B 82-1　　　　　84　　　　　82-2
IMAGE　　INTERPOLATION　IMAGE
　　　　　　IMAGE

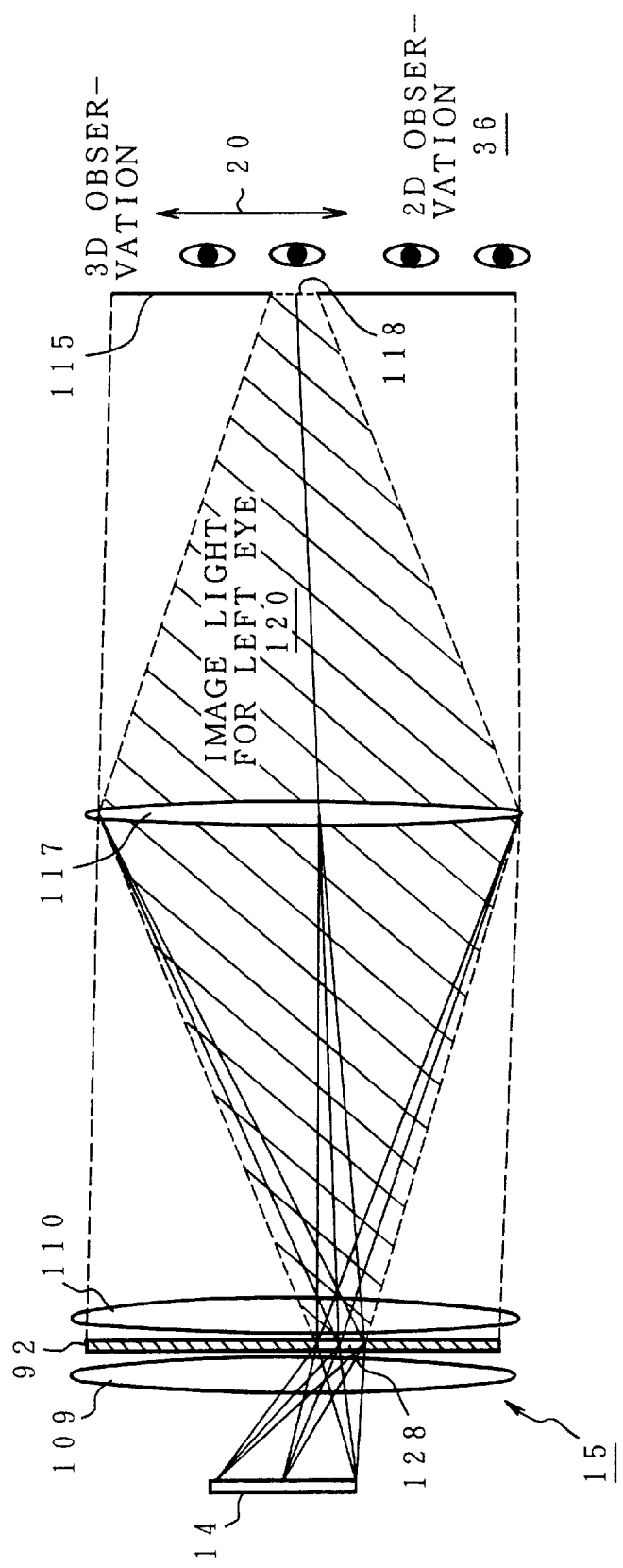

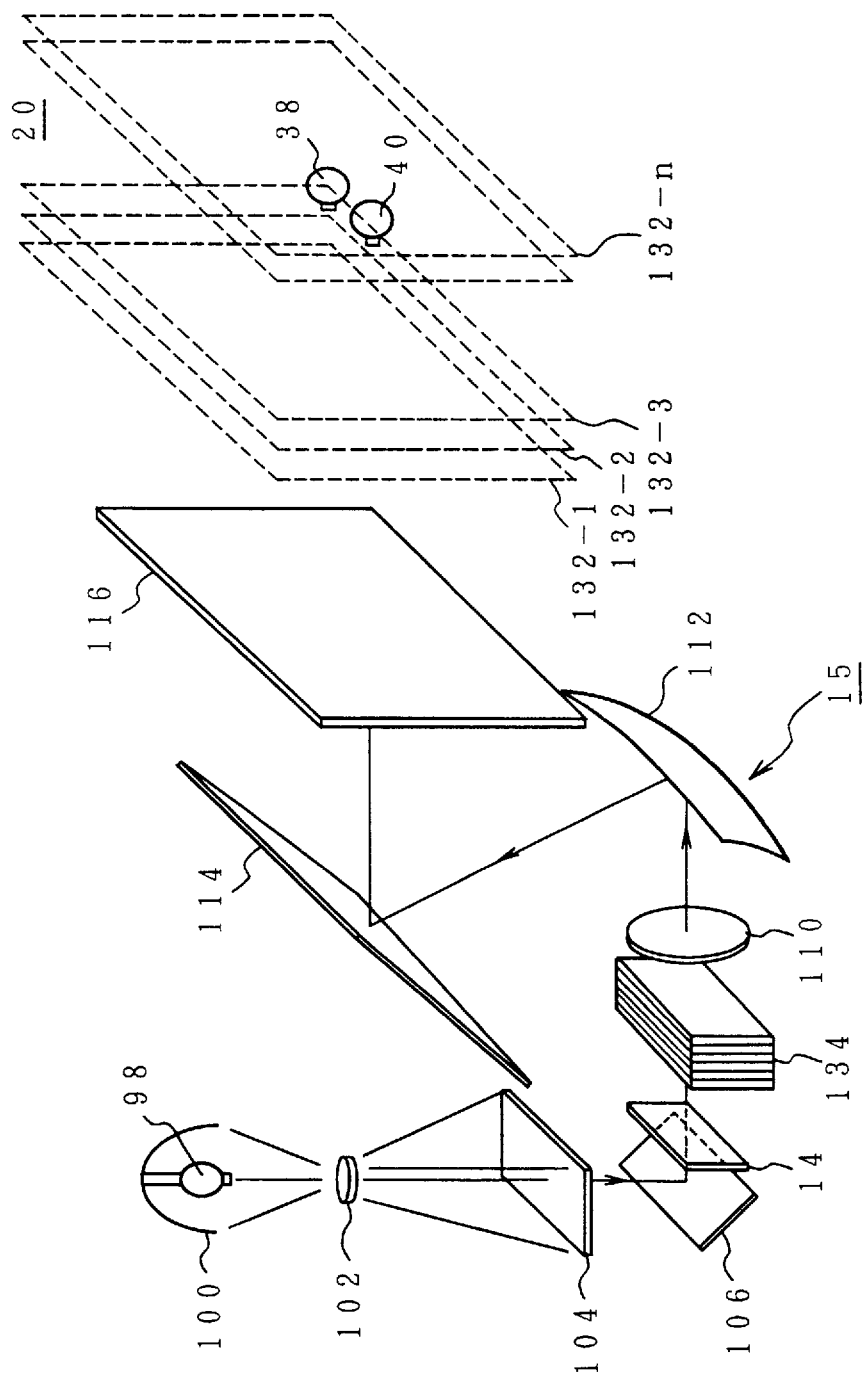

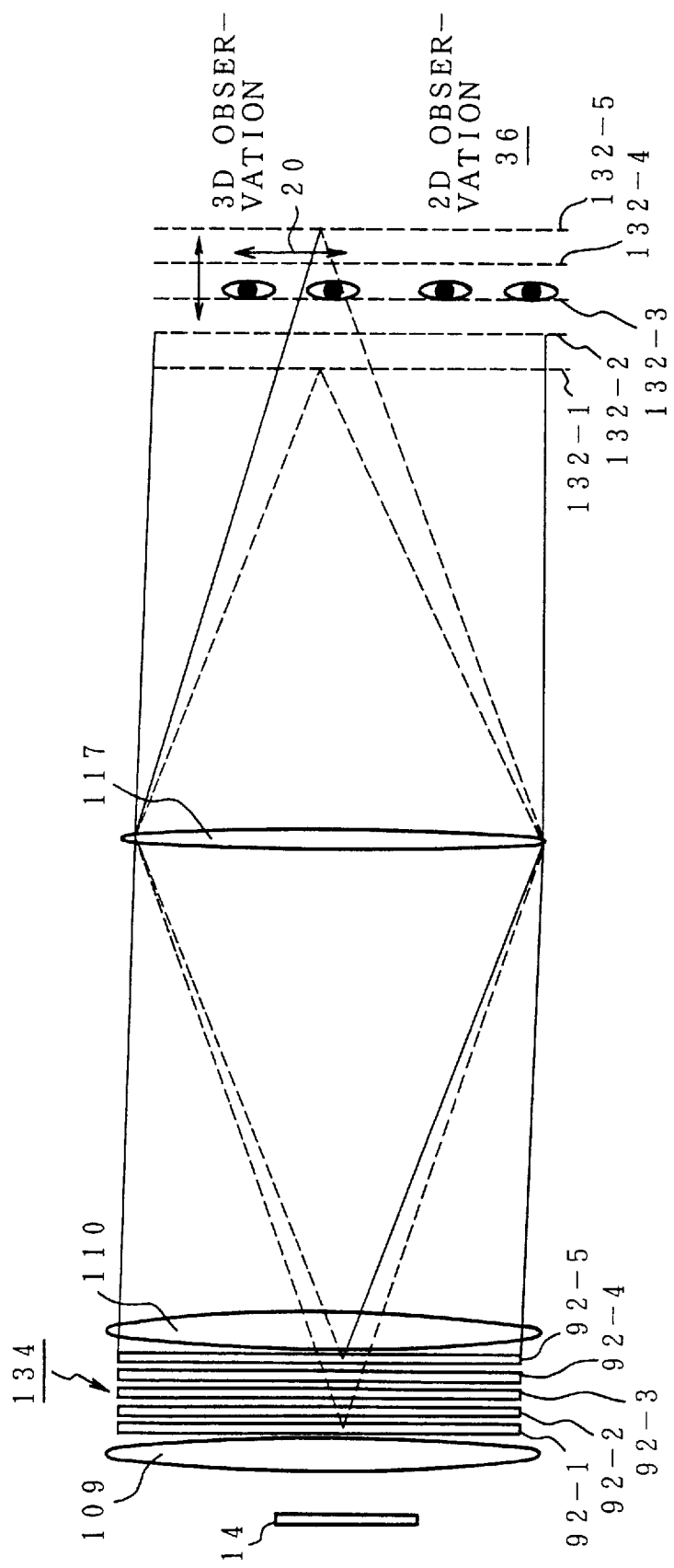

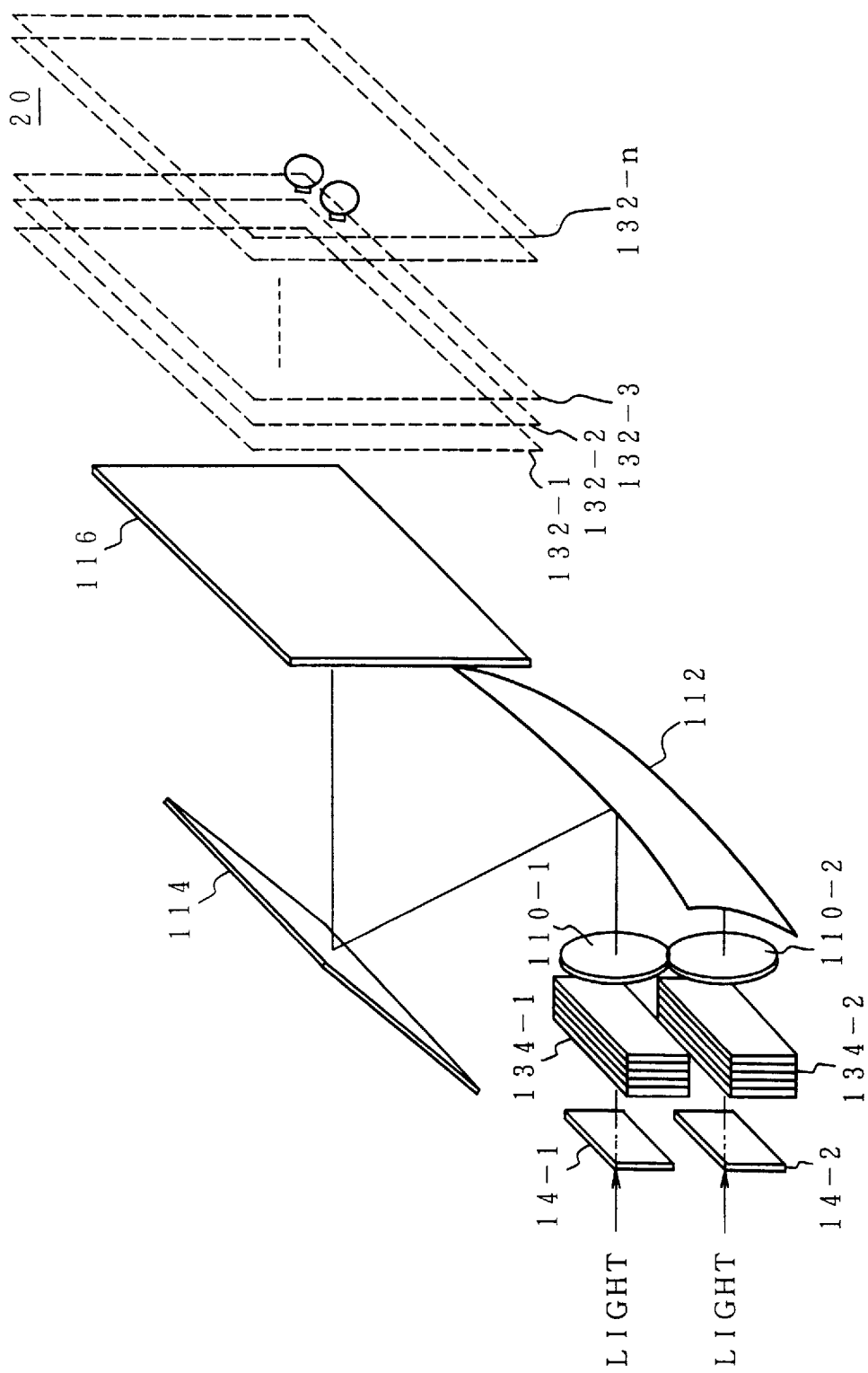

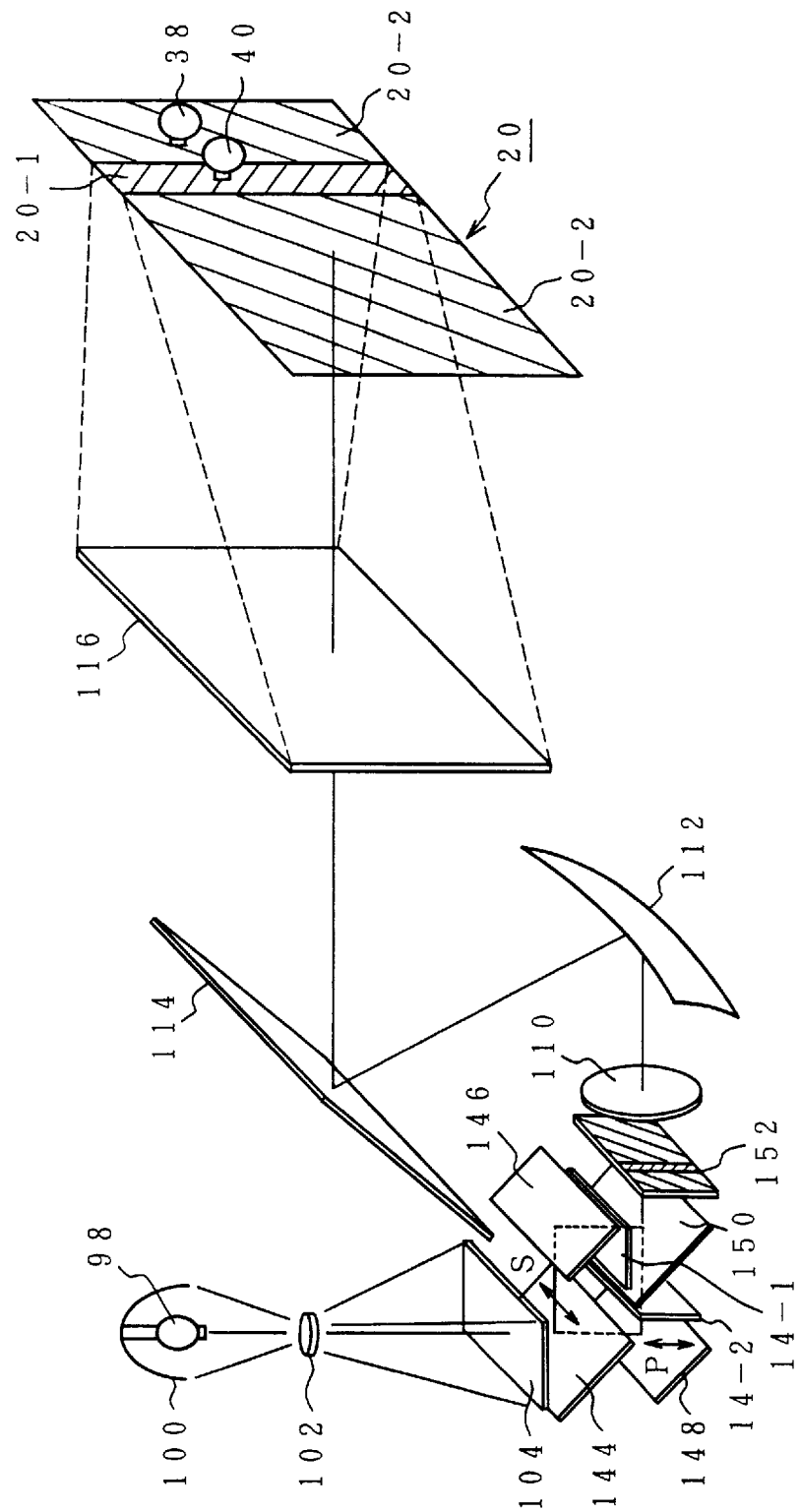

F I G. 5 0
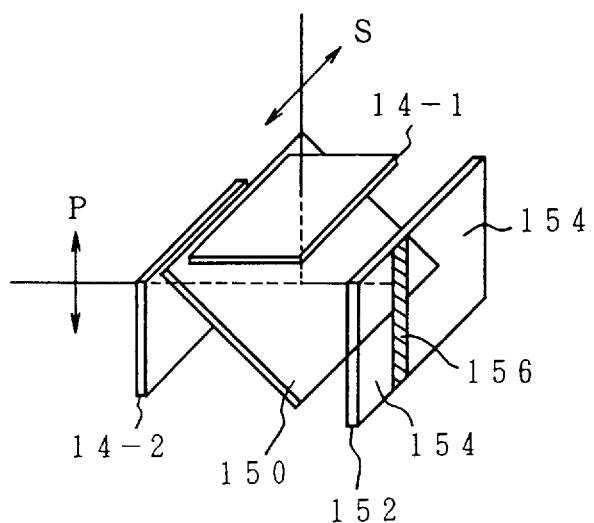

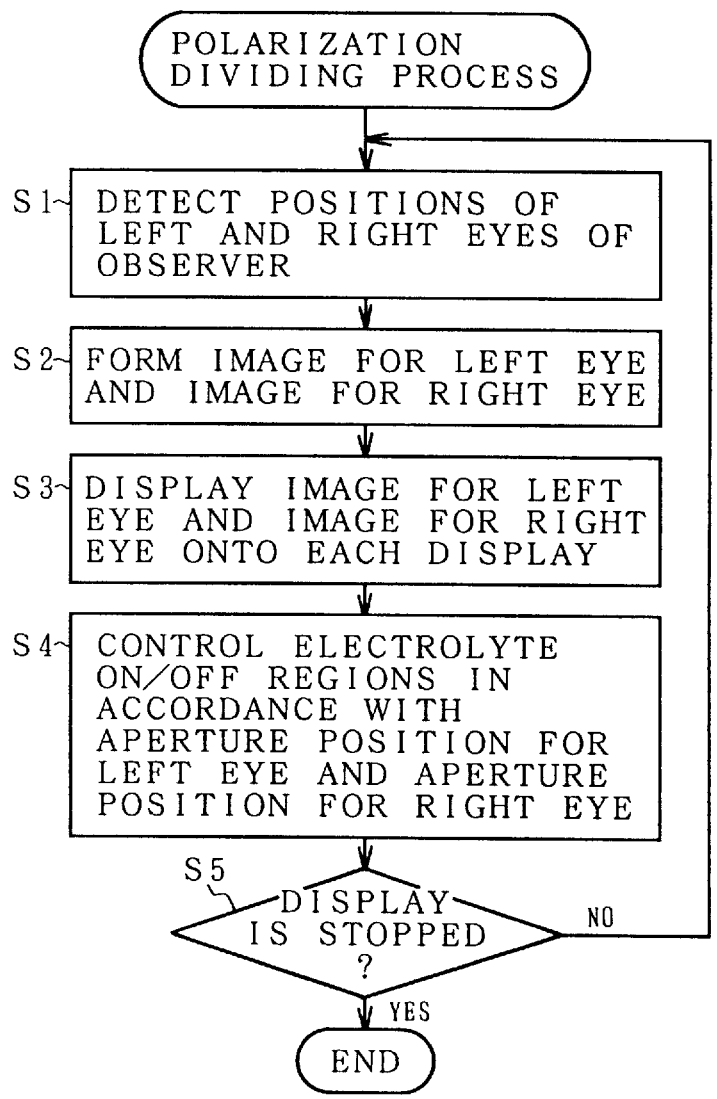

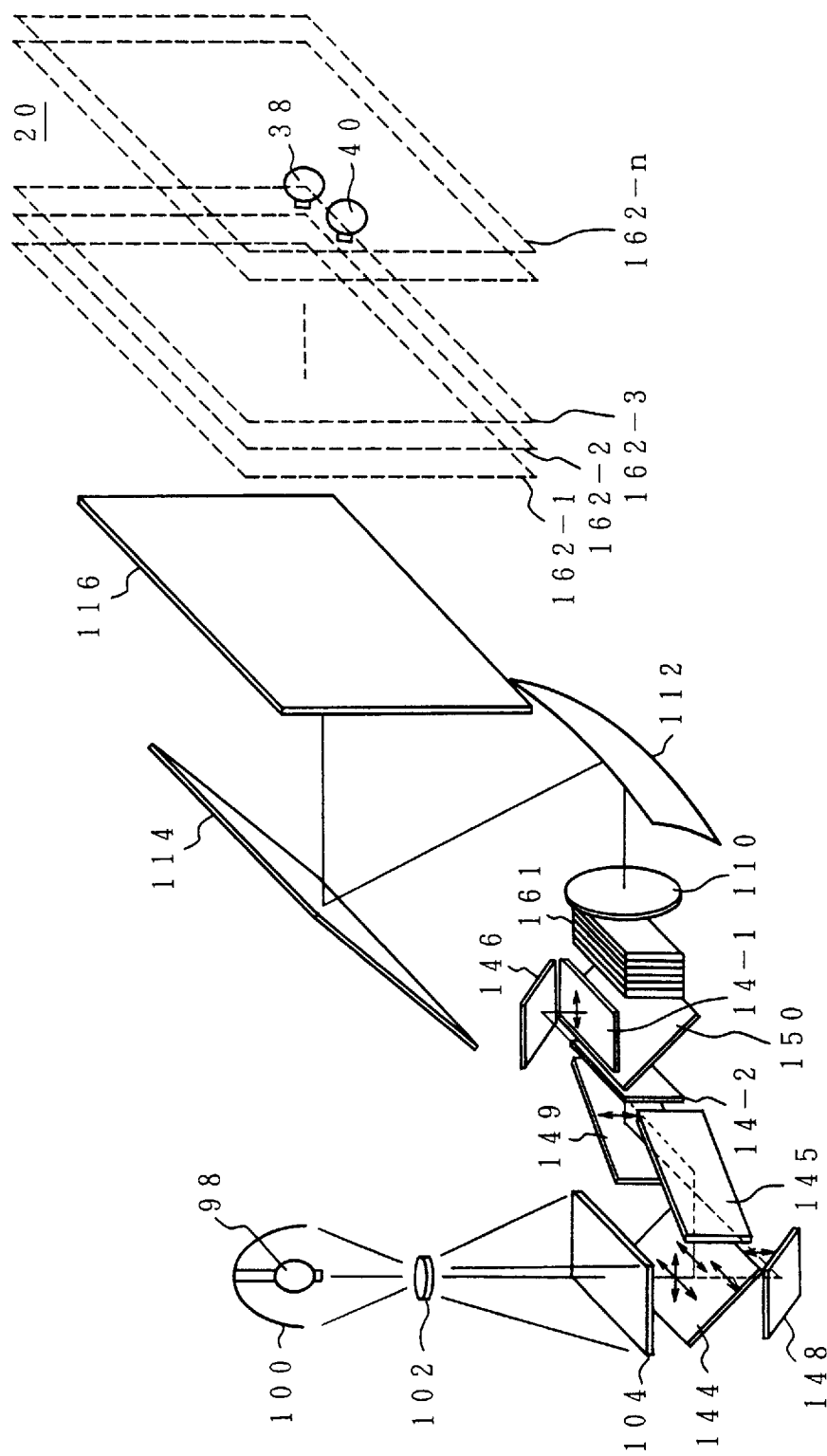

IMAGE DISPLAY APPARATUS AND METHOD FOR ALLOWING STEREOSCOPIC VIDEO IMAGE TO BE OBSERVED

BACKGROUND OF THE INVENTION

The present invention relates to display apparatus and method for detecting positions of eyes of one or a plurality of observers and allowing a stereoscopic video image to be observed by a motion parallax of two eyes and, more particularly, to image display apparatus and method for enabling other observers except an observer of a stereoscopic video image to observe a two-dimensional video image.

Hitherto, as a stereoscopic display apparatus, an apparatus of a double-eye type is most known. FIG. 1 shows a conventional double-eye type stereoscopic display apparatus. As shown in FIG. 2, an image 206 for the right eye and an image 208 for the left eye are displayed on a screen 202 of a display apparatus 200. By using an auxiliary optical system such as polarization glasses or the like, the image 206 for the right eye is shown to a right eye 38 and, at the same time, the image 208 for the left eye is shown to a left eye 40. A stereoscopic image 204 is shown by a motion parallax of the two eyes. As a stereoscopic display apparatus which does not need the auxiliary optical system such as polarization glasses or the like, there are an apparatus of a lenticular system of FIG. 3 and an apparatus of a parallax barrier system of FIG. 4. The stereoscopic display apparatus of the lenticular system of FIG. 3 is constructed by a display 210 such as a liquid crystal device or the like and a lenticular lens 212. A display pixel R of the image for the right eye and a display pixel L of the image for the left eye are separately arranged on the display 210. A light from the right-eye pixel R is projected to a position of the right eye 38 of the observer in a sight region 214 by the lenticular lens 212. Simultaneously, a light from the left-eye pixel L is projected to a position of the left eye 40 of the observer in the sight region 214 by the lenticular lens 212, so that a stereoscopic video image can be seen by the motion parallax of the two eyes. A stereoscopic display apparatus of the parallax barrier system of FIG. 4 is constructed by the display 210 such as a liquid crystal device or the like and slits 216. The display pixel R of the image for the right eye and the display pixel L of the image for the left eye are separately arranged on the display 210. A light from the right-eye pixel R is projected to the position of the right eye 38 of the observer in the sight region 214 by the slits 216. Simultaneously, a light from the left eye pixel L is projected to the position of the left eye 40 of the observer in the sight region 214 by the slits 216. Consequently, a stereoscopic video image can be seen by the motion parallax of the two eyes.

However, with respect to both of the lenticular system and the parallax barrier system, when the positions of the eyes 38 and 40 of the observer are deviated from the preset sight region 214 as shown in eyes 38' and 40', since an opposite sight state in which the images entering the right and left eyes are exchanged occurs and the images are separated or the screen becomes dark, there is a problem such that a stereoscopic observing region is limited. As an apparatus for solving the problem, there is a stereoscopic display apparatus of FIG. 5 in which the stereoscopic observing region is enlarged with respect to the lenticular system. The stereoscopic display apparatus uses a double lenticular lens 220 in which the screen has slits 222. For the screen using the double lenticular lens 220, a display 216-1 and a projection lens 218-1 which are used for a right-eye image, and a display 216-2 and a projection lens 218-2 which are used for a left-eye image are independently provided in a projector 215. The double lenticular lens 220 has a function to transmit a light toward the incoming direction of the light. When the screen is seen from the position of the sight region 214 facing the projection lenses 218-1 and 218-2, therefore, the projected right-eye video image R and left-eye video image L can be seen. The video images can be respectively perceived by the right and left eyes 38 and 40 and can be observed as a solid. When the observer moves in a lateral direction 224-1 or a front/rear direction 226-1, the position of the projector 215 is moved in a lateral direction 224-2 or a front/rear direction 226-2 in accordance with the observer, thereby always preventing that the eyes 38 and 40 of the observer are deviated from the sight region 214.

In case of the conventional stereoscopic display apparatus of the lenticular system, however, a stereoscopic observing range called a sub-probe is also spread in the lateral direction of the sight region 214 for the sight region 214 that is set while tracing the observer. When the projector 215 is moved according to one observer, therefore, there is a problem such that a separating region of the video image is insufficient for another observer, for example, another person seeing from behind the observer, so that the image cannot be seen as a solid, and moreover, a quality of a two-dimensional image itself which can be seen also deteriorates. Even when a plurality of projectors 215 are prepared in correspondence to a plurality of observers, if the projectors 215 are moved differently according to the respective observers, an obstruction of the video images by the sub-probes occurs among the projectors, so that there is a problem such that the apparatus can cope with only one observer.

SUMMARY OF THE INVENTION

According to the invention, there are provided image display apparatus and method in which one or a plurality of observers can observe a solid while moving without any aid of an auxiliary optical system such as glasses or the like and, further, an observer out of a stereoscopic observing region can observe a clear two-dimensional image.

According to the invention, there is provided an image display apparatus for allowing a stereoscopic image to be recognized by a parallax of two eyes, comprising: a position detecting unit for detecting the position of an observer existing in a stereoscopic observing region; an image forming unit for forming a right-eye image and a left-eye image which are observed by the observer at a detection position; a display for displaying the right- and left-eye images formed by the image forming unit; a projection optical unit for projecting the display images of the display to the detecting position of the observer by setting an aperture position; and an aperture control unit for controlling the position and size of the aperture of the projection optical unit so that at least the right-eye image is projected to a position including the right eye of the observer and the left-eye image is projected to a position including the left eye of the observer on the basis of the detecting position of the observer, thereby allowing a stereoscopic image to be observed. Thus, a parallax image tracing the movement of the observer in the stereoscopic observing region is projected and the movement of the observer in a wide range is permitted. Since the way of looking of the image is changed in association with the movement of the observer, a stereoscopic image having a motion parallax can be observed.

The position detecting unit, specifically, detects the eyeball positions of the right and left eyes of the observer. The position detecting unit has two image pick-up apparatuses arranged at a predetermined interval in the horizontal direction and a position operating unit for calculating the position of the observer from two images obtained by photographing a target by the image pickup apparatuses. As another embodiment, the position detecting unit comprises: a magnet attached to the observer; two magnetic sensors arranged at a predetermined interval in the horizontal direction; and a position operating unit for operating the position of the observer from detection signals of the magnetic sensors. As further another embodiment, the position detecting unit can be also constructed by two ultrasonic sensors arranged at a predetermined interval in the horizontal direction and a position operating unit for operating the position of the observer from detection signals of the ultrasonic sensors.

The aperture control unit sets each of the right-eye aperture corresponding to the detecting position of the right eye of the observer and the left-eye aperture corresponding to the detecting position of the left eye and projects the right- and left-eye images to the detecting position of the observer, thereby allowing a stereoscopic image to be observed by the parallax images of the two eyes. In this case, the aperture control unit sets small aperture regions corresponding to the detecting positions of the right and left eyes of the observer as right- and left-eye apertures. The aperture control unit sets the aperture regions as right- and left-eye apertures so that images are projected in a predetermined range based on an interval (about 32.5 mm to 97.5 mm) between the two eyes of the observer which was statistically obtained. Further, the aperture control unit sets apertures so that the right- or left-eye image is projected to a position different from the detecting position of the observer and the same image is shown to both eyes of another observer, thereby allowing a 2-dimensional image to be observed. Therefore, since either the right-eye image or the left-eye image is projected, observers other than the observer who is detected as a target of the stereoscopic observation can observe a clear 2-dimensional image. As for the display of the stereoscopic image and 2-dimensional image by the aperture control unit, the right-eye aperture corresponding to the detecting position of the right eye of the observer and the left-eye aperture corresponding to the detecting position of the left eye are respectively set and the right- and left-eye images are projected, thereby allowing a stereoscopic image to be observed by the parallax of both eyes. At the same time, by enlarging either the right-eye aperture or the left-eye aperture to a position excluding the other aperture and projecting the corresponding image, the same image is shown to both eyes of the other observer, thereby allowing a 2-dimensional image to be observed. The aperture control unit sets the right- and left-eye apertures so that a boundary is located at the center between the detecting positions of the right and left eyes of the observer and projects the corresponding images, thereby allowing the observer to observe the stereoscopic image by the parallax of both eyes. The same image is also shown to both eyes of the other observer, thereby allowing a 2-dimensional image to be observed.

As a projection optical unit, there is a unit of a time division system, a unit of a space division system, and a unit of a polarization division system. As for the projection optical unit of the time division system, it is a prerequisite that a single display device for sequentially displaying the right-eye image and the left-eye image is used as a display. The projection optical unit of the time division system is constructed by: a projection lens for enlargedly projecting the image from the display device; an aperture setting device which is installed near the projection lens and sets the position and size of the aperture; and a screen which is arranged at a focal position of the projection lens and has an image forming function of an aperture image for a stereoscopic observing region. For the projection optical unit, the aperture control unit switches the positions of the right- and left-eye apertures of the aperture setting device synchronously with a switching display of the right- and left-eye images by the display. As for the projection optical unit of the space division system, it is a prerequisite that a pair of display devices corresponding to the right- and left-eye images are used as a display. The projection optical unit of the space division system is constructed by: a pair of projection lenses for individually enlargedly projecting images from the pair of display devices; a pair of aperture setting devices which are installed near the pair of projection lenses and set the positions and sizes of apertures; and a screen which is arranged at a focal position of the pair of projection lenses and has an image forming function of aperture images for the stereoscopic observing region. In this case, the aperture control unit simultaneously sets the right- and left-eye apertures for the pair of aperture setting devices synchronously with a parallel display of the right- and left-eye images to the pair of display devices. Similarly, as for the projection optical system of the polarization division system, it is a prerequisite that a pair of display devices corresponding to the right- and left-eye images are used as a display. The projection optical system of the polarization division system is constructed by: a polarization beam splitter for separation which separates a light from a light source into two lights having different polarization surfaces and emits the separated lights to the pair of display devices; a polarization beam splitter for synthesis which synthesizes image lights having different polarization surfaces from the pair of display devices; a projection lens for enlargedly projecting an image light from the polarization beam splitter for synthesis; an aperture setting device of a polarization control system which is installed near the projection lens and sets the aperture position for selectively transmitting the image lights having the different polarization surfaces in accordance with whether the polarization surface of the incident light rotated or not; and a screen which is arranged near the focal position of the projection lens and has an image forming function of an aperture image for the stereoscopic observing region. In this case, the aperture control unit polarizes so that the image lights corresponding to the positions of the right- and left-eye apertures of the polarization control device transmit synchronously with a parallel display of the right- and left-eye images for the pair of display devices. As an aperture setting device in the projection optical units of the time division and space division, a liquid crystal device for arbitrarily setting the transmitting position by a voltage control of liquid crystal segments which were finely divided is used. The aperture setting device of the polarization control system in the projection optical unit of the polarization division is constructed by: a liquid crystal device (matrix $\pi$ cell) for controlling the rotation of the polarization surface of the incident light in accordance with whether a driving voltage has been applied to the finely divided liquid crystal segments or not; and a polarization plate for transmitting only the image light which is outputted from the liquid crystal device and has a specified polarization surface. The projection optical unit has a virtual image forming member for enlarging the aperture of the projection lens, for example, a concave mirror.

The aperture control unit controls the aperture position to the right or left by changing the transmitting position of the aperture setting device in the horizontal direction. By moving the projection lens in the optical axial direction, the aperture position is controlled in the front/rear direction. By changing the focal distance of the projection lens, the aperture position can be also controlled in the front/rear direction. As for the control in the front/rear direction of the aperture position, a plurality of aperture setting devices are laminated in the optical axial direction and the aperture control unit controls the transmitting positions in the laminating direction of the plurality of aperture setting devices, thereby controlling the aperture position in the front/rear direction. Further, as for the control in the front/rear direction of the aperture position, the aperture setting devices are obliquely arranged in the front/rear direction for the optical axis and the screen is provided with a diffusion plate for diffusing the light in the vertical direction. In this case, the aperture control unit controls the aperture position to the right or left by changes in the transmitting positions in the lateral direction of the obliquely arranged aperture setting devices and also controls the aperture position in the front/rear direction by the changes in the transmitting positions in the oblique vertical direction of the aperture setting devices. The image forming unit forms 2-dimensional image data of the right- and left-eye images seen from the detecting position of the observer on the basis of modeled 3-dimensional image data. The image forming unit can also form the 2-dimensional image data of the right- and left-eye images seen from the detecting position of the observer by interpolating 2-dimensional image data obtained by seeing an object from different positions in the horizontal direction.

In another embodiment of the invention, a stereoscopic image can be also observed by a plurality of observers. In this case, there are an individual projection of an image according to the positions of a plurality of observers and a common projection of the same image. According to the respective projections for the plurality of observers, the plurality of observers are detected by the position detecting unit, right- and left-eye images seen by the plurality of observers are formed by the image forming unit, the right- and left-eye images formed for each of the plurality of observers are sequentially displayed on the display, and the aperture control unit controls the position and size of the aperture of the projection optical unit on the basis of the detecting positions of the plurality of observers so that the right-eye image of each observer is projected to the position including the right eye and the left-eye image is projected to the position including the left eye. According to the common projection for the plurality of observers, although the plurality of observers are detected by the position detecting unit, the image forming unit forms the right- and left-eye images seen by any one of the plurality of observers, the right- and left-eye images are displayed on the display, and the aperture control unit controls the position and size of the aperture of the projection optical unit on the basis of the detecting positions of the plurality of observers so that the right-eye image is projected to a position including the right eye of each of the plurality of observers and the left-eye image is projected to a position including the left eye of each of the plurality of observers.

The invention relates to an image display method for allowing a stereoscopic image to be recognized by a parallax of both eyes and the method comprises: a position detecting step of detecting the position of an observer existing in a stereoscopic display region; an image forming step of forming a right-eye image and a left-eye image seen by the observer at the detecting position; an image displaying step of displaying the right- and left-eye images; a 3-dimensional displaying step of projecting the right-eye image to a position including the right eye of the observer and also projecting the left-eye image to a position including the left eye of the observer by controlling a position and a size of an aperture of a projection optical system on the basis of the detecting position of the observer, thereby allowing a stereoscopic image to be observed by a parallax of both eyes; and a 2-dimensional displaying step of projecting either one of the right- and left-eye images to a position different from the detecting position of the observer by setting another aperture different from the aperture position of the projection optical system and showing the same image to the eyes of another observer, thereby allowing a 2-dimensional image to be observed.

According to such an image display method of the invention, a stereoscopic display can be seen without glasses and a motion parallax in which the display video image is changed according to the movement of the observer can be realized. Further, a 2-dimensional image can be clearly displayed so that persons other than the observer of a solid can also understand the contents.

The above and other objects, features and advantages of the present invention will become more apparent from the following detailed description with reference to the drawings.

BRIEF DESCRIPTION OF THE DRAWINGS

FIGS. 10A to 10C are explanatory diagrams of an operating process of an observer position using the image according to the apparatus of FIG. 9;

FIGS. 32A and 32B are explanatory diagrams of space-division image projections by equalization optical systems in FIGS. 30 and 31;

FIG. 33 is an explanatory diagram of the projection optical unit in FIG. 6 by the time division in which an aperture position is controlled in the front and rear direction and which uses a stacked shutter;

FIG. 34 is an explanatory diagram of a control in the front and rear direction of the aperture position by an equalization optical system in FIG. 33;

FIG. 41 is applied to the actual optical system;

FIG. 48 is an explanatory diagram of the projection optical unit in FIG. 6 by the space division in which the aperture position is controlled in the front and rear direction;

FIG. 49 is an explanatory diagram of the projection optical unit in FIG. 6 by a polarization division;

FIG. 50 is an explanatory diagram in which a part of a polarization control type aperture setting device in FIG. 49 is extracted;

FIG. 52 is a flowchart for an image projection and an aperture control by the polarization division;

FIG. 53 is an explanatory diagram of the projection optical unit in FIG. 6 in which the aperture position is controlled in the front and rear direction by stacking the aperture setting devices;

DETAILED DESCRIPTION OF THE PREFERRED EMBODIMENTS

[Construction of apparatus and display function]

Figure 6:
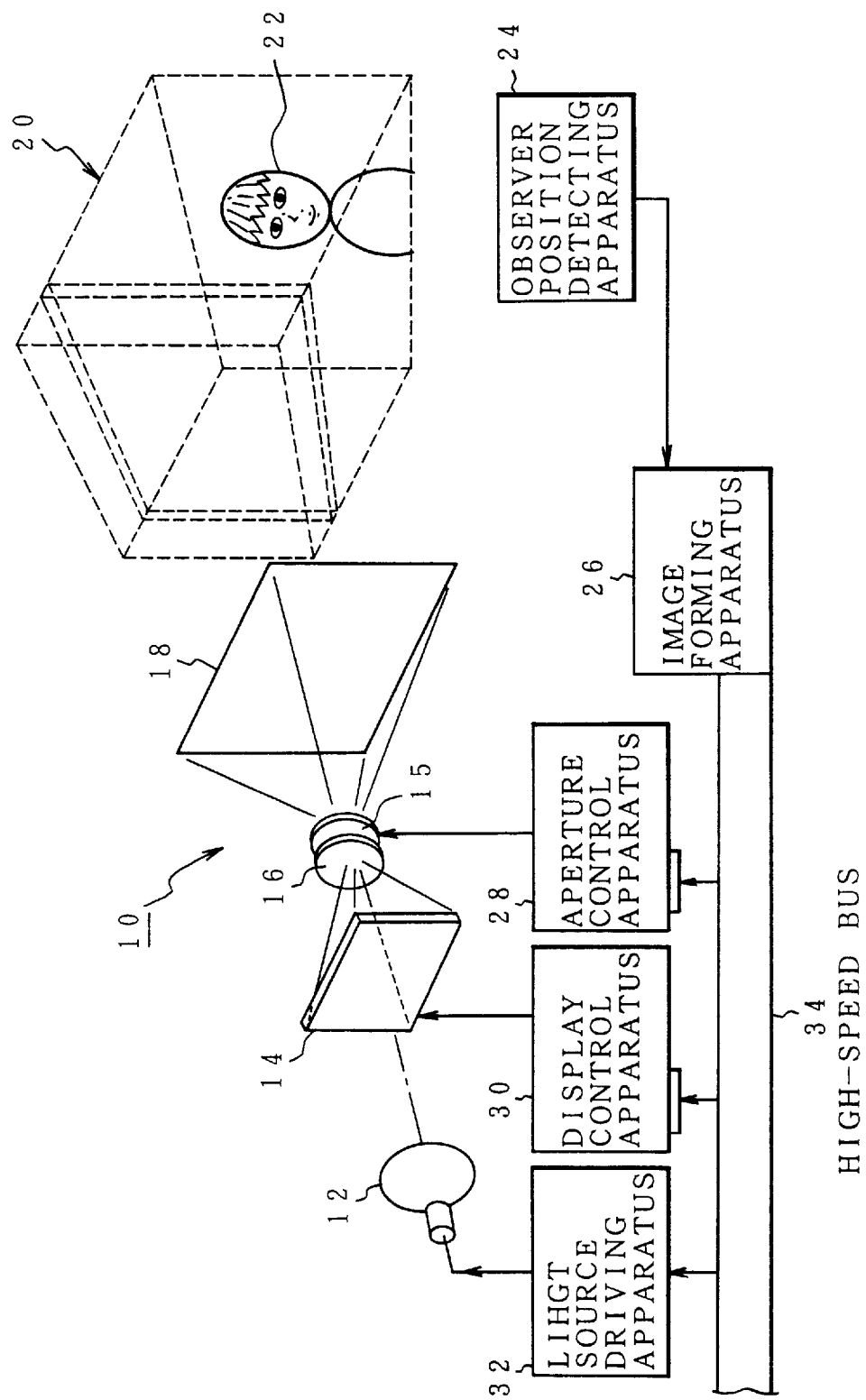
FIG. 6 is an explanatory diagram of a construction of an apparatus of the invention.

FIG. 6 shows an embodiment of an image display apparatus according to the invention. An image display apparatus 10 of the invention comprises: a light source unit 12 as a projection optical unit for a 3D observing region 20; a display 14; a projection lens unit 15; an aperture setting device 16; and a screen 18 having an image forming function. An observer position detecting apparatus 24 is provided for the 3D observing region 20 and detects a position of an observer 22. The detecting position of the observer 22 detected by the observer position detecting apparatus 24, specifically speaking, position detection information of the right and left eyes of the observer 22 is supplied to an image forming apparatus 26. The image forming apparatus 26 forms image data of a display target seen from the detected positions of the right and left eyes of the observer 22 as right-eye image data and left-eye image data, respectively. An aperture control apparatus 28, a display control apparatus 30, and a light source driving apparatus 32 are connected to a high-speed bus 34 of the image forming apparatus 26. As an image forming apparatus 26, a computer apparatus having modeling and rendering graphic functions can be used in this case. The light source driving apparatus 32 turns on a light source of the light source unit 12 in a use state of the apparatus, thereby generating a light for an image projection. The display control apparatus 30 displays the right- and left-eye images corresponding to the detecting positions of the observer 22 formed by the image forming apparatus 26 onto the display 14. As display systems of the right- and left-eye images for the display 14, there are three kinds of systems such as time division system, space division system, and polarization division system. In the time division system, a single display device is used as a display 14. On the contrary, with respect to the space division system and the polarization division system, an exclusive-use display device is used for each of the right- and left-eye images. In the embodiment of FIG. 6, since the single display device is used as a display 14, the embodiment can correspond to the time division system. In correspondence to the detecting positions of the right and left eyes detected with respect to the observer 22, the aperture control apparatus 28 sets aperture positions of a projection optical system for projecting an image into a region including the right eye of the observer 22 at a timing when the right-eye image is displayed on the display 14 and for projecting an image into a region including the left eye of the observer 22 at a timing when the left-eye image is displayed on the display 14. By the setting control of the aperture positions of the aperture setting device 16 by the aperture control apparatus 28 synchronized with the switching display of the right- and left-eye images on the display 14, the observer 22 can observe a stereoscopic image by receiving the projections of the parallax images having different parallaxes of the same object by the right and left eyes via the screen 18 and can recognize a stereoscopic image by the parallax of both eyes. Further, in the image display apparatus 10 of the invention, the aperture is set in the aperture setting device 16 so that observers other than the observer 22 detected by the observer position detecting apparatus 24 can observe a two-dimensional image of either one of the right- and left-eye images which are switched and displayed on the display 14 in a time division manner.

Figure 7:
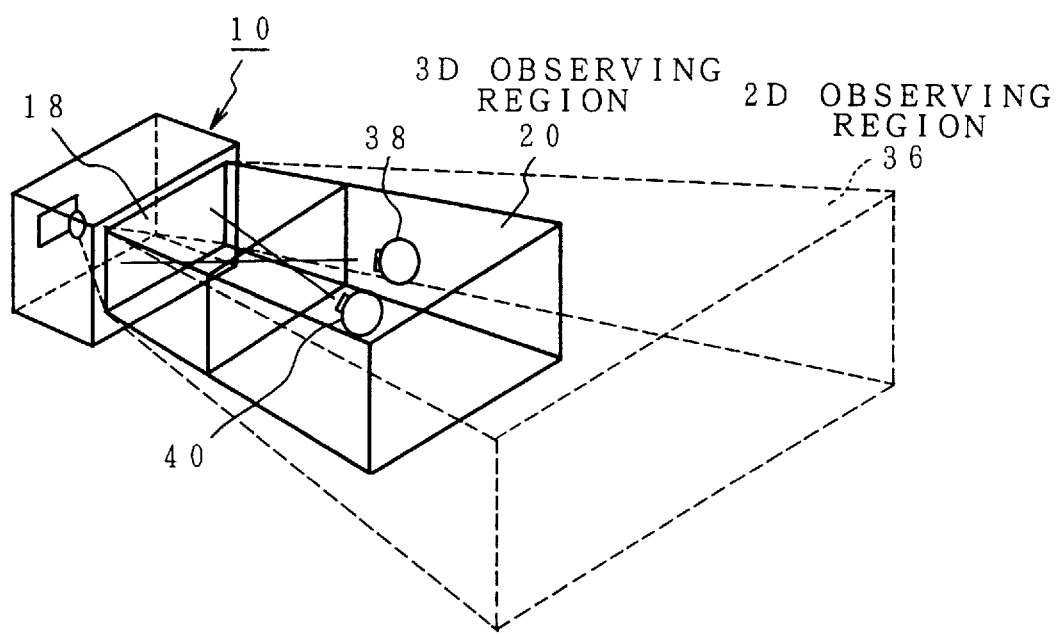
FIG. 7 is an explanatory diagram of observing regions according to the invention.

FIG. 7 shows observing regions in front of the screen 18 by the image display apparatus of FIG. 6. The 3D observing region 20 is set in a predetermined range in front of the screen 18 of the image display apparatus 10. When the right eye 38 and left eye 40 of the observer exist in the 3D observing region 20, the observer receives the projections of different parallax images, respectively, and can observe a stereoscopic image. The observer can observe the stereoscopic display at any position as long as he is in the 3D observing region 20. That is, the position of the observer existing in the 3D observing region 20 is detected by the image display apparatus 10 side in a real-time manner. The right- and left-eye images when a target object is seen from each moving position are formed in a real-time manner in accordance with the movement of the observer and are projected to the right eye 38 and left eye 40 of the observer. Consequently, when the observer moves in the 3D observing region 20, a stereoscopic image with a kinematic parallax in association with the movement of the observer can be observed. An outer region of the 3D observing region 20 is a 2D observing region 36 in which a 2-dimensional image can be observed. Therefore, when observers other than the target observer whose position is to be detected in the 3D observing region 20 observe simultaneously near the target observer, since the other observers exist in the 2D observing region 36, a clear 2-dimensional image by the projection of the right- or left-eye image can be observed.

Figure 8:
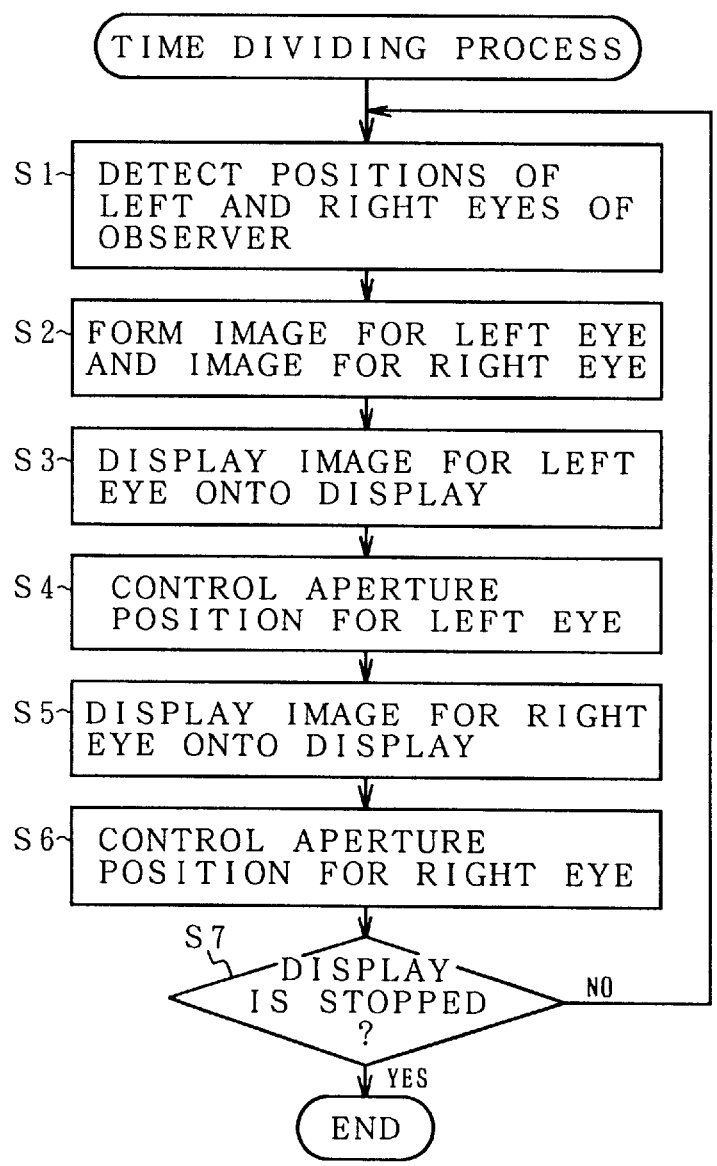
FIG. 8 is a flowchart for a stereoscopic display by a time-division process of the invention.

FIG. 8 is a flowchart for the stereoscopic display by a time dividing process in the image display apparatus 10 of FIG. 6. First in step S1, positions of the right and left eyes of the observer 22 are detected by the observer position detecting apparatus 24. In step S2, the image forming apparatus 26 forms images for right and left eyes on the basis of the positions of the right and left eyes of the observer and transfers to a frame buffer of the display control apparatus 30. The display control apparatus 30 first displays the image for the left eye on the display 14 in step S3. Synchronously with the display of the image for the left eye, the aperture control apparatus 28 sets an aperture position for the left eye into the aperture setting device 16 in step S4. Consequently, the image for the left eye from the display 14 is projected in a vertically-longitudinal slit region including the left eye of the observer 22. In step S5, the display control apparatus 30 displays the image for the right eye on the display 14. Synchronously with the display of the image for the right eye, the aperture control apparatus 28 sets an aperture position for the right eye into the aperture setting device 16 in step S6. Consequently, the image for the right eye displayed on the display 14 is projected to the right eye of the observer 22 at the next display timing. Such processes in steps S1 to S6 are repeated until the display of the apparatus is stopped in step S7. As for a switching display period of the right- and left-eye images by the time division, when it is assumed that a display period to prevent a flicker per image is set to $1/60$ second, since two images for the right and left eyes are switched and displayed, it is sufficient to perform the switching operation at a period of $1/120$ second, which is the half of $1/60$ second, that is, at a period of 120 Hz.

[Detection of observer position]

Figure 9:
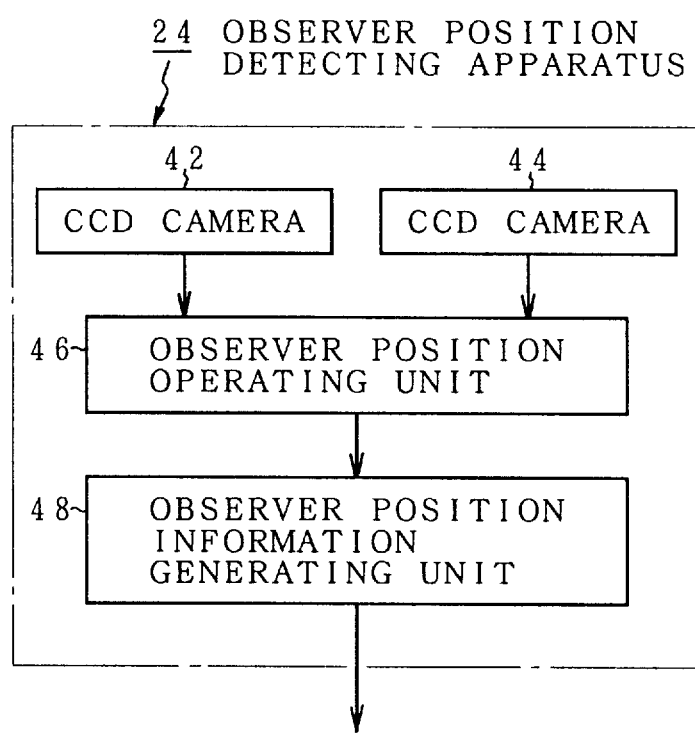
FIG. 9 is a block diagram of an observer position detecting apparatus in FIG. 6 using an image.

FIG. 9 shows an embodiment of the observer position detecting apparatus 24 in FIG. 6 and is characterized in that the positions of the eyes of the observer are detected by image processes by two CCD cameras. The observer position detecting apparatus 24 has two CCD cameras 42 and 44. The CCD cameras 42 and 44 are installed on the apparatus side with predetermined intervals in the horizontal direction for the 3D observing region 20 in FIG. 2. An observer position operating unit 46 calculates the positions of the right and left eyes of the observer photographed by the CCD cameras 42 and 44. An observer position information generating unit 48 transfers 3-dimensional coordinate information (X, Y, Z) of the observer position calculated by the observer position operating unit 46 to the image forming apparatus 26 and, further, to the aperture control apparatus 28 in FIG. 6.

FIGS. 10A to 10C are explanatory diagrams of the contents of the operation in the observer position detecting apparatus 24 of FIG. 9. FIG. 10A is a plan view showing the relation between image pickup lenses 50 and 52 of the two cameras installed at positions away from the observer by predetermined distances and image pickup surfaces 54 and 56. FIG. 10B is a front view when it is seen from the camera sides. FIG. 10C is a side elevational view. According to a position detecting principle in this case, the positions of the eyes 38 and 40 of the observer are obtained by a pattern matching for two images 58 and 60 picked up by the two cameras and position information on input images is calculated. Since the position information can be replaced to angular information, the positions of the eyes can be derived from the distance between the cameras and two angles for the cameras by using the principle of triangulation. Describing in more detail, a (z) axis is set at the center of the two cameras and (x) and (y) axes are set on the lenses 50 and 52, respectively. The two cameras are arranged so that their optical axes are in parallel. Further, the interval between the lenses 50 and 52 is set to (B), images on the image pickup surfaces 54 and 56 picked up by the cameras are set to the images 58 and 60, and a distance from each of the lenses 50 and 52 to each of the image pickup surfaces 54 and 56 is set to (d). In the embodiment, coordinates (x0, y0, z0) at an intermediate position (P) between the right eye 38 and left eye 40 obtained by the pattern matching are calculated. Angles θ1 and θ2 between the straight lines connecting the intermediate position (P) of the two eyes in FIG. 10A and positions on the image pickup surfaces 54 and 56 of the cameras and the optical axes of the lenses 50 and 52 and an angle a between the optical axis and a straight line connecting the image pickup surface 56 in the side elevational view of FIG. 10C and the intermediate position (P) of the two eyes have relations for the position information of the following equations.

$$\tan\theta 1 = \frac{\frac{B}{2} - x1}{d} = \frac{\frac{B}{2} + x0}{z0} \quad (1)$$

$$\tan\theta 2 = \frac{X2 - \frac{B}{2}}{d} = \frac{\frac{B}{2} - x0}{z0} \quad (2)$$

$$\tan\alpha = \frac{y1}{d} = \frac{y0}{z0} \quad (3)$$

When the equations (1) and (2) are added, the coordinate value z0 at the intermediate position (P) of the two eyes is calculated from a relation of the following equations.

$$\frac{\frac{B}{2} - x1}{d} = \frac{x2 - \frac{B}{2}}{d} = \frac{B}{z0} \quad (4)$$

$$\frac{x2 - x1}{d} = \frac{B}{z0}$$

$$z0 = \frac{B \cdot d}{x2 - x1}$$

When the equation (4) is substituted into the equation (1), the coordinate value x0 at the intermediate position (P) of the two eyes is calculated as follows.

$$\frac{\frac{B}{2} - x1}{d} = \frac{\frac{B}{2} + x0}{\frac{B \cdot d}{x2 - x1}} = \frac{\left(\frac{B}{2} + x0\right)(X2 - x1)}{B \cdot d} \quad (5)$$

$$x0 = \frac{B\{B - (X2 - x1)\}}{2(x2 - x1)}$$

Further, when the equation (4) is substituted into the equation (3), the coordinate value y0 at the intermediate position (P) of the two eyes is calculated as follows.

$$y0 = \frac{y1}{d} \cdot z0 = \frac{B \cdot y1}{x2 - x1} \quad (6)$$

By applying the equations (4), (5), and (6) to each of the pattern-matched right eye 38 and left eye 40, coordinates (xr, yr, zr) of a right-eye position Pr and coordinates (xℓ, yℓ, zℓ) of a left-eye position Pℓ can be obtained. The right-eye position Pr (xr, yr, zr) a nd the left-eye position Pℓ (xℓ, yℓ, zℓ) of the observer position in an actual space are scale converted between the actual space and a coordinate space of computer graphics for displaying the stereoscopic image and an image of the display target observed from the scale-converted coordinate positions of the right and left eyes is formed, thereby enabling the right- and left-eye images seen from the detecting positions of the eyes of the observer to be formed.

Figure 11:
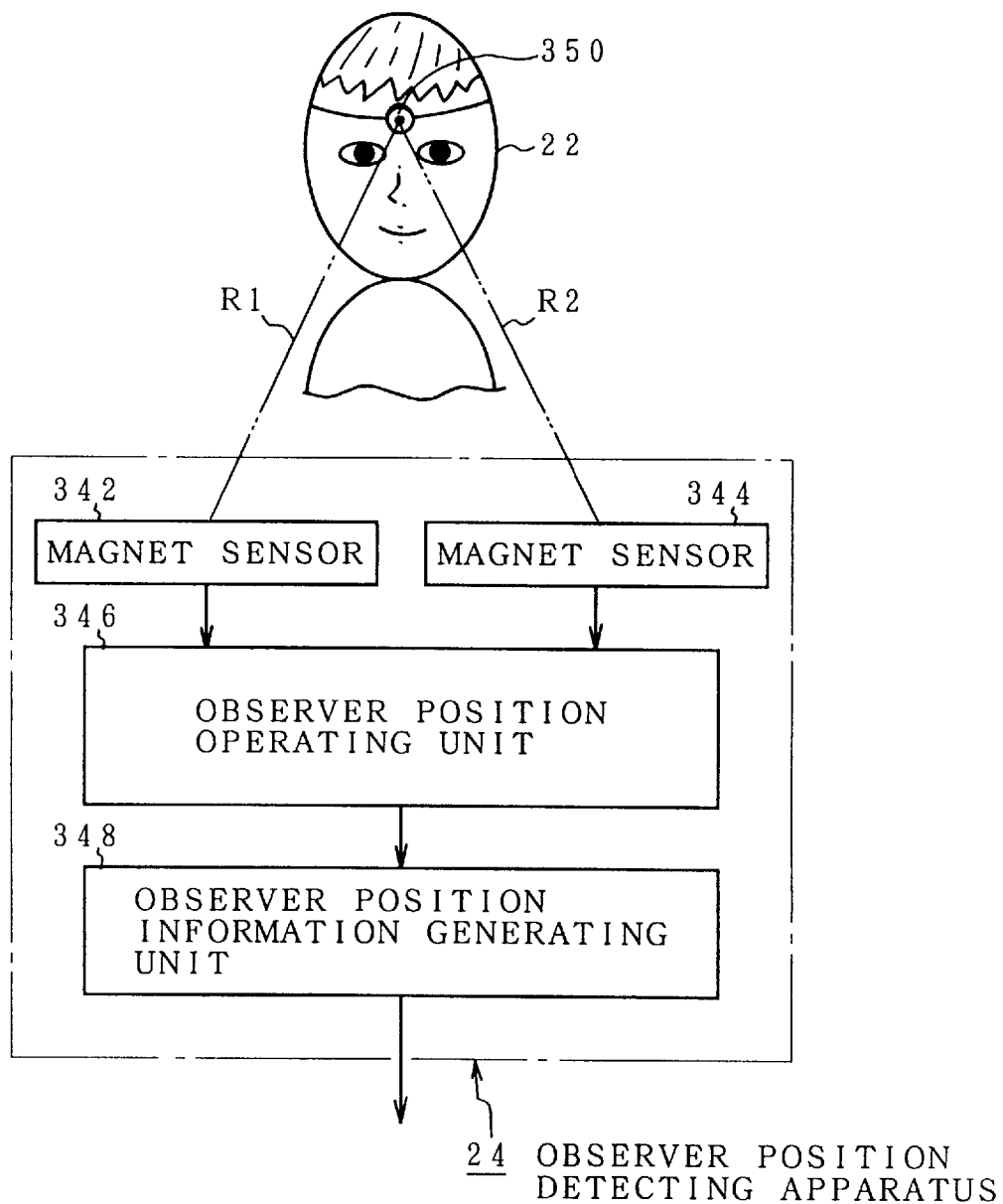
FIG. 11 is a block diagram of the observer position detecting apparatus in FIG. 6 using a magnetic sensor.

FIG. 11 shows another embodiment of the observer position detecting apparatus 24 which is used in FIG. 6 and is characterized by using magnetic sensors. In the observer position detecting apparatus 24, a pair of magnetic sensors 342 and 344 are installed on the apparatus side at a predetermined interval in the horizontal direction. For the magnetic sensors 342 and 344, a magnet 350 is attached to the observer 22 side existing in the 3D observing region. The magnet 350 can be attached to, for example, the forehead serving as a center of the both eyes of the observer 22 or the like by a band or can be attached to the center position of the chest of a jacket of the observer 22 by a pin or the like. Each of the magnetic sensors 342 and 344 detects an intensity of a magnetic field from the magnet 350 attached to the observer 22. Since the intensity of the magnetic field is reduced in inverse proportion to the third power of an ordinary distance, distances from the magnetic sensors 342 and 344 to the magnet 350, that is, distances R1 and R2 from the sensors to the center position between both eyes of the observer 22 can be calculated from the detected intensities of the magnetic fields of the magnetic sensors 342 and 344. When the distances R1 and R2 from the sensors to the magnet 350 are found as mentioned above, the position of the magnet 350 is determined as a crossing point of arcs of radii R1 and R2 in which the magnetic sensors 342 and 344 are set to the centers and positions in the lateral direction (x-axis direction) and the front/rear direction (z-axis direction) can be detected. With respect to the vertical direction (y-axis direction), since the same image is projected even when the observer moves his face in the vertical direction in the stereoscopic display of the invention, particularly, there is no need to detect. That is, in the detection of the observer position by the magnetic sensors 342 and 344, a fixed value is used as a coordinate value y0 in the vertical direction, and the coordinate value x0 in the lateral direction and the coordinate value z0 in the front/rear direction are obtained by an operation of an observer position operating unit 346. Further, with respect to the positions of the right and left eyes of the observer 22, since the interval between the human eyes statistically lies in a range from 32.5 mm to 97.5 mm, an interval W between the two eyes is set to, for example, W=60 mm and it is sufficient to obtain the coordinate values xr and xℓ of the respective eyes by adding or subtracting W/2 to/from the coordinate value x0 at the center position between the both eyes which are determined by the detected magnet 350. In this case, it is sufficient to use the coordinate value (z) at the center position between the both eyes by the magnet 350 as coordinate values zr and zℓ.

Figure 12:
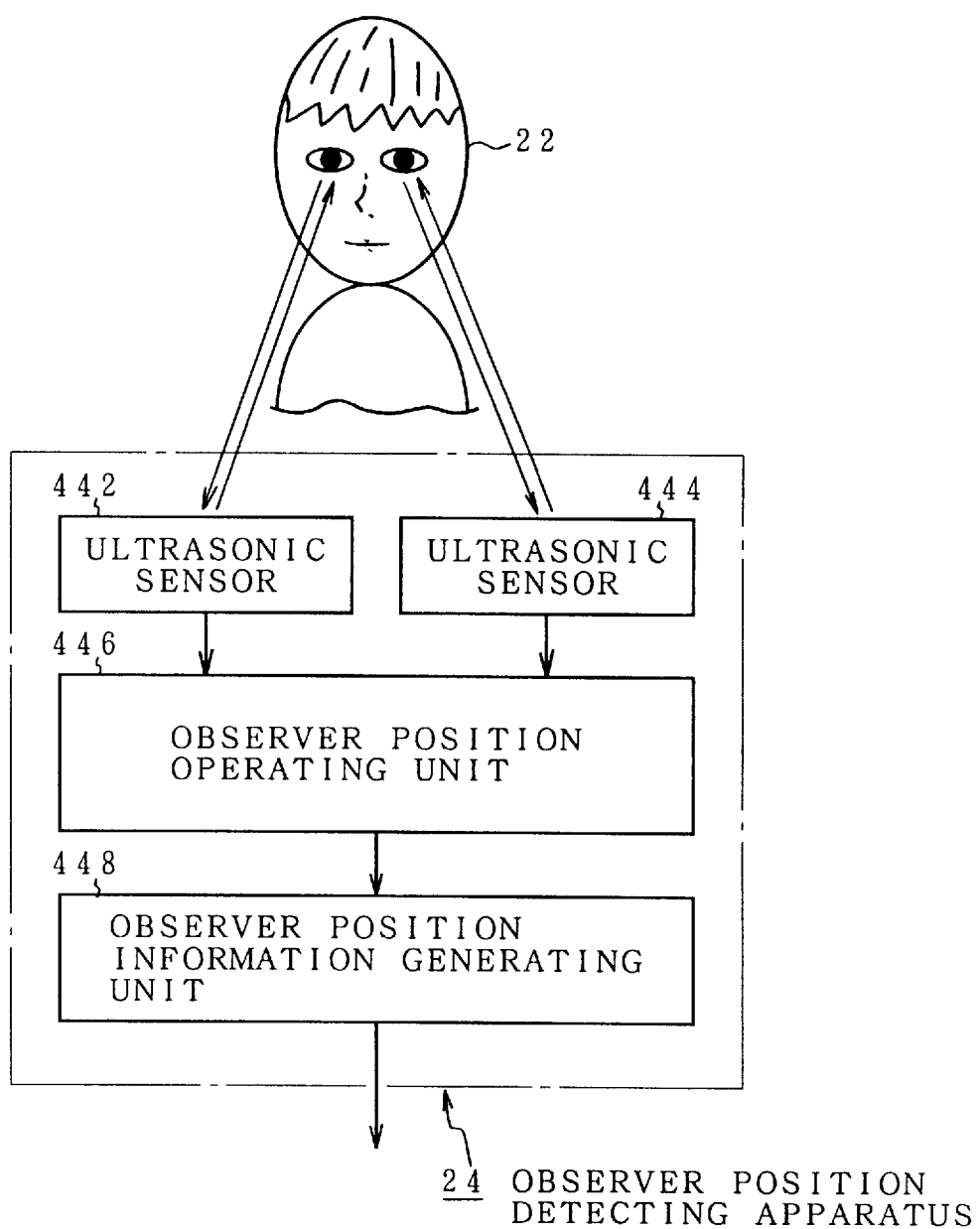
FIG. 12 is a block diagram of the observer position detecting apparatus in FIG. 6 using an ultrasonic sensor.

FIG. 12 shows another embodiment of the observer position detecting apparatus 24 which is used in the invention and is characterized by using ultrasonic sensors. In the observer position detecting apparatus 24, a pair of ultrasonic sensors 442 and 444 are installed on the front surface of the apparatus side at a predetermined interval in the horizontal direction. The ultrasonic sensors 442 and 444 emit ultrasonic pulses to the 3D observing region at a predetermined period. The ultrasonic pulses are reflected by the observer 22 and are received by the ultrasonic sensors 442 and 444. Consequently, the distances R1 and R2 from the sensors to the observer 22 can be obtained from propagation times of the ultrasonic waves from the ultrasonic sensors 442 and 444 to the observer 22. In a manner similar to the case of the magnetic sensors in FIG. 11, the position information of the observer 22 is calculated by an observer position operating unit 446 and can be sent to the image formation side from an observer position information generating unit 448. The detection of the observer position which is used in the invention is not limited to the foregoing embodiments, but other position detecting apparatuses using proper sensors can be also used.

[Formation of right- and left-eye images]

Figure 1:
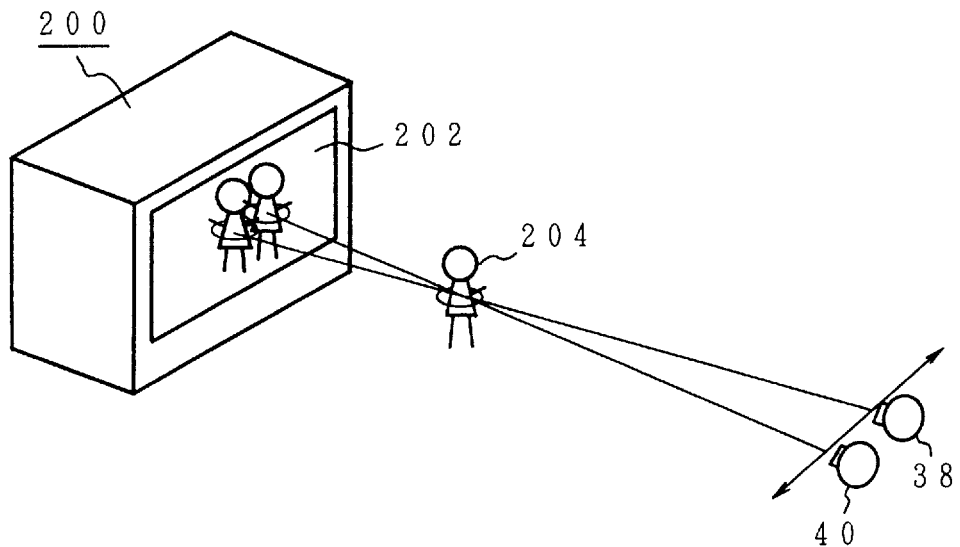
FIG. 1 is an explanatory diagram of a conventional stereoscopic display apparatus using polarization glasses.
Figure 2:
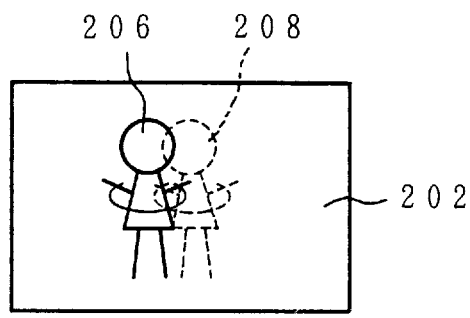
FIG. 2 is an explanatory diagram of images for right and left eyes which are displayed in FIG. 1.
Figure 3:
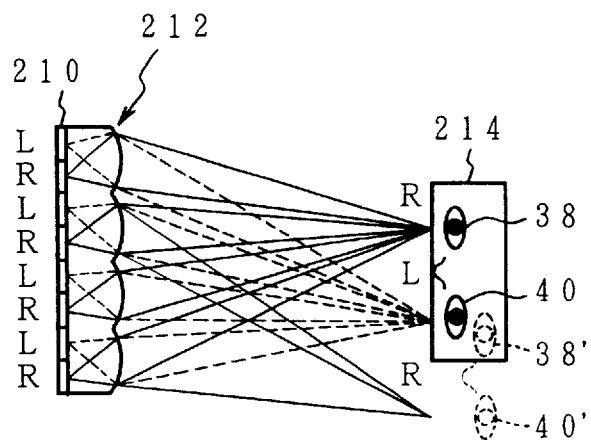
FIG. 3 is an explanatory diagram of a conventional stereoscopic display apparatus according to a lenticular system.
Figure 4:
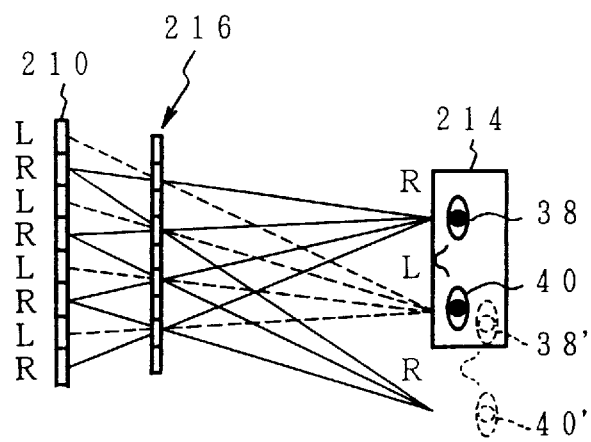
FIG. 4 is an explanatory diagram of a conventional stereoscopic display apparatus according to a parallax barrier system.
Figure 5:
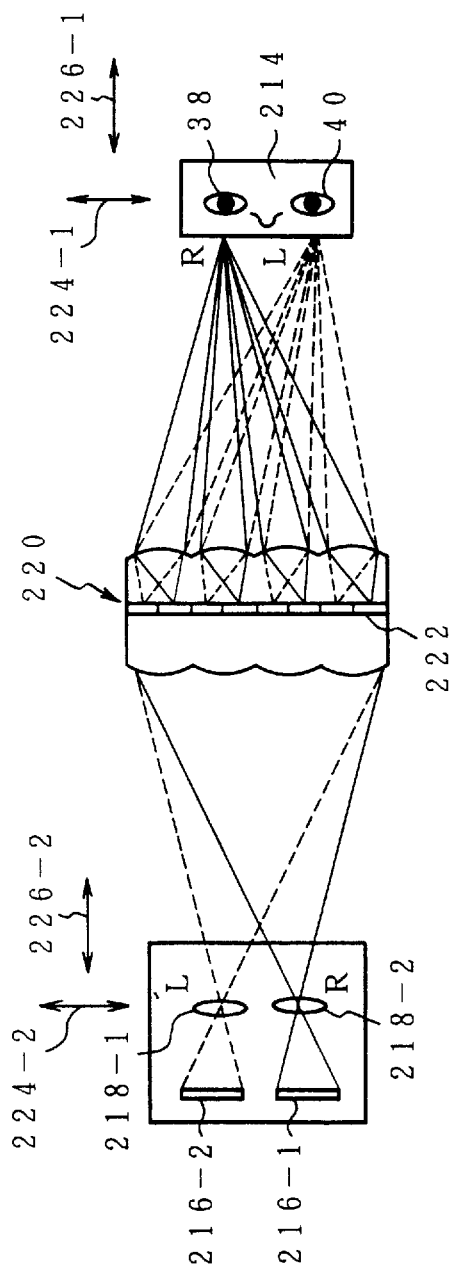
FIG. 5 is an explanatory diagram of a conventional stereoscopic display apparatus according to a lenticular system in which an observing region is enlarged.
Figure 13:
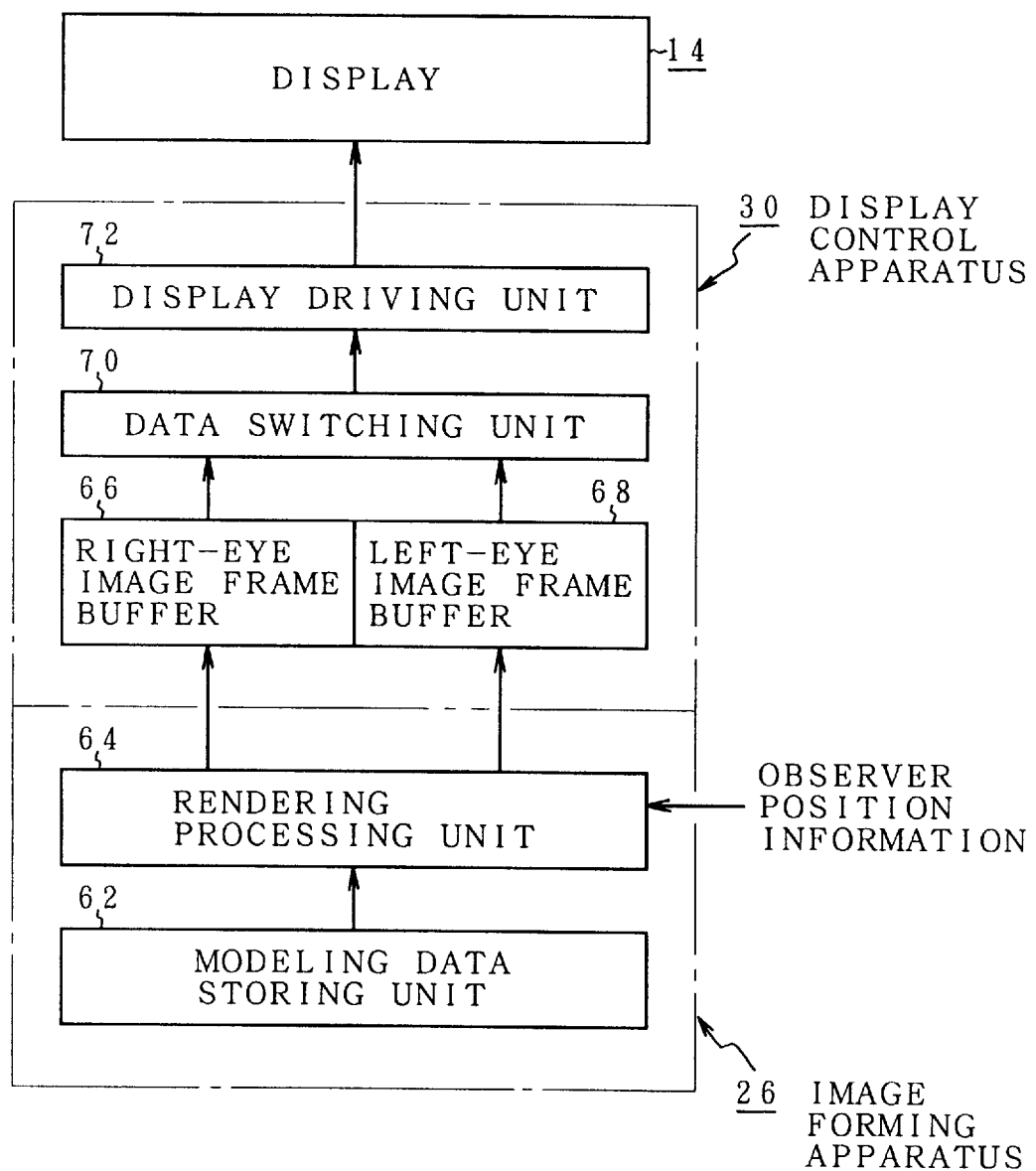
FIG. 13 is a block diagram of an image forming apparatus and a display control apparatus in FIG. 6.
Figure 14:
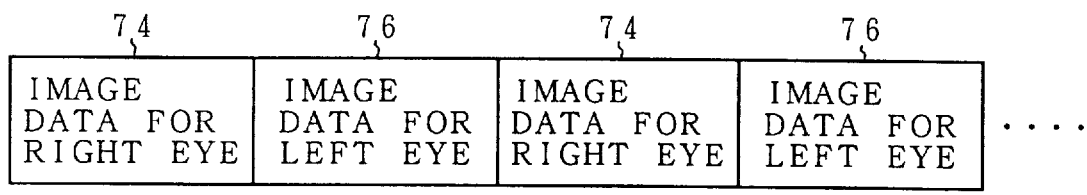
FIG. 14 is an explanatory diagram of a transfer display of image data for right and left eyes by the time division.

FIG. 13 shows an embodiment of the image forming apparatus 26 in FIG. 2 for forming the right- and left-eye images on the basis of the observer position detection information. The embodiment is characterized in that the right- and left-eye images are formed from preliminarily recorded modeling data on the basis of the observer position information. The image forming apparatus 26 is constructed by a modeling data storing unit 62 and a rendering processing unit 64. Since the time division display of the right- and left-eye images is considered as an example, for the single display 14, the display control apparatus 30 has a right-eye image frame buffer 66, a left-eye image frame buffer 68, a data switching unit 70 for switching images at a period of 1/120 second, and a display driving unit 72. When a liquid crystal device is used as a display 14 for example, a liquid crystal driver is used as a display driving unit 72. Modeling data formed by a method of computer graphics has previously been recorded in the modeling data storing unit 62 in the image forming apparatus 26. The modeling data is formed as a set of several polygon data of the target object. When the observer position information is supplied to the rendering processing unit 64, the observing positions are used as observing point positions and it is calculated how the polygons which form the target object and have been stored in the modeling data storing unit 62 are seen from the observing point positions. That is, the position, size, color, texture, and the like are calculated and are developed as right-eye image data in the right-eye image frame buffer 66 with respect to the right-eye image and are developed as left-eye image data in the left-eye image frame buffer 68 with respect to the left-eye image. The display control apparatus 30 sequentially reads out the right- and left-eye image data developed in the right-eye image frame buffer 66 and left-eye image frame buffer 68 by the image forming apparatus 26 by a switching operation of the data switching unit 70 at a switching period of, for example, 1/120 second. The read data is switched and displayed on the display 14 by the display driving unit 72. Thus, right-eye image data 74 and left-eye image data 76 are alternately outputted from the data switching unit 70 as shown in FIG. 14 and the right- and left-eye and images are switched and displayed by the time division.

Figure 15:
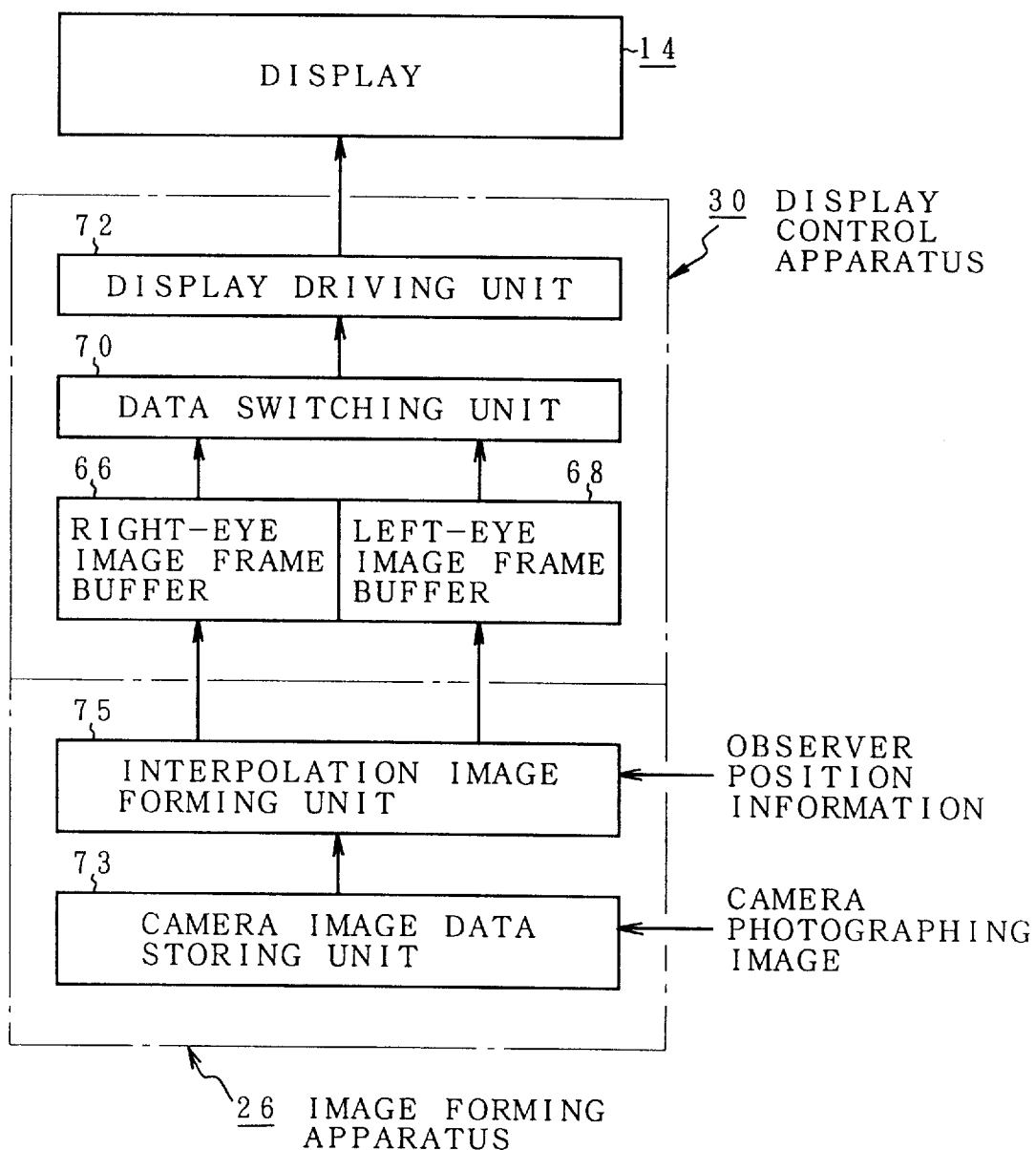
FIG. 15 is a block diagram of the image forming apparatus and display control apparatus in FIG. 6 in which an image interpolation is executed.

FIG. 15 shows another embodiment of the image forming apparatus 26 in FIG. 6 and the embodiment is characterized in that right- and left-eye images in which the detection information of the observer position is used as observing point positions are formed by an interpolating process on the basis of information of two images photographed by cameras at different positions. The image forming apparatus 26 is constructed by a camera image data storing unit 73 and an interpolation image forming unit 75. Images obtained by photographing the target object by at least two cameras installed at a predetermined distance in the horizontal direction have been stored in the camera image data storing unit 73. The interpolation image forming unit 75 forms the right- and left-eye images seen from the observer position by the interpolating process of a pair of photographed images stored in the camera image data storing unit 73 on the basis of the observer position information and stores in the right-eye image frame buffer 66 and left-eye image frame buffer 68 on the display control apparatus 30 side. The display control apparatus 30 executes the same time-division display control as that in the embodiment of FIG. 13.

Figure 16:
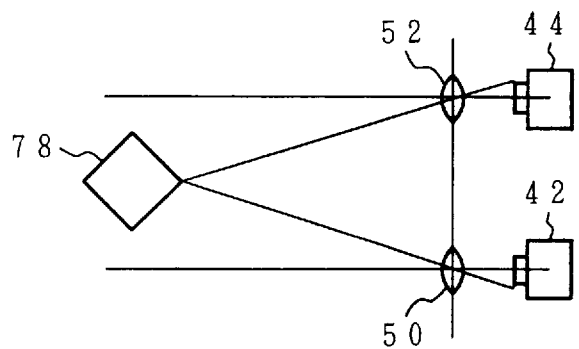
FIG. 16 is an explanatory diagram of a camera arrangement in FIG. 15.
Figure 17:
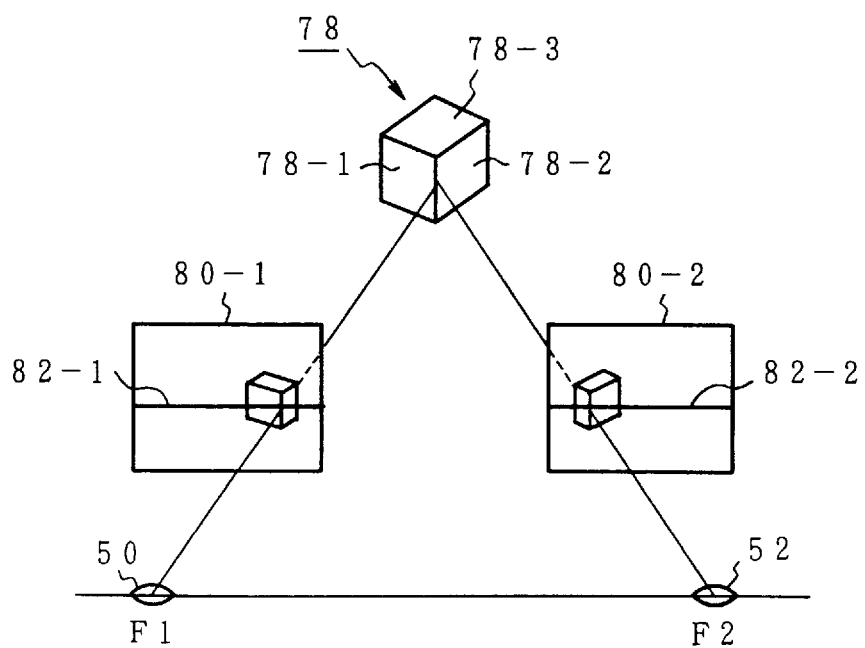
FIG. 17 is an explanatory diagram of images photographed by two cameras.
Figure 18A:
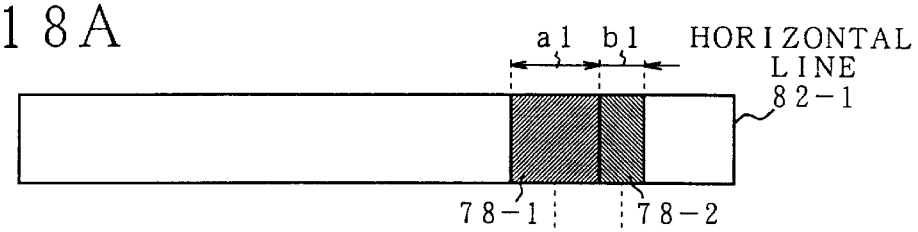
FIGS. 18A to 18E are explanatory diagrams of the image interpolation in the horizontal direction by the apparatus in FIG. 15.
Figure 18B:
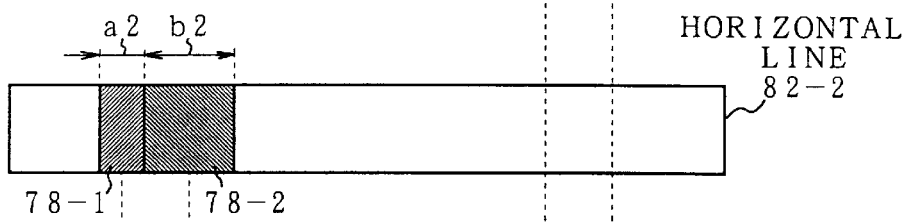
Figure 18C:
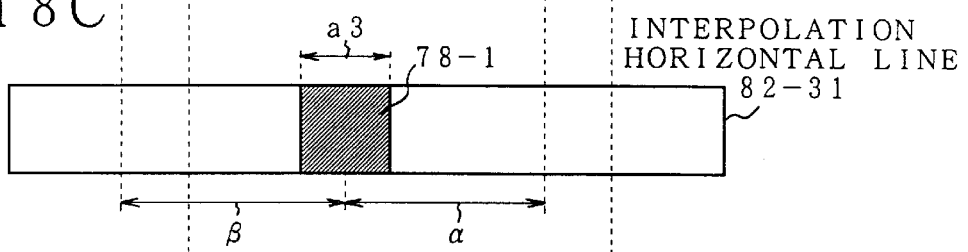
Figure 18D:
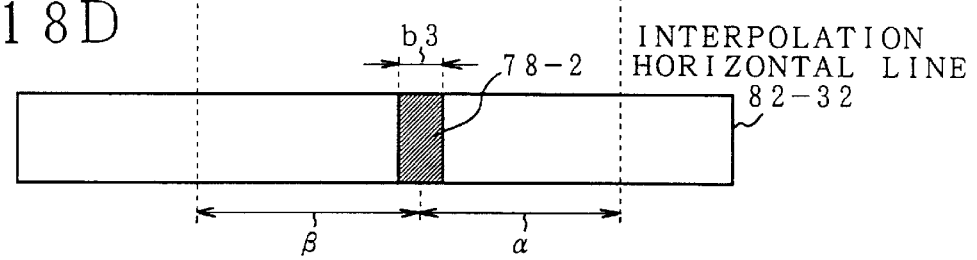
Figure 18E:
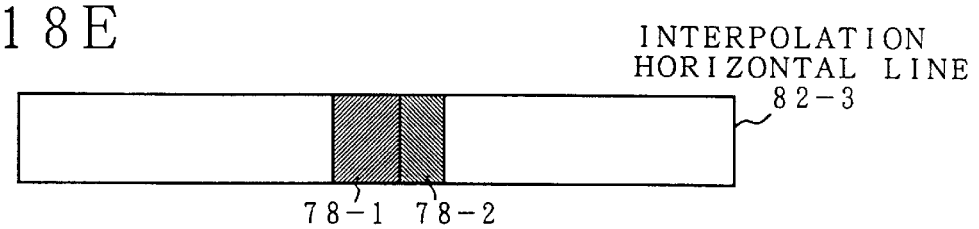

The forming process by the interpolation image forming unit 75 in FIG. 15 will now be described as follows with reference to FIGS. 16 to 19. When the observing point information of the right- and left-eye positions as observer position information is first supplied to the interpolation image forming unit 75, an interpolation image is formed from the two images stored in the camera image data storing unit 73 which is close to the given observing point position. When it is assumed that the cameras 42 and 44 are horizontally arranged so that their optical axes are in parallel as shown in FIG. 16, images of an object 78 seen from the two cameras 42 and 44 are as shown by images 80-1 and 80-2 in FIG. 17. FIGS. 18A and 18B show the relation between line pixels of horizontal lines 82-1 and 82-2 in the images 80-1 and 80-2. As shown in FIG. 18A, surfaces 78-1 and 78-2 of the object 78 are projected with widths a1 and b1, respectively, on the horizontal line 82-1 of the image 80-1. Similarly, as shown in FIG. 18B, the surfaces 78-1 and 78-2 of the object 78 are projected with widths a2 and b2, respectively, on the horizontal line 82-2 of the image 80-2. The formation of the interpolation image based on the images 80-1 and 80-2 in FIG. 17 is a formation of an image seen by setting a new observing point locating between the lenses 50 and 52. The surfaces 78-1 and 78-2 of the object are moved according to the observing point position. When the new observing point is set between the lenses 50 and 52 and it is assumed that a distance from the lens 50 to the observing point is set to α and a distance from the lens 52 to the observing point P is set to β, the positions and widths of the surfaces 78-1 and 78-2 of the object 78 at the new observing point can be determined on the basis of a dividing ratio (α:β) between the lenses 50 and 52. The operations to obtain the surfaces 78-1 and 78-2 of the object on the line at the new observing point P are executed to all of the horizontal lines, thereby enabling interpolation images of one picture plane to be obtained. A procedure for forming the interpolation images in the horizontal line will be specifically described as follows with reference to FIGS. 18A to 18E.

(I) The two distances a1 and b1 of the surfaces 78-1 and 78-2 of the object on the horizontal line 82-1 of the image 80-1 are obtained.

(II) The two distances a2 and b2 of the surfaces 78-1 and 78-2 of the object on the horizontal line 82-2 of the image 80-2 are obtained.

(III) A distance between the centers of gravity of the distances a1 and a2 of the surface 78-1 in above (I) and (II) is obtained, a position obtained by dividing the distance between the centers of gravity at a dividing ratio ($\beta{:}\alpha$) of the observing point position for forming the interpolation image is set to the position of the center of gravity, and an interpolation distance a3 is further obtained from the following equation.

$$a3 = a1 \times \{\beta/(\alpha+\beta)\} + a2 \times \{\beta/(\alpha+\beta)\}$$

(IV) A distance between the centers of gravity of the distances b1 and b2 of the surface 78-2 of the object in (I) and (II) is obtained in a manner similar to (III), a position obtained by dividing the distance between the centers of gravity at the dividing ratio ($\beta{:}\alpha$) which is determined by the observing point for forming the interpolation image is set to the position of the center of gravity of the interpolation image, and a distance b3 of an interpolation portion is further obtained by the following equation.

$$b3 = b1 \times \{\beta/(\alpha+\beta)\} + b2 \times \{\beta/(\alpha+\beta)\}$$

(V) The surfaces 78-1 and 78-2 of the object formed by the interpolation obtained in (III) and (IV) and are synthesized and interpolation images of one horizontal line are formed.

Figure 19:
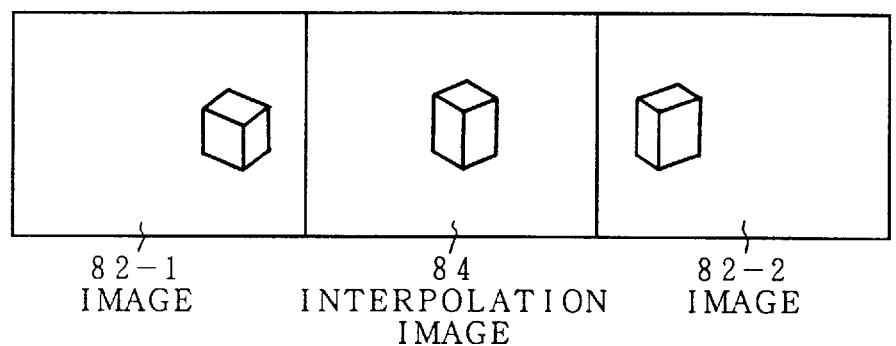
FIG. 19 is an explanatory diagram of images formed by the interpolating processes in FIGS. 18A to 18E.

By executing such a forming process of the interpolation images in the horizontal direction with respect to all of the horizontal lines, an interpolation image 84 in FIG. 19 can be obtained. In the invention, since two right- and left-eye positions are obtained as observer position information, by executing the similar process for forming the interpolation image with respect to each of the positions, the right- and left-eye images can be formed by the interpolation on the basis of the observer detecting positions.

[Projection display by time division and aperture control]

Figure 20:
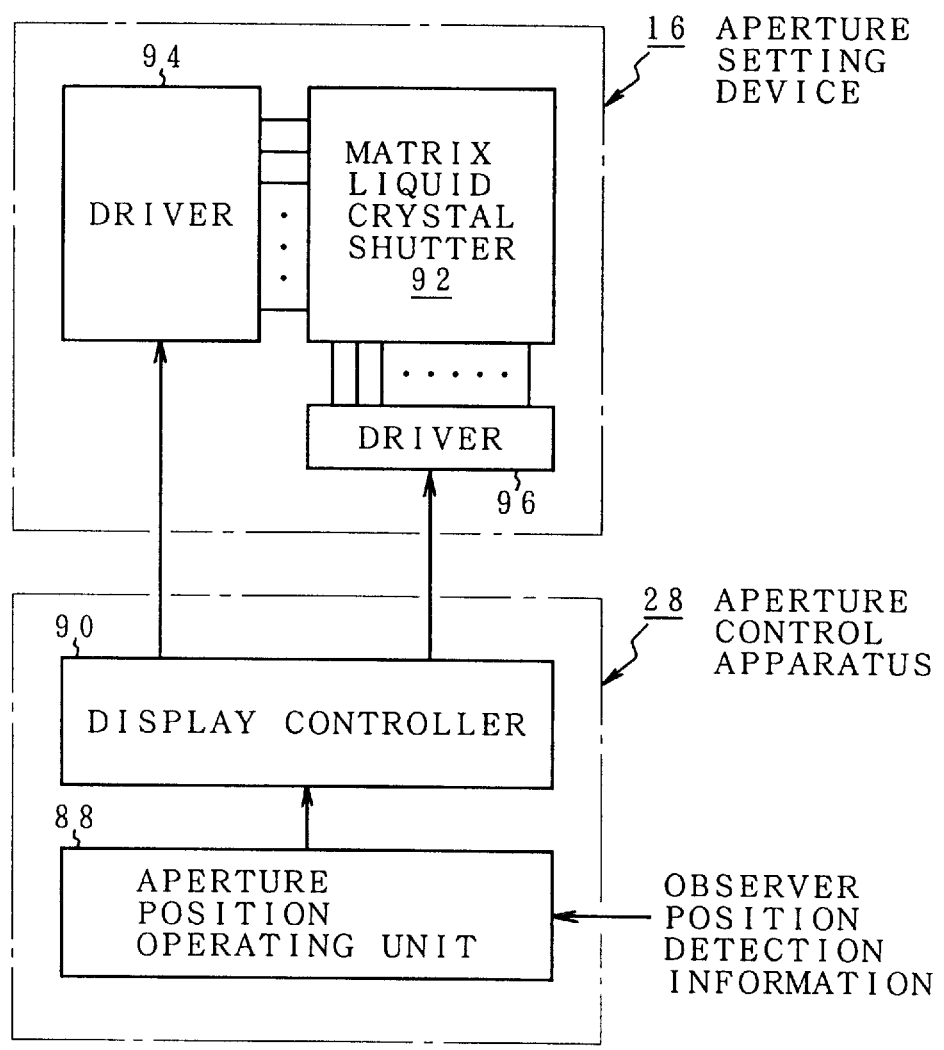
FIG. 20 is a block diagram of an aperture setting device and an aperture control apparatus in FIG. 6.

FIG. 20 is a block diagram of the aperture control apparatus 28 and the aperture setting device 16 in the image display apparatus of FIG. 6. The aperture control apparatus 28 has an aperture position operating unit 88 and a display controller 90. In the embodiment, the aperture setting device 16 uses a matrix liquid crystal shutter 92. Specifically speaking, a liquid crystal display device of a transmitting type can be used, and liquid crystal cells constructing fine display segments which are 2-dimensionally arranged are driven by a control of matrix voltages by drivers 94 and 96, an aperture control by the setting of a transparent state can be arbitrarily executed. The aperture position operating unit 88 provided in the aperture control apparatus 28 calculates the position and size of an aperture in a projection optical unit corresponding to an observing point position which is set by the observer position detection information and controls a corresponding aperture portion of the matrix liquid crystal shutter 92 via the display controller 90 so as to be in a transparent state, thereby setting an aperture.

Figure 21:
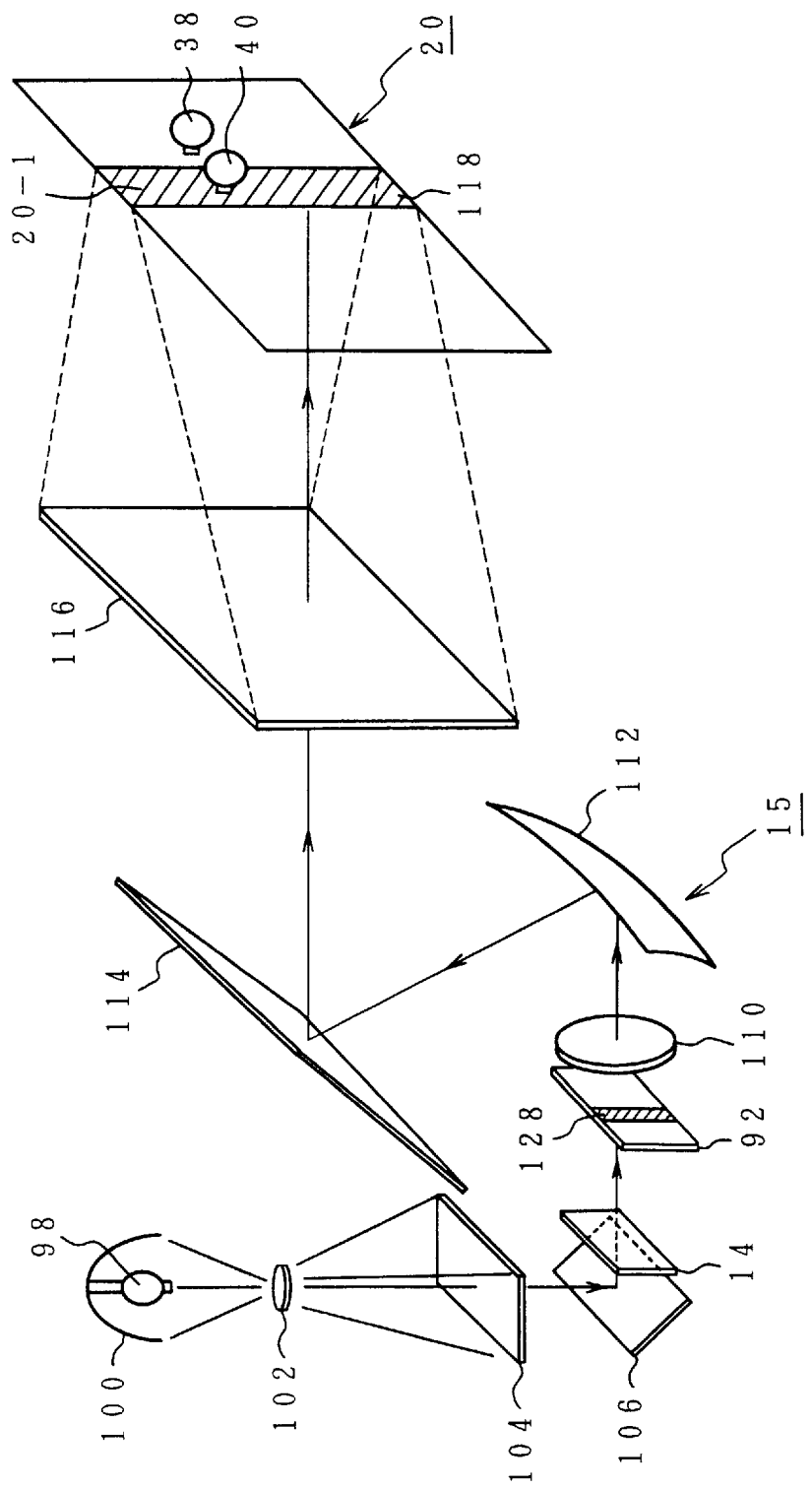
FIG. 21 is an explanatory diagram of a projection optical unit in FIG. 6 in a right-eye image projecting state by the time division.

FIG. 21 shows an embodiment of a projection optical unit which is provided in the stereoscopic display apparatus 10 in FIG. 6 for performing a stereoscopic display by the time division. First, a light source unit is constructed by a light source 98 and a reflector 100. For example, a white light source such as a metal halide lamp or the like is used as a light source 98. The light from the light source 98 is converged by a lens 102, is converted into the parallel light by a Fresnel lens 104, is reflected by a mirror 106, and enters the display 14. The right- and left-eye images are sequentially displayed to the display 14 by the time division system. Subsequent to the display 14, the matrix liquid crystal shutter 92 which functions as an aperture setting device is provided. FIG. 21 shows a timing when the left-eye image is displayed on the display 14. Therefore, an aperture 128 by the setting of a band-like transparent region in the vertical direction corresponding to the left-eye image is set into the matrix liquid crystal shutter 92. Subsequent to the matrix liquid crystal shutter 92, in the embodiment, a projecting lens 110 is provided as a projection lens unit 15. The projecting lens 110 forms an image transmitted through the aperture 128 of the display 14 at the position of a convex Fresnel lens 116 functioning as a screen. Subsequent to the projecting lens 110, a concave surface mirror 112 is provided. Since there is a limitation in an aperture of the projecting lens 110, the concave surface mirror 112 functions as an imaginary image forming device to enlarge the aperture of the projecting lens 110 so as to be adapted to the size of convex Fresnel lens 116 which functions as a screen. The image light enlarged by the concave surface mirror 112 is reflected by a back surface mirror 114 and enters the convex Fresnel lens 116 attached as a screen so as to form an image of the image light. The convex Fresnel lens 116 has a function as a convex lens to form a slit image of the matrix liquid crystal shutter 92 onto a virtual image forming surface of the 3D observing region 20. Namely, the convex Fresnel lens 116 forms a slit image 118 as an enlarged image of the aperture 128 set in the matrix liquid crystal shutter 92 into the 3D observing region 20 in such a state, thereby forming a left-eye observing region 20-1. The left-eye observing region 20-1 by the image formation of the slit image 118 is formed by the setting of the aperture 128 based on the detection result of the position of the left eye 40 of the observer. Therefore, the observer can observe the left-eye image displayed on the display 14 in this instance by only the left eye 40. Since the video image light from the display 14 is not projected to a position in front of the right eye 38, the left-eye image of the display 14 cannot be seen by the right eye 38 side.

Figure 22:
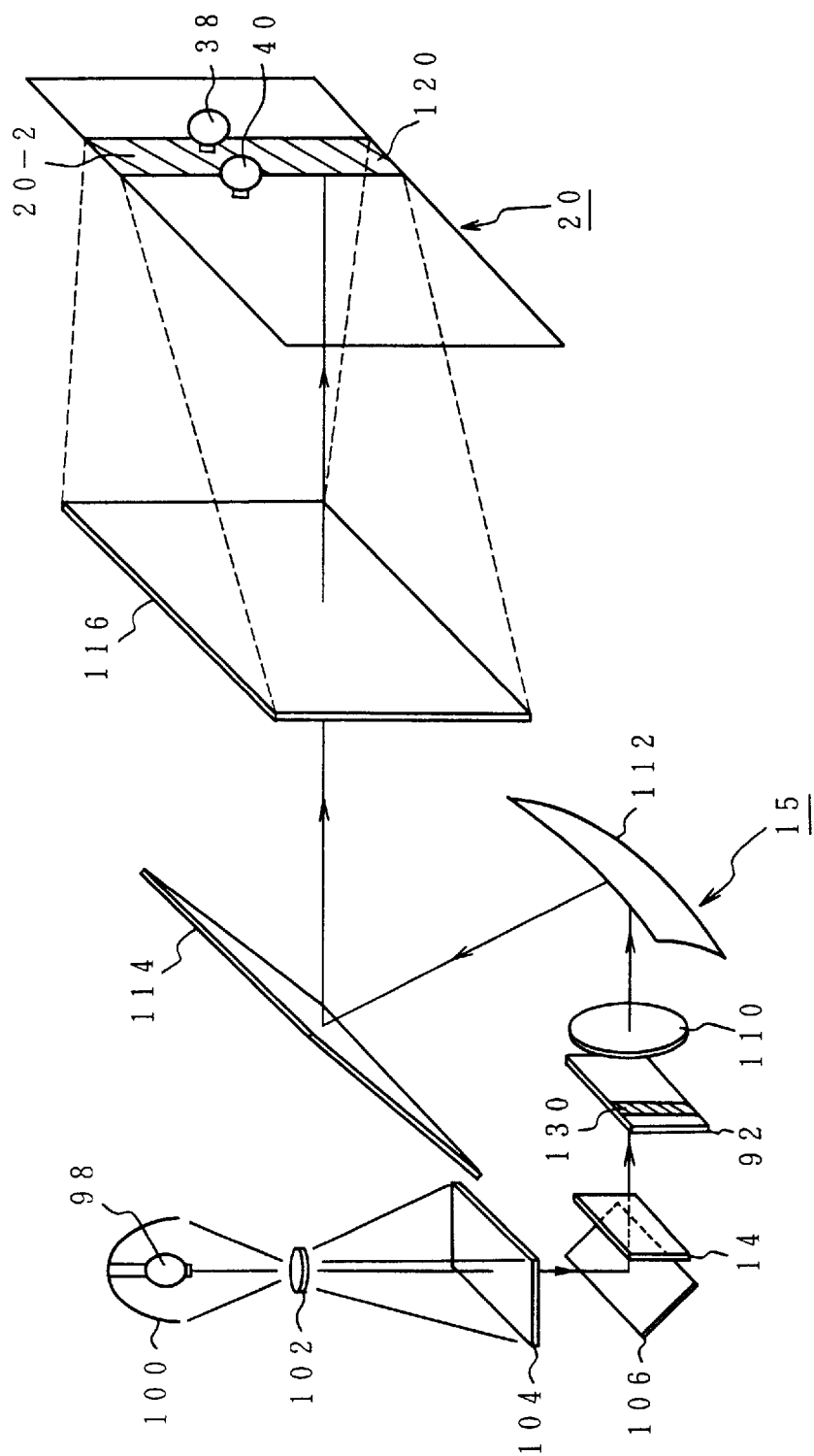
FIG. 22 is an explanatory diagram of the projection optical unit in FIG. 6 in a left-eye image projecting state by the time division.

FIG. 22 shows a timing when the right-eye image is displayed to the display 14 in the projection optical unit in FIG. 21 and an aperture 130 corresponding to the detecting position of the right eye 38 of the observer is set into the matrix liquid crystal shutter 92 synchronously with the display of the right-eye image. In this case, the convex Fresnel lens 116 forms a slit image 120 of the aperture 130 set as a transparent region of the matrix liquid crystal shutter 92 into the 3D observing region 20. The slit image 120 becomes a right-eye observing region 20-2. At the same time, since the image light of the right-eye image displayed on the display 14 is projected through the aperture 130 by the projecting lens 110, the observer can observe the right-eye image on the display 14 by only the right eye 38. Since the projection display of the left-eye image in FIG. 21 and the projection display of the right-eye image in FIG. 22 are repeated at a period of, for example, ¹⁄₁₂₀ second by the time division, the observer simultaneously observes parallax images seen from different observing point positions by the right and left eyes 38 and 40, so that he can observe a stereoscopic image by the parallax of both eyes.

Figure 23A:
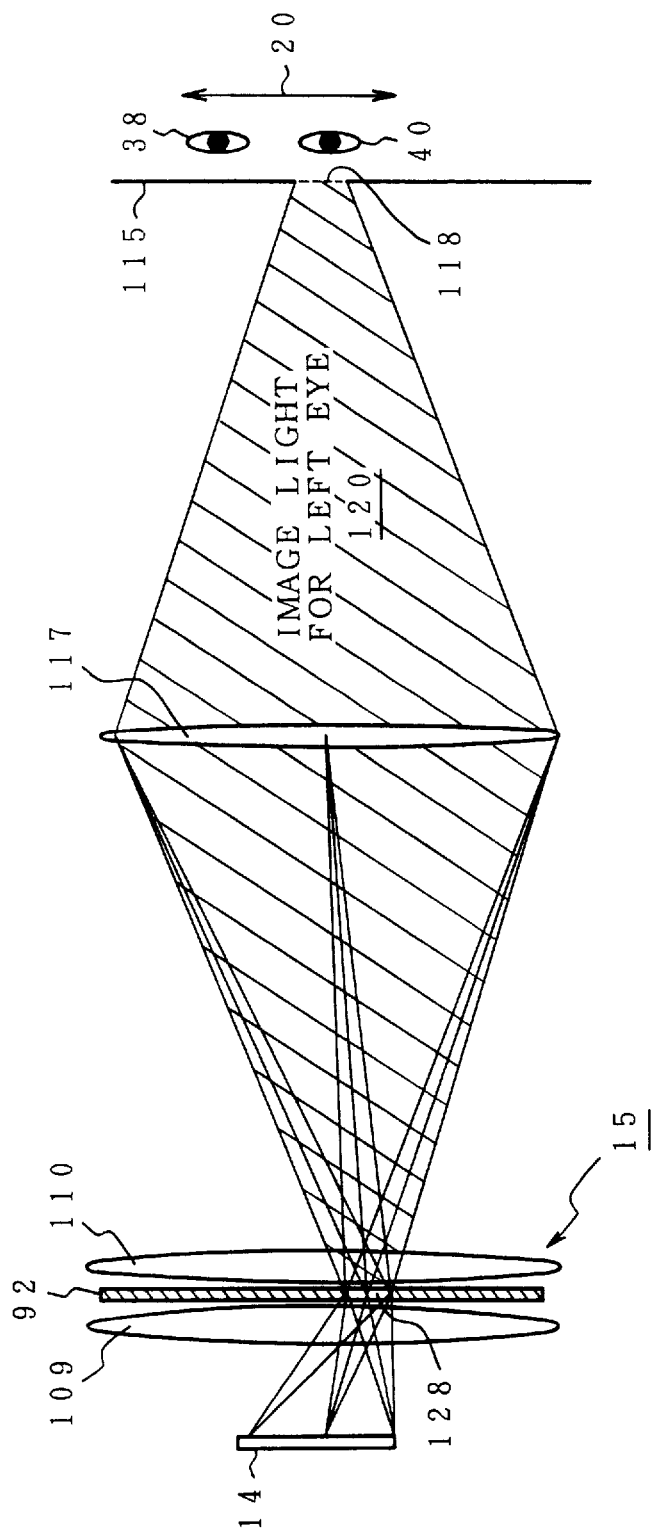
FIGS. 23A and 23B are explanatory diagrams of time division image projections by equalization optical systems in FIGS. 21 and 22.
Figure 23B:
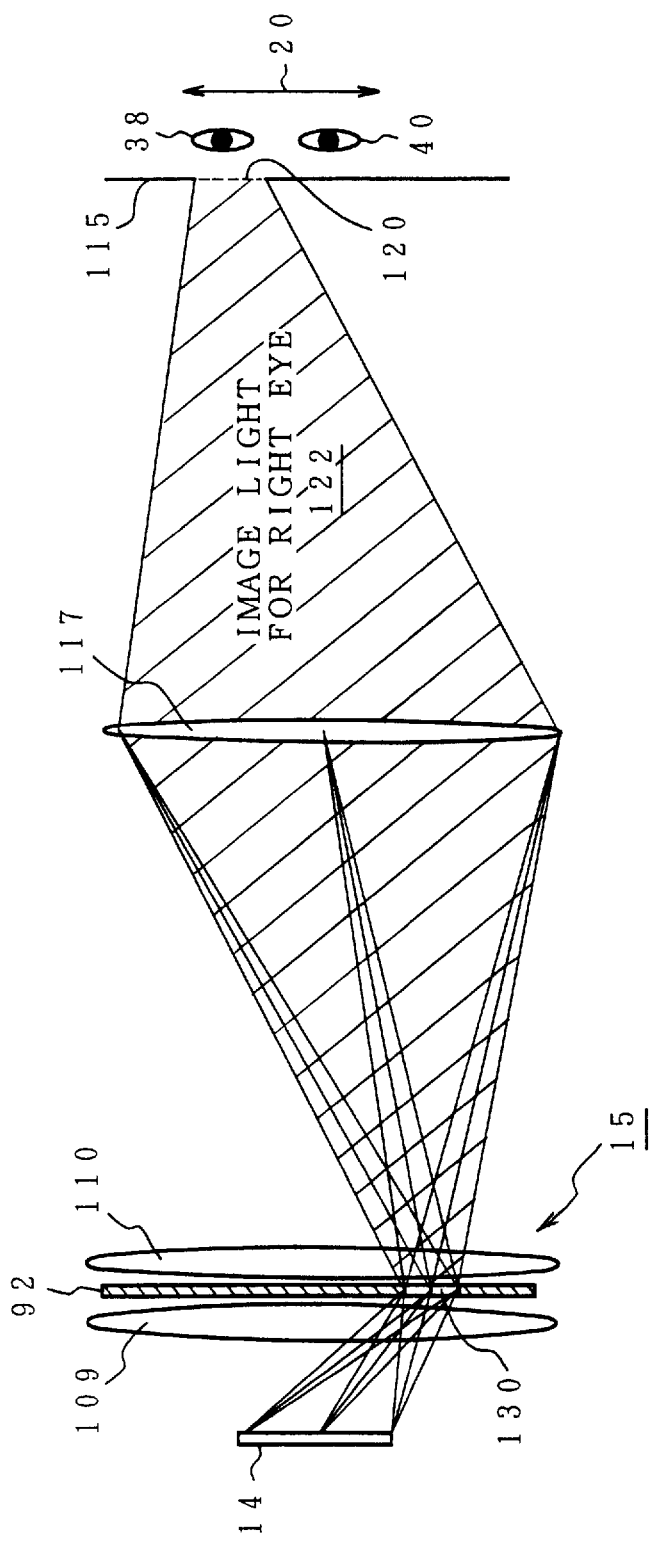

FIGS. 23A and 23B show equalization optical systems of the projection optical unit corresponding to display timings of the right- and left-eye images of FIGS. 21 and 22. FIG. 23A shows the equalization optical system corresponding to the image display for the left eye in FIG. 21. The left-eye image is displayed on the display 14. A transparent region to set the aperture 128 is driven and set into the matrix liquid crystal shutter 92 synchronously with the display of the left-eye image. In the projection lens unit 15, a pair of projecting lenses 109 and 110 are arranged in a form so as to sandwich the matrix liquid crystal shutter 92. A convex lens 117 is arranged as an equalization optical system of the convex Fresnel lens at the screen position. The video image light from the display 14 passes through the aperture 128 set in the matrix liquid crystal shutter 92 and is formed as an image onto the convex lens 117 serving as a screen position. The convex lens 117 forms the video image light as a slit image 118 on the surface of a sight region 115 set in the observing region of the aperture 128 of the matrix liquid crystal shutter 92. In this instance, the aperture 128 is set on the basis of the detecting position of the left eye 40 of the observer. Therefore, the aperture 128 is set so that the slit image 118 is positioned in front of the left eye 40. The observer, therefore, can observe the left-eye image on the display 14 by only the left eye 40. FIG. 23B shows a display state of the equalization optical system corresponding to the projection optical unit in the display state of the image for the right eye in FIG. 22. In this case, the right-eye image is displayed on the display 14. The aperture 130 is set into the matrix liquid crystal shutter 92 synchronously with the display of the right-eye image by driving and setting the transparent region. Therefore, the slit image 120 is formed in the sight region 115 of the observing region in correspondence to the position of the aperture 130 of the matrix liquid crystal shutter 92. Since the aperture 130 is set in correspondence to the detecting position of the right eye 38 of the observer, the slit image 120 of the aperture 130 is formed in front of the right eye 38 of the observer. Therefore, the observer can observe the right-eye image on the display 14 by only the right eye 38. Since the right- and left-eye images in FIGS. 23A and 23B as mentioned above are time-divisionally displayed at a high speed, the observer simultaneously observes the images at different observing point positions by the right eye 38 and left eye 40 and can observe a stereoscopic image by the parallax of both eyes. When the observer moves the positions of the eyes within a range of the 3D display region 20, the positions of the eyes of the observer are detected in a real-time manner. The set positions of the apertures 128 and 130 of the matrix liquid crystal shutter 92 are moved. The slit images 118 and 120 are always formed at positions just in front of the right eye 38 and left eye 40 of the observer, respectively. Further, the right- and left-eye images which are seen in accordance with the movement of the positions of the eyes of the observer are time-divisionally displayed on the display 14. Therefore, the observation of a stereoscopic image having a kinematic parallax can be realized for a display object.

Figure 24:
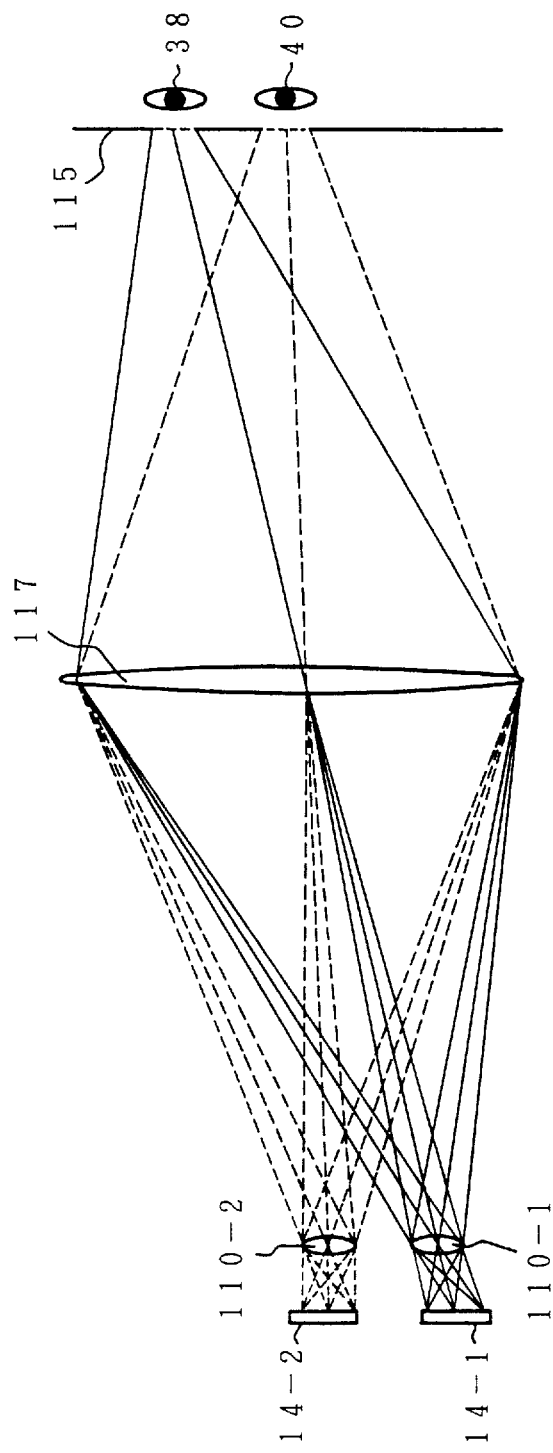
FIG. 24 is an explanatory diagram of a projection optical system using two projectors corresponding to the equalization optical system in FIG. 23.

It will be understood that the equalization optical systems in the stereoscopic display of the invention shown in FIGS. 23A and 23B realize the stereoscopic display function that is equivalent to the operation such that images are projected and displayed by two projectors as shown in FIG. 24. FIG. 24 shows a case where a projector for the right eye having a display 14-1 and a projection lens 110-1 and a projector for the left eye having a display 14-2 and a projection lens 110-2 are provided and each projector is moved in the lateral direction and the front/rear direction in accordance with the detecting positions of the right eye 38 and left eye 40 of the observer. Therefore, the right-eye image is projected at the position of the right eye 38 of the observer and the left-eye image is projected at the position of the left eye 40, so that a stereoscopic display can be always realized. According to the invention, such a function using the two projectors can be easily realized by using the fixed optical system as shown in FIG. 23.

Figure 25:
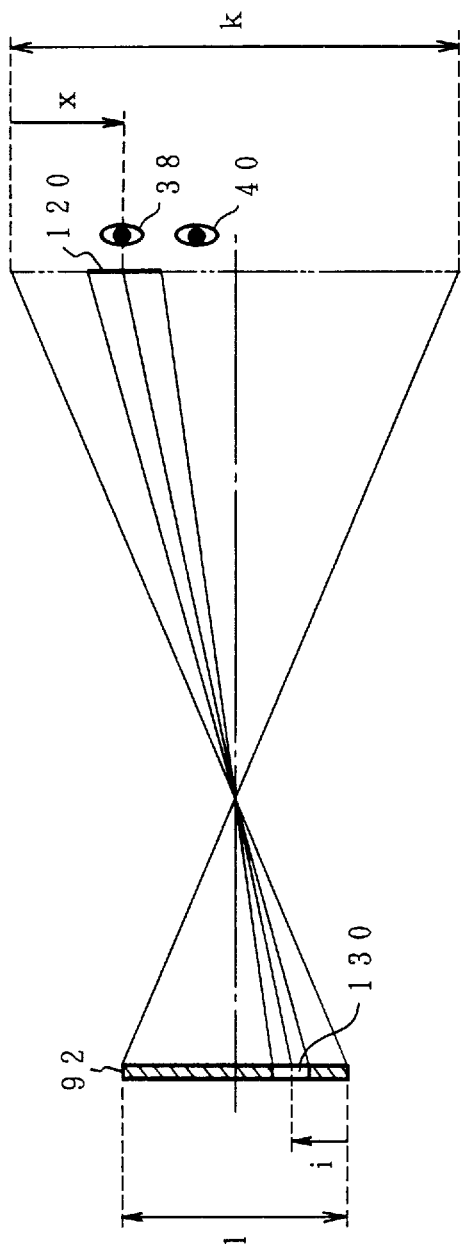
FIG. 25 is an explanatory diagram of a correlating relation between the detecting position of the observer and the aperture position.

FIG. 25 is an explanatory diagram of a setting control of the aperture in the matrix liquid crystal shutter 92 corresponding to the detecting positions of the eyes of the observer in the projection optical unit of the invention. A case where the aperture 130 corresponding to the detecting position of the right eye 38 of the observer is set into the matrix liquid crystal shutter 92 is shown as an example. According to the projection optical unit of the invention, the aperture 130 of the matrix liquid crystal shutter 92 forms the slit image 120 as shown in the diagram onto the sight region 115 as a virtual plane set in the observing region. A width of slit image 120 is determined by an enlargement magnification K of the aperture 130. That is, now assuming that a lateral width of the matrix liquid crystal shutter 92 is set to 1 and a width of sight region 115 of the observing region is set to K, the aperture 130 forms the slit image 120 having a width that is K times as large as the lateral width of the aperture 130 of the shutter 92 in the sight region 115. It is necessary that the width of slit image 120 is set to a width of a certain extent because, for example, it is necessary that the image light is projected to the right eye 38 and the image light is not projected to the left eye 40 and it is necessary to make it assure the observation of a stereoscopic image by the slight motion of the eyes in the lateral direction of the observer.

Figure 26:
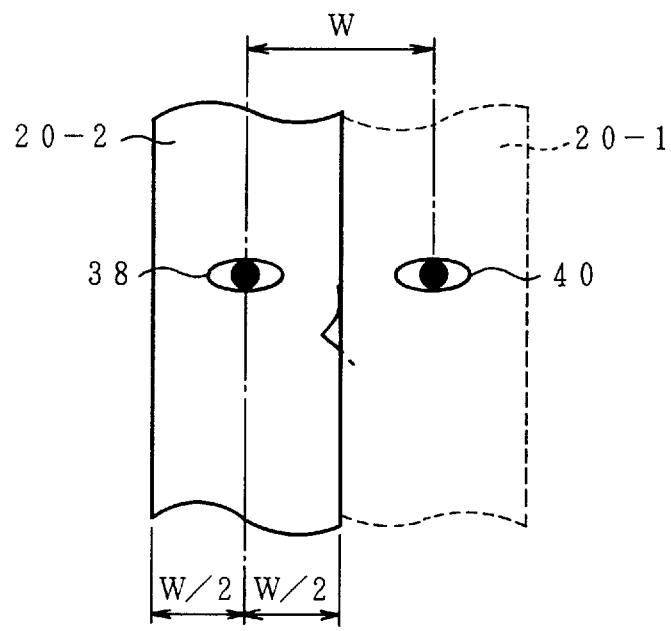
FIG. 26 is an explanatory diagram of a projecting region for an interval between the eyes of the observer.

FIG. 26 shows an example of the lateral width of slit image 120. It has been known that the interval W between the right eye 38 and left eye 40 of the observer statistically lies within a range from 32.5 mm to 97.5 mm. Therefore, it is assumed that the width of slit image 120 lies within the right-eye observing region 20-2 having a width of W/2 to the right and left from the center of the right eye 38. Similarly, with regard to the left eye 40 as well, the left-eye observing region 20-1 having a width of W/2 to the right and left from the center of the left eye is set as shown by a broken line. By providing the width of slit image for the right and left eyes as mentioned above, even if the eyes are moved in a range of ±W/2, the observer can observe a stereoscopic image without needing to detect the positions of the eyes within such a range. It is sufficient that a detecting resolution of the observer position detecting apparatus of the invention can satisfy W/2, thereby enabling a margin of the detection of the observer position to be raised. It will be also obviously understood that the width of slit image is not limited to W/2 but, for instance, the aperture can be set so as to set a narrow range corresponding to about a width of eye by raising a detecting precision.

Figure 27:
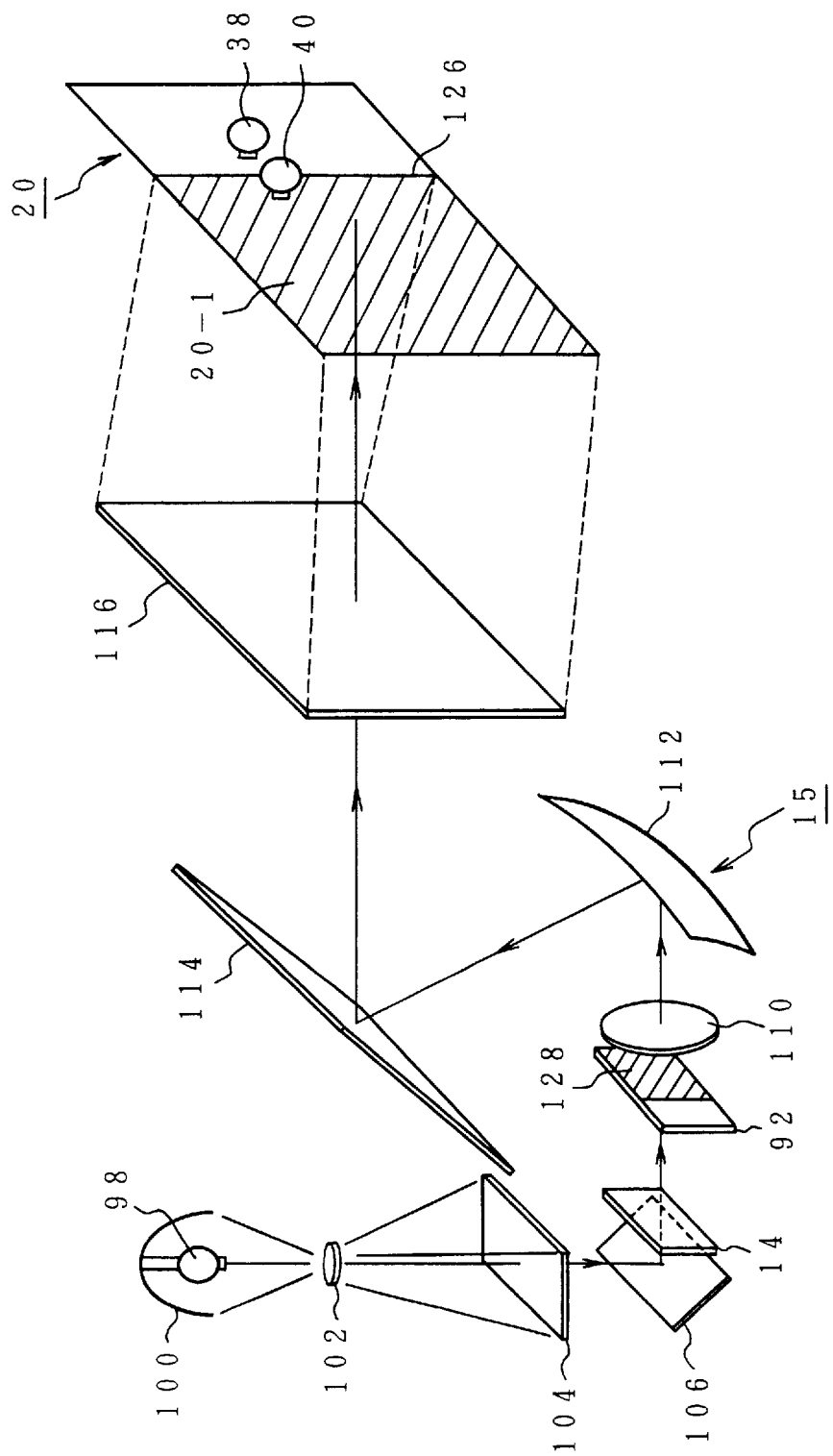
FIG. 27 is an explanatory diagram of the projection optical unit in FIG. 6 in the left-eye image projecting state by the time division which enables a stereoscopic image and a 2-dimensional image to be observed.

FIG. 27 shows a display state of the left-eye image by the setting of another aperture in the projection optical unit of the invention for performing a time-division stereoscopic display. In the embodiment, the aperture 128 is set into the matrix liquid crystal shutter 92 so that the whole region on the left side of a center position 126 of both eyes of the observer in the 3D observing region 20 is set to the left-eye observing region 20-1.

Figure 28:
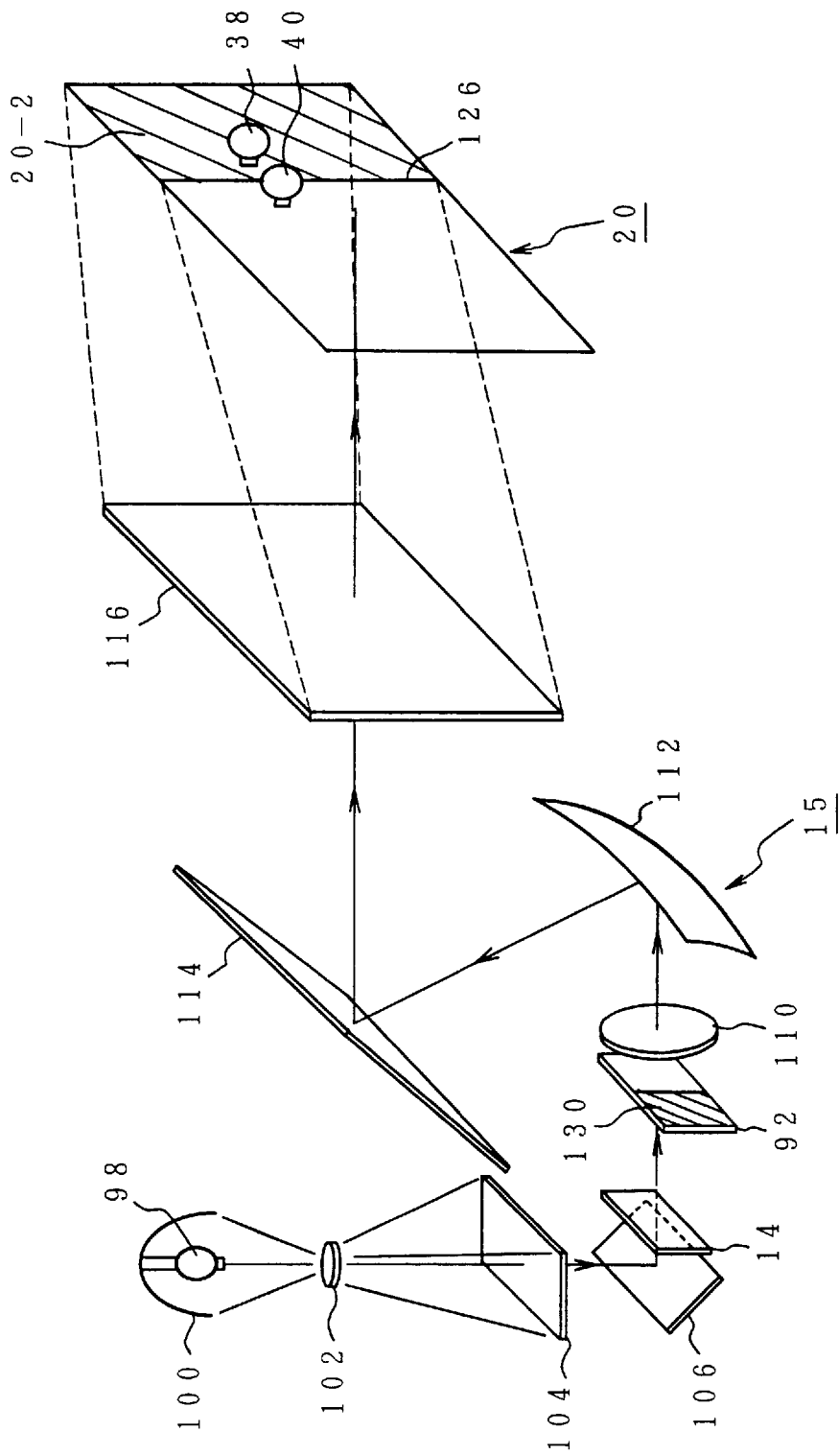
FIG. 28 is an explanatory diagram of the projection optical unit in FIG. 6 in the right-eye image projecting state by the time division which enables a stereoscopic image and a 2-dimensional image to be observed.

FIG. 28 shows a timing when switching to the display state of the right-eye image with regard to the embodiment of FIG. 27. In this case, the aperture 130 is set into the matrix liquid crystal shutter 92 so that the whole region on the right side of the center position 126 of both eyes in the observer of the 3D observing region is set to the right-eye observing region 20-2.

Figure 29A:
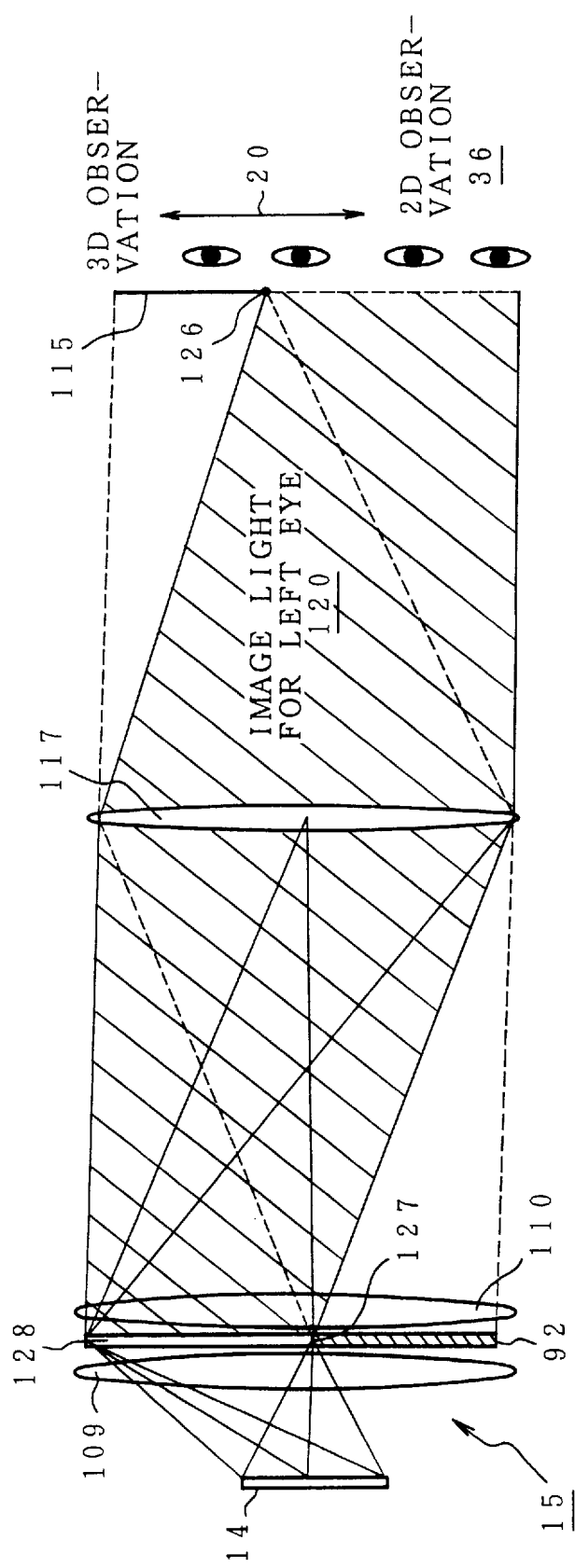
FIGS. 29A and 29B are explanatory diagrams of space-division image projections by equalization optical systems in FIGS. 27 and 28.
Figure 29B:
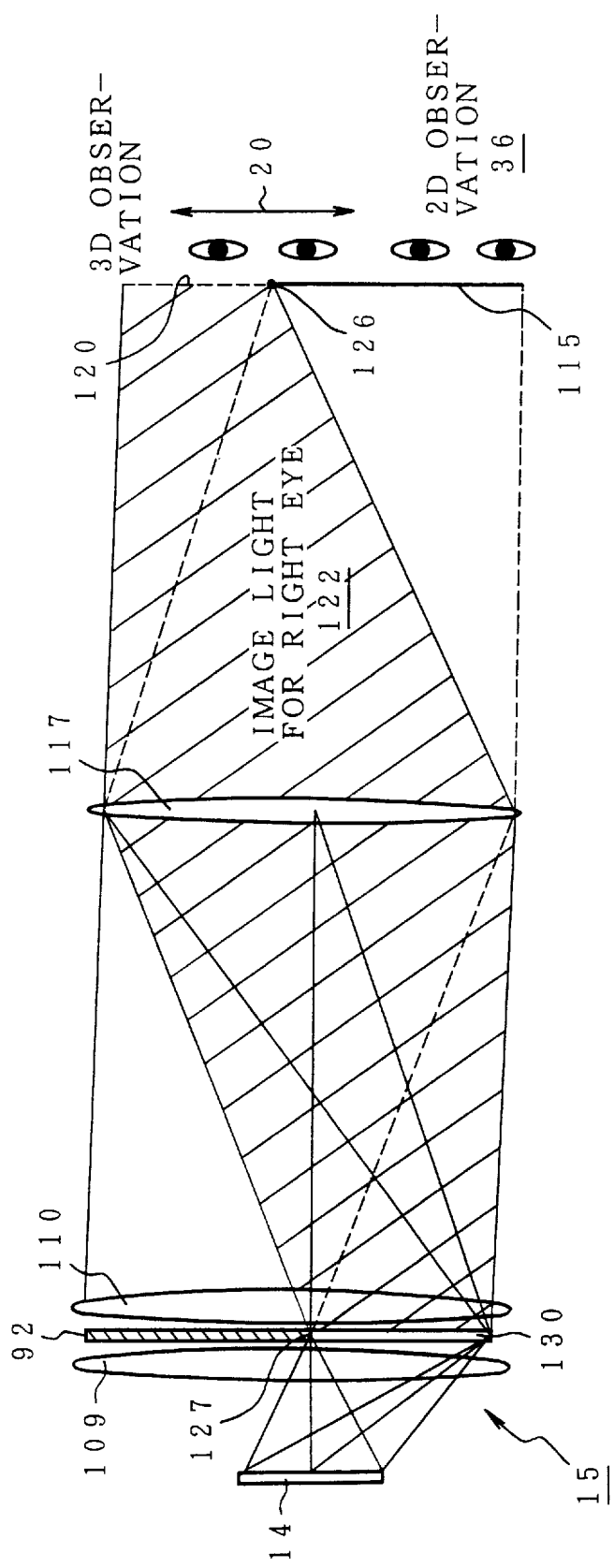

FIGS. 29A and 29B show equalization optical systems corresponding to FIGS. 27 and 28. Namely, FIG. 29A shows a display state of an image for the left eye. On the basis of the detection information of the center position 126 of both eyes of the observer as a detection target of the 3D observing region 20, the aperture 128 is set while setting the whole region on the left side toward the screen side of a corresponding point 127 of the matrix liquid crystal shutter 92 into a transparent state. Therefore, in not only the 3D observing region 20 but also the 2D observing region 36 on the left side, by receiving an image light 123 for the left eye, the left-eye image on the display 14 can be observed. FIG. 29B shows the equalization optical system corresponding to the display state of the image for the right eye in FIG. 28. The aperture 130 is set while setting the whole region on the right side toward the screen of the corresponding point 127 of the matrix liquid crystal shutter 92 corresponding to the center position 126 of both eyes serving as an observation target of the stereoscopic display into a transparent state. By setting the aperture 130 as mentioned above, an image light 122 for the right eye is projected into the whole region on the right side of the center position 126 of both eyes. Even on the right side exceeding the 3D observing region 20, the right-eye image by the projection of the image light 122 for the right eye can be observed. By setting the aperture 128 of the right-eye image and the aperture 130 of the left-eye image as shown in FIGS. 29A and 29B, the observer as a detection target of the observer position locating in the 3D observing region 20 simultaneously observes the images for the right and left eyes by the right and left eyes, so that he can observe a stereoscopic image by the parallax of both eyes. With respect to the observers other than the observer who observes the stereoscopic display, for instance, when observing on the left side of the 3D observing region 20, only the image light 123 for the left eye from the display 14 by the setting of the aperture 128 is observed as shown in FIG. 29A, so that a 2-dimensional image by the image for the left eye can be observed. When the other observer observes on the right side of the 3D observing region 20, as shown in FIG. 29B, the image is influenced by the projection of the image light 122 for the right eye and only a 2-dimensional image by the right-eye image displayed on the display 14 can be observed. That is, with regard to the observers other than the observer as a target of the detection of the observer position of the invention existing in the 3D observing region 20, by looking at the same screen, a 2-dimensional image by the right- or left-eye image can be clearly observed.

Figure 30:
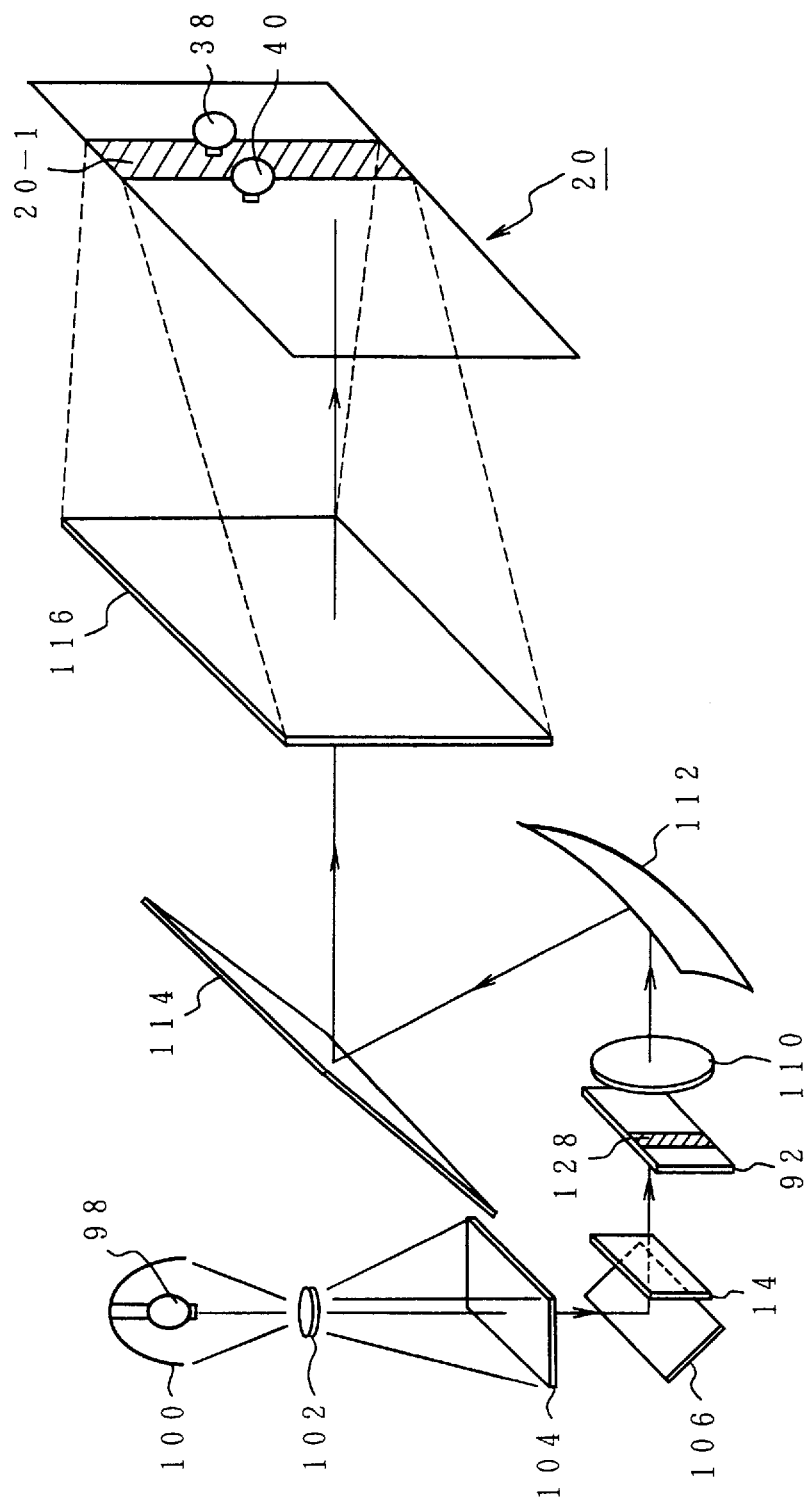
FIG. 30 is an explanatory diagram of the projection optical unit in FIG. 6 in the right-eye image projecting state by the time division which enables a stereoscopic image to be observed.
Figure 31:
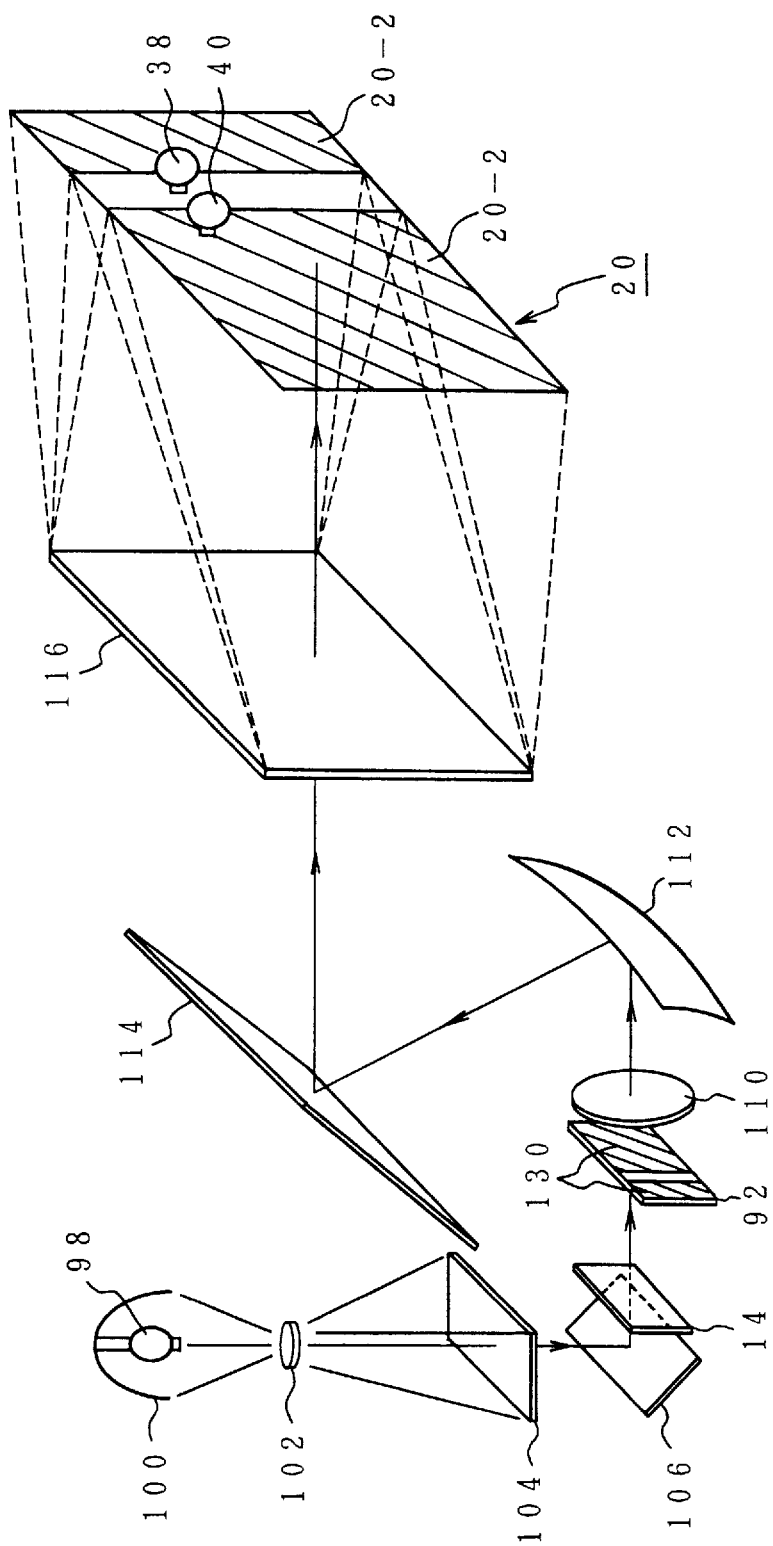
FIG. 31 is an explanatory diagram of the projection optical unit in FIG. 6 in the left-eye image projecting state by the time division which enables a stereoscopic image and a 2-dimensional image to be observed.

FIGS. 30 and 31 show other display states by the projection optical system for simultaneously observing a stereoscopic image and a 2-dimensional image. In the display state of the left-eye image in FIG. 30, the aperture 128 is set to the position corresponding to the left eye 40 of the observer and the left-eye observing region 20-1 is set by a narrow width, thereby enabling the left-eye image on the display 14 to be observed by only the left eye 40 of the observer in the 3D observing region. On the other hand, as for the display of the right-eye image in FIG. 31, the aperture 130 is set into the matrix liquid crystal shutter 92 so that the whole region excluding the left-eye observing region 20-1 in FIG. 30 is set to the right-eye observing region 20-2. Thus, with respect to the observers other than the observer who can stereoscopically observe and who is a detection target of the observer position in the 3D observing region, only the 2-dimensional image by the right-eye image according to the display state in FIG. 31 can be observed with regard to any position.

Figure 32B:
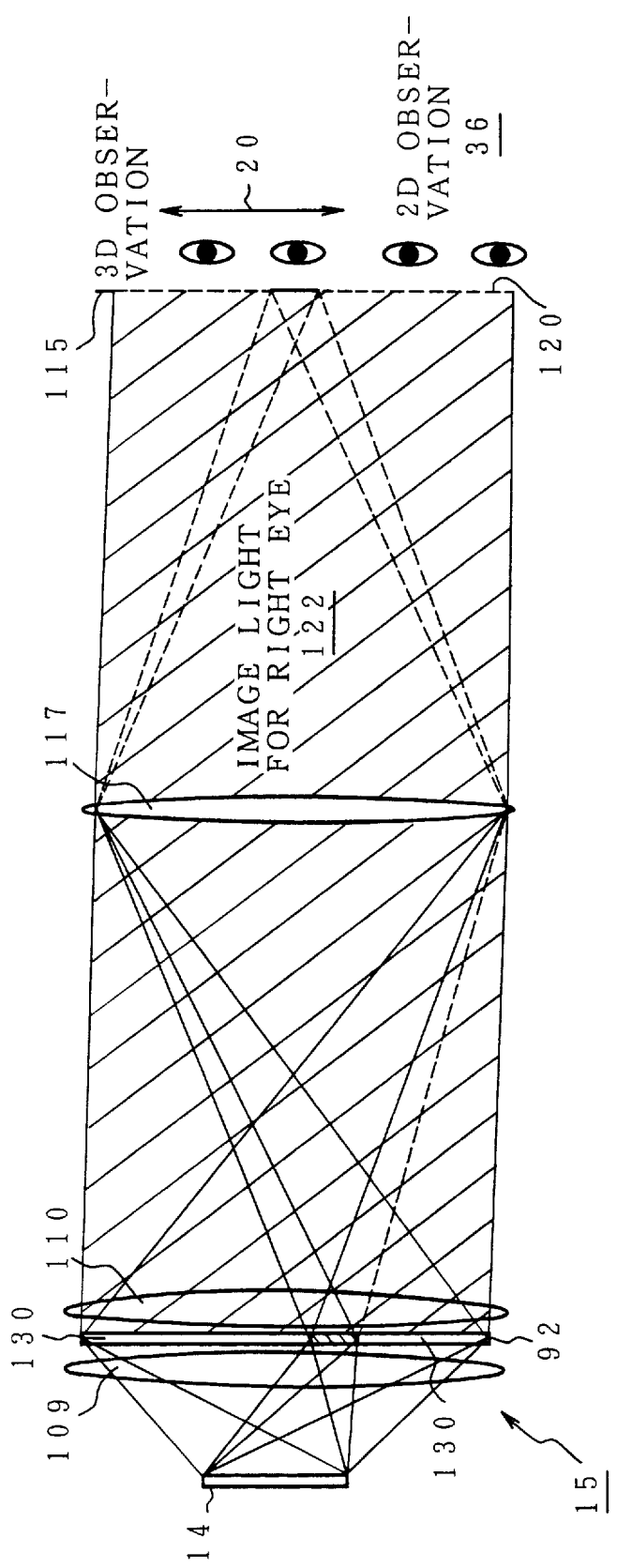

FIGS. 32A and 32B show equalization optical systems in the projection optical units of FIGS. 30 and 31. FIG. 32A shows the display state of the image for the left eye. FIG. 32B shows the display state of the image for the right eye. That is, as for the display state of the image for the left eye in FIG. 32A, the slit image 118 is projected to the position of the left eye of the observer in the 3D observing region 20 by the setting of the aperture 128. On the other hand, in the display state of the image for the right eye in FIG. 32B, the aperture 130 is set by setting the matrix liquid crystal shutter 92 into the transparent state so that the slit images 120 and 120 for the right eye are formed in the whole region excluding the slit image 118 for the left eye.

FIG. 33 shows an embodiment of a projection optical unit of the invention which enables an aperture setting control according to the movement of the observer in the front/rear direction in the stereoscopic display by the time division. In the projection optical unit, as an aperture setting device that is provided in front of the projecting lens 110, a stacked shutter 134 in which a plurality of matrix liquid crystal shutters 92 each of which was used as an aperture setting device in FIG. 20 are stacked in the optical axial direction is used. When setting the aperture of the stacked shutter 134, a corresponding specific matrix liquid crystal shutter is selected on the basis of the position in the front/rear direction of the observer, namely, the detecting position of a coordinate value z and the aperture corresponding to the observer detecting position in the lateral direction at that time is set. With respect to the other plurality of matrix liquid crystal shutters, the whole region is controlled in the transparent state.

FIG. 34 shows an equalization optical system of FIG. 33. In the equalization optical system, for example, five matrix liquid crystal shutters 92-1 to 92-5 are stacked as a stacked shutter 134. In correspondence to the positions in the front/rear direction of the matrix liquid crystal shutters 92-1 to 92-5 of the stacked shutter 134, slit image forming surfaces 132-1 to 132-5 are set in the front/rear direction in the 3D observing region. The slit image forming surfaces are determined between the matrix liquid crystal shutters 92-1 to 92-5 by the convex lens 117 provided at the screen position and the slit image forming surfaces 132-1 to 132-5 so that the image forming distances are always equalized for a change in aperture position in the front/rear direction. That is, the slit image forming surface 132-1 exists in correspondence to the frontmost matrix liquid crystal shutter 92-1. The innermost slit image forming surface 132-5 exists in correspondence to the rearmost matrix liquid crystal shutter 92-5. Therefore, on the basis of the position, namely, coordinate value z in the front/rear direction of the observer existing in the 3D observing region 20, any one of the matrix liquid crystal shutters 92-1 to 92-5 in the stacked shutter 134, for example, the matrix liquid crystal shutter 92-3 is selected. Likewise, the aperture is set to the position in the lateral direction in correspondence to the detecting position of the right or left eye based on the position detection of the observer in the lateral direction. Thus, a slit image of the aperture is formed on the slit image forming surface 132-3, thereby enabling the observer to observe a stereoscopic image by the parallax of both eyes. As for the aperture setting control according to the detecting position in the depth direction of the observer, the time-divisional processes of the image display for the right and left eyes of any one of FIGS. 23, 29, and 32 can be applied. When the displaying process of FIG. 29 or 32 is applied, a 2-dimensional image can be observed in the 2D observing region 36 other than the 3D observing region 20.

Figure 35:
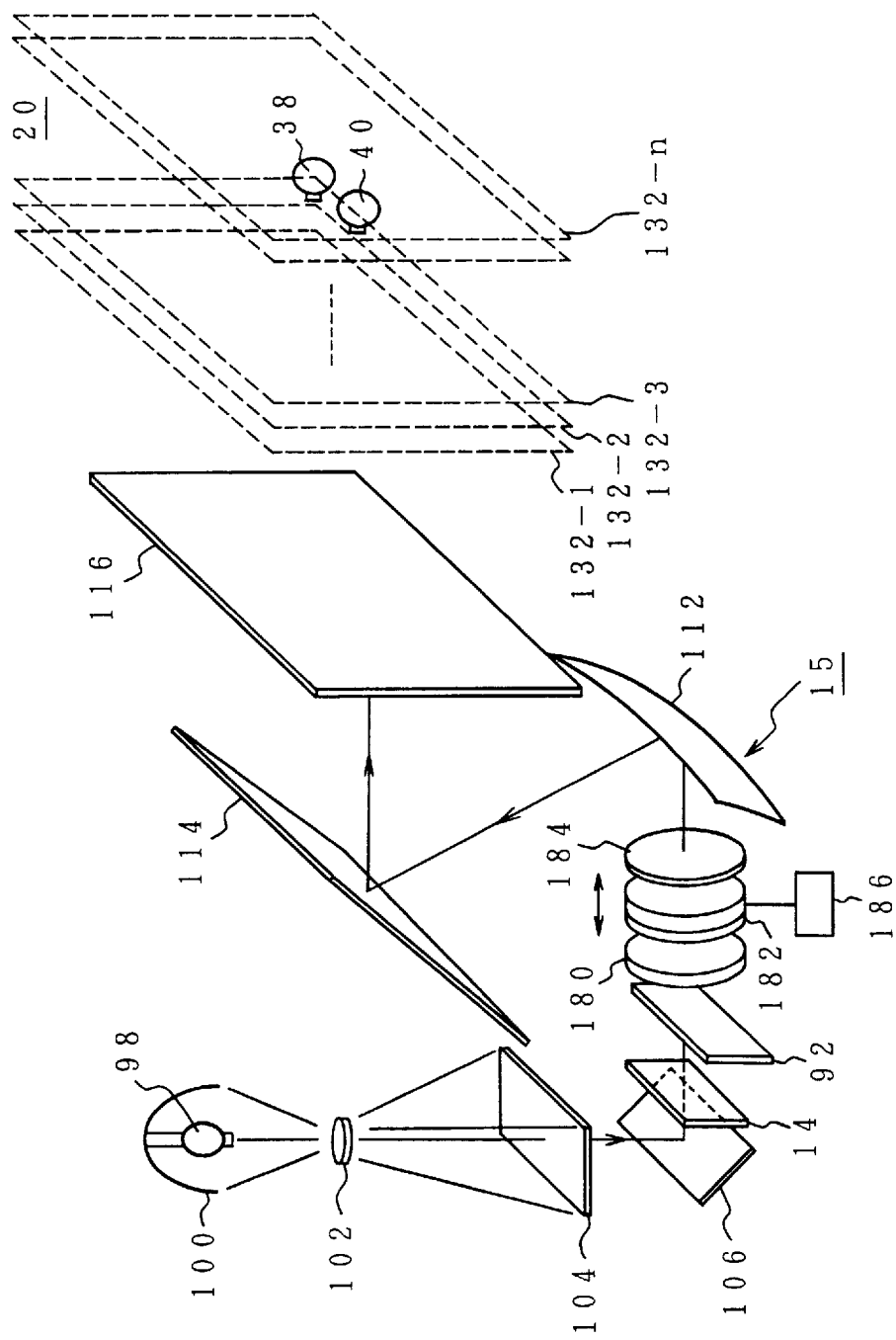
FIG. 35 is an explanatory diagram of the projection optical unit in FIG. 6 by the time division in which the aperture position is controlled in the front and rear direction by the driving of a projection lens.

FIG. 35 shows another embodiment of a projection optical unit for realizing the aperture setting according to the position detection in the front/rear direction of the observer.

In the embodiment, by providing a movable lens for the projection lens and changing a focal distance, a stereoscopic display according to the motion in the depth direction of the observer can be performed. As a projection lens unit 15, a movable lens 182 which is movable in the optical axial direction by an actuator 186 is provided between the fixed projection lenses 180 and 184. By moving the movable lens 182 in the optical axial direction by the actuator 186, the setting in the front/rear direction like slit image forming surfaces 132-1 to 132-n can be performed in the 3D observing region.

Figure 36:
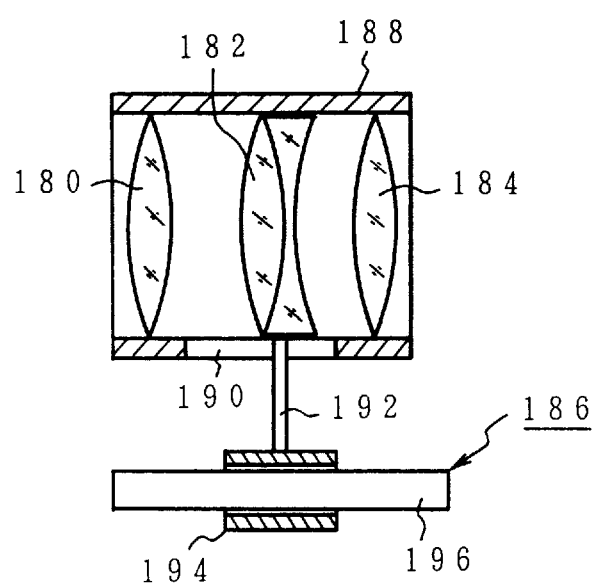
FIG. 36 is an explanatory diagram of a driving mechanism of the projection lens in FIG. 35.

FIG. 36 shows an embodiment of the projection lens unit 15 whose focal distance can be varied in FIG. 35 and is characterized in that a VCM having a linear motor structure is used as an actuator. Fixed lenses 180 and 184 are attached on the aperture portion side of a lens enclosing tube 188 and the movable lens 182 is assembled between them so as to be slidable in the optical axial direction. The movable lens 182 is attached to an arm 192. The arm 192 is attached to a VCM coil 194 of the actuator 186 through a guide slit 190 which is opened in the axial direction. The VCM coil 194 is slidably attached to a yoke 196 fixedly attached in the optical axial direction. Therefore, by supplying a current to the VCM coil 194, a real circuit is formed between the VCM coil 194 and the yoke 196. The VCM coil 194 can be moved in the front/rear direction. Thus, the movable lens 182 is moved in the optical axial direction in the lens enclosing tube 188 and a focal distance can be changed.

Figure 37A:
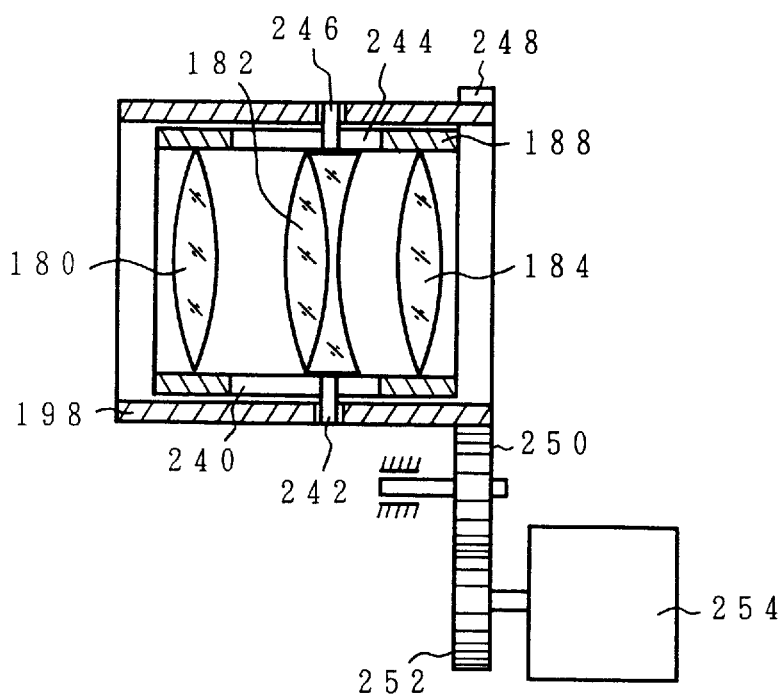
FIGS. 37A and 37B are explanatory diagrams of another driving mechanism of the projection lens in FIG. 35.
Figure 37B:
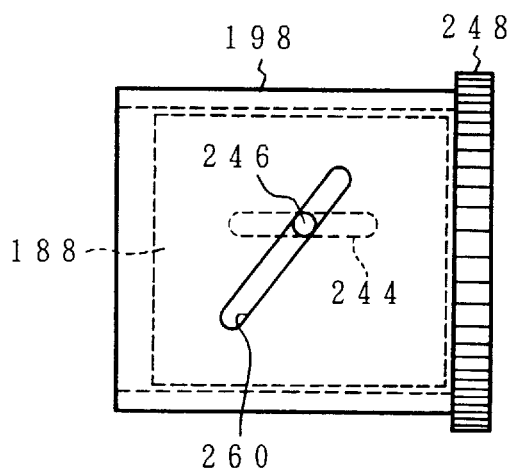

FIGS. 37A and 37B show another embodiment of the projection lens unit 15 in FIG. 35. In the embodiment, as shown in FIG. 37A, the lens enclosing tube 188 having the fixed lenses 180 and 184 and movable lens 182 is enclosed in an outer tube 198. For example, pins 242 and 246 are fixed to the movable lens 182, for instance, at symmetric positions in the radial direction. The pins 242 and 246 are fitted into slits of the outer tube 198 locating on the outside through slits 240 and 244 formed in the optical axial direction of the lens enclosing tube 188. As shown in FIG. 37B, the slit of the outer tube 198 is a slit 260 formed obliquely for the optical axis. Further, an external gear 248 is formed on an outer periphery at one end of the outer tube 198. The external gear 248 is in engagement with a drive gear 252 of a motor 254 through an intermediate gear 250. When the drive gear 252 is rotated by the motor 254, the rotation is transferred to the external gear 248 through the intermediate gear 250, so that the outer tube 198 rotates. Although the lens enclosing tube 188 enclosed in the outer tube 198 moves in the axial direction, the motion in the rotating direction is restricted. Therefore, in association with the rotation of the outer tube 198, the pin fixed to the movable lens 182, for example, the pin 246 in FIG. 37B is moved in the axial direction along the slit 244 by the motion due to the rotation of the slit 260, thereby moving the movable lens 182. The focal distance can be changed by the movement of the movable lens 182 in the optical axial direction as mentioned above.

Figure 38:
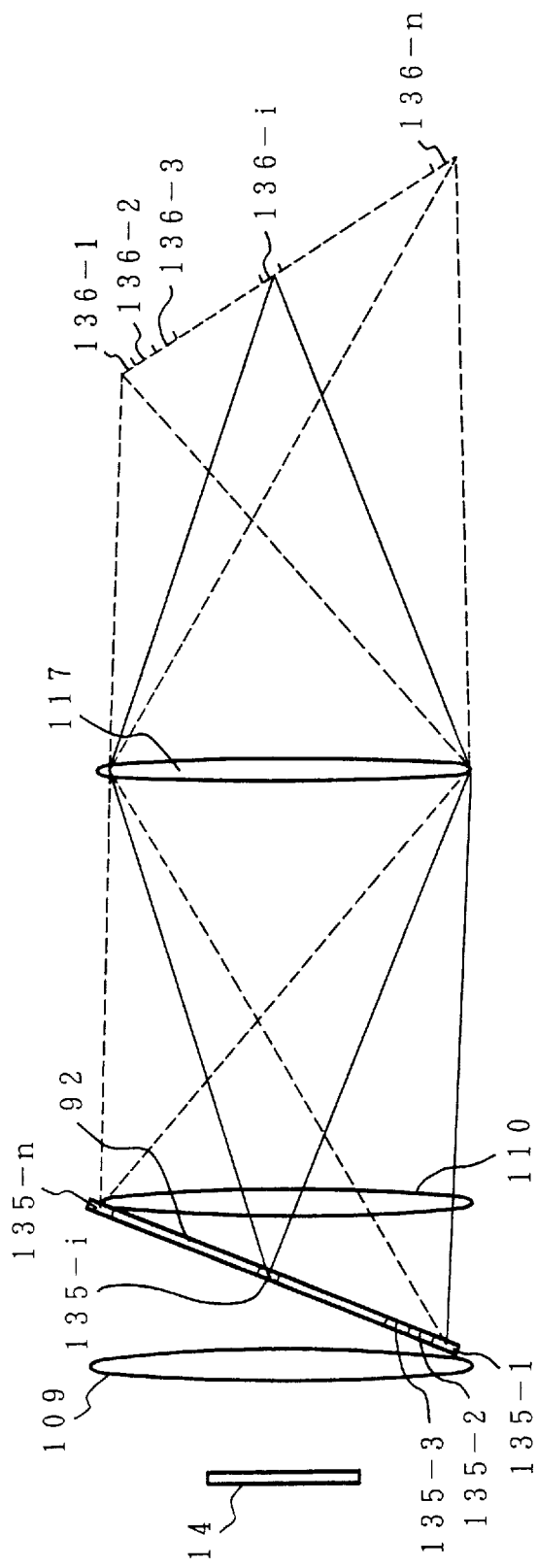
FIG. 38 is an explanatory diagram of the equalization optical system of the projection optical unit in FIG. 6 by the time division in which a stacked shutter is obliquely arranged and the aperture position is controlled in the front and rear direction.

FIG. 38 shows another embodiment of the aperture setting control by the position detection in the front/rear direction of the observer and shows an equalization optical system of the actual projection optical unit in a state where it is seen from the side surface of the equalization optical system. The embodiment is characterized in that the matrix liquid crystal shutter 92 is arranged between the projecting lenses 109 and 110 so as to be oblique in the front/rear direction for the optical axis.

Figure 39:
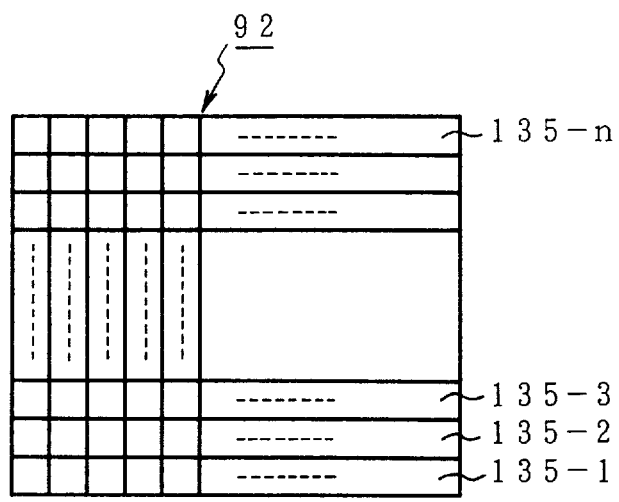
FIG. 39 is a front view of the shutter in FIG. 38.

FIG. 39 is a front view of the matrix liquid crystal shutter 92 in FIG. 38. Aperture setting regions are divided into horizontal stripe aperture regions 135-1 to 135-n from the lower side. Distances in the optical axial direction of the horizontal stripe aperture regions are different for the convex lens 117 at the screen position. Therefore, slit image forming regions 131-1 to 131-n having positions which are different in the optical axial direction are set into the observing region.

Figure 40:
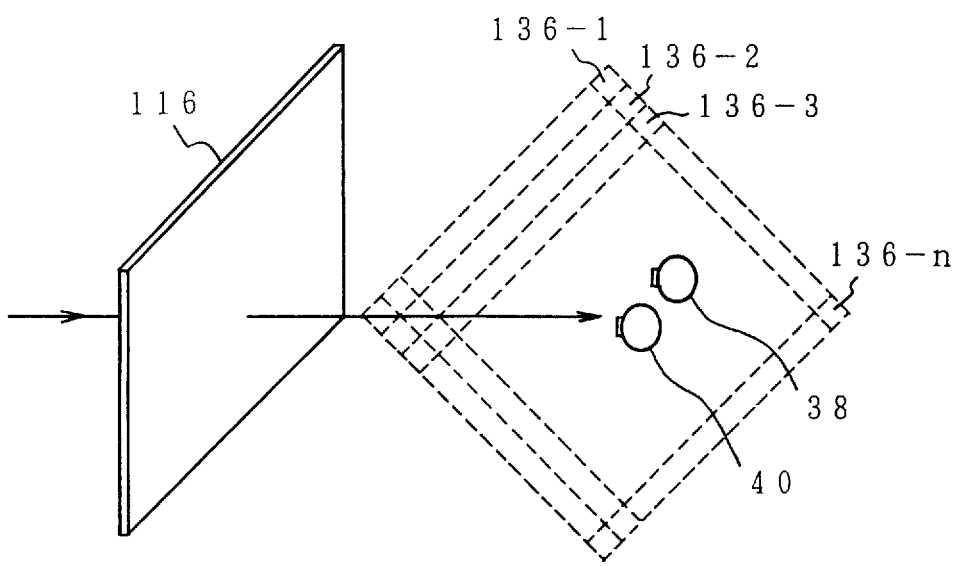
FIG. 40 is an explanatory diagram of a movement in the front and rear direction of a slit image in an observing region in an actual optical system in which a convex Fresnel lens is used at a screen position in FIG. 38.
Figure 41:
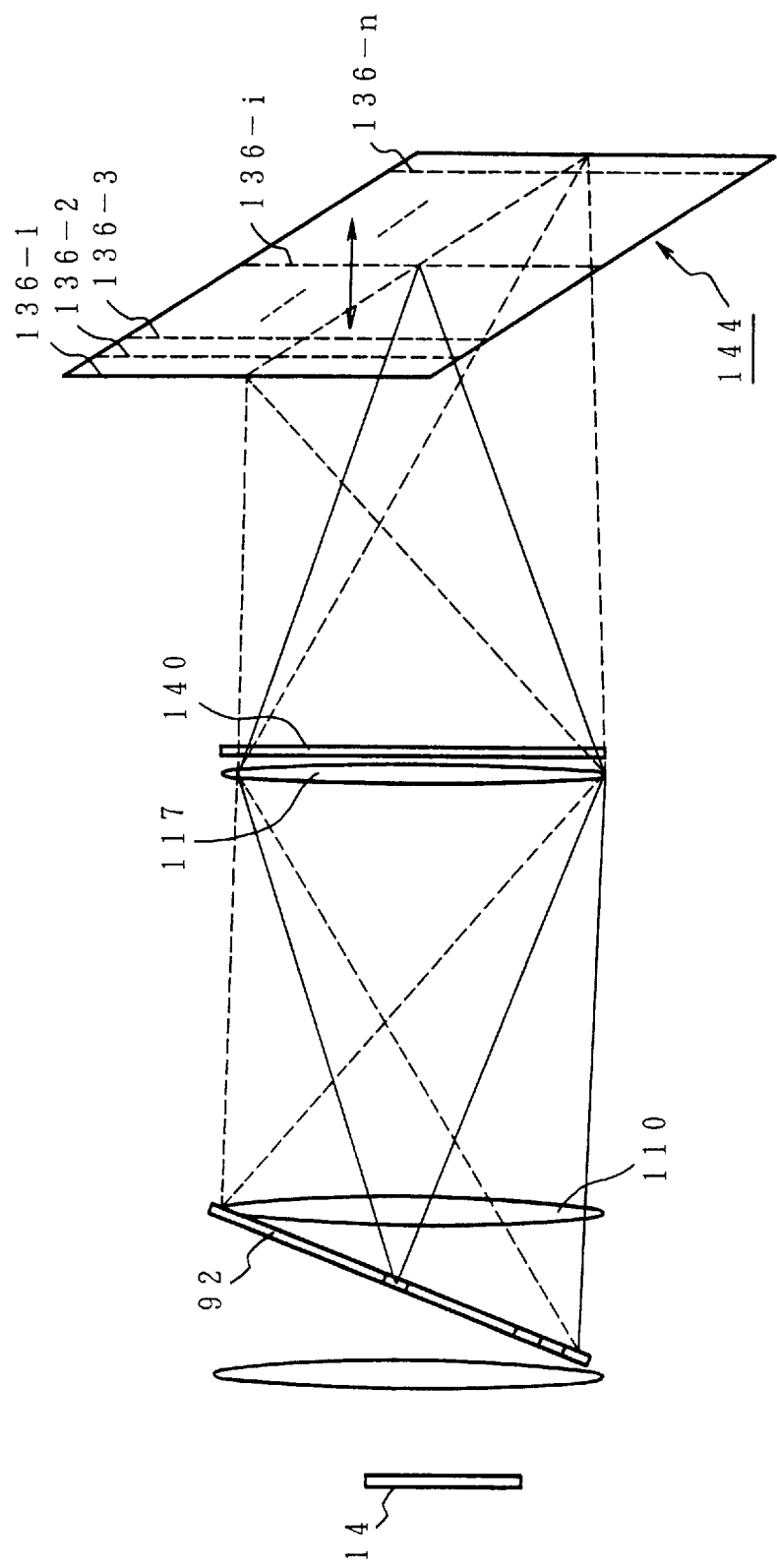
FIG. 41 is an explanatory diagram in which a vertical diffusion plate is provided for the convex lens in FIG. 38 and a sight region is enlarged in the vertical direction in the observing region.
Figure 42:
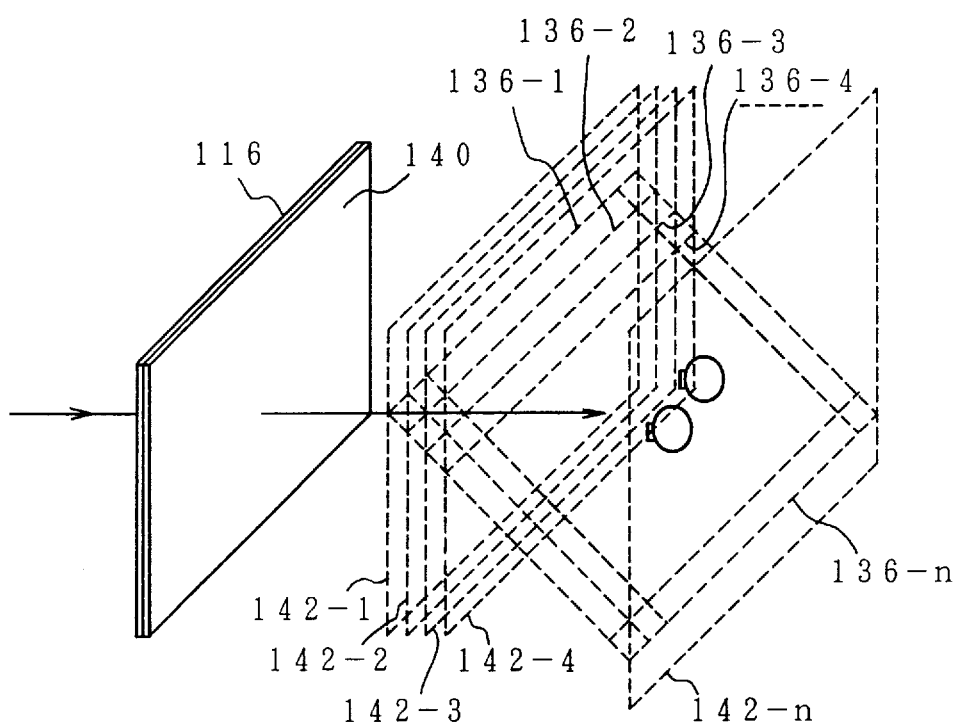
FIG. 42 is an explanatory diagram of an enlargement of the sight region in the vertical direction in the case where

FIG. 40 is an explanatory diagram on the screen side in the actual projection optical unit. Slit image forming regions 136-1 to 136-n which are arranged obliquely in the front/rear direction for the optical axial direction are formed at image forming positions of the convex Fresnel lens 116 to realize the convex lens 117 in FIG. 38. However, each of the slit image forming regions 136-1 to 136-n in FIG. 40 is an extremely narrow range with respect to the vertical direction. If a region is out of such a range, a stereoscopic image cannot be observed. In the actual apparatus, accordingly, as shown in FIG. 41, a vertical diffusion plate 140 is provided near the convex lens 117, the slit image forming regions 136-1 to 136-n are enlarged in the vertical direction, and an effective region 143 is formed. FIG. 42 shows the convex Fresnel lens 116 side of the actual projection optical unit in FIG. 41 and the vertical diffusion plate 140 is provided in accordance with the convex Fresnel lens 116. Since the vertical diffusion plate 140 is provided, the oblique slit image forming regions 136-1 to 136-n of a narrow width in FIG. 40 can be converted into vertical enlarging regions 142-1 to 142-n enlarged in the vertical direction. A stereoscopic observation in which the necessary region in the vertical direction is set to the effective region can be realized for the movement in the front/rear direction of the observer.

[Projection aperture control by space division]

Figure 43:
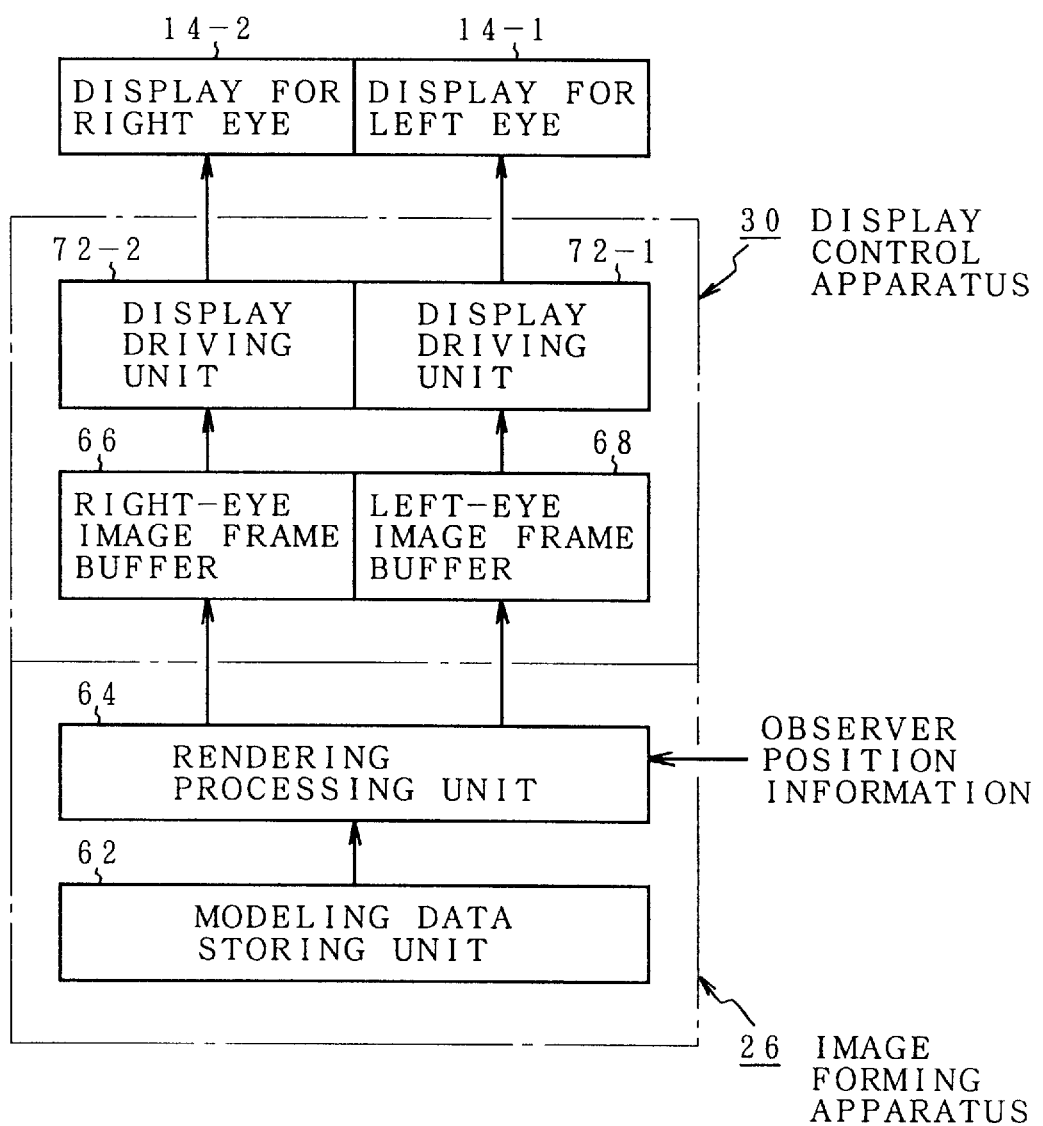
FIG. 43 is a block diagram of the image forming apparatus and the display control apparatus in FIG. 6 by the space division.

FIG. 43 is a block diagram of the image forming apparatus 26 and display control apparatus 30 in the image display apparatus in FIG. 6 for projecting the right- and left-eye images formed on the basis of the detection of the observer position into the 3D observing region by the space division. In the image projection of the space division, two displays 14-1 and 14-2 for the left and right eyes are used as a display 14. Liquid crystal display devices of the transmitting type are used as displays 14-1 and 14-2 for the left and right eyes. Display driving units 72-1 and 72-2 are provided for the display control apparatus 30 in correspondence to the displays 14-1 and 14-2 for the left and right eyes. The image forming apparatus 26 is the same as the case of the time division in FIG. 13 and is constructed by the modeling data storing unit 62 and rendering processing unit 64. On the basis of the observer position information, the right- and left-eye images based on the modeling data are formed by the rendering processing unit 64 and written into the right-eye image frame buffer 66 and left-eye image frame buffer 68 of the display control apparatus 30. As an image forming apparatus 26, an apparatus using the camera image data storing unit 73 and interpolation image forming unit 75 in FIG. 15 can be also used.

Figure 44:
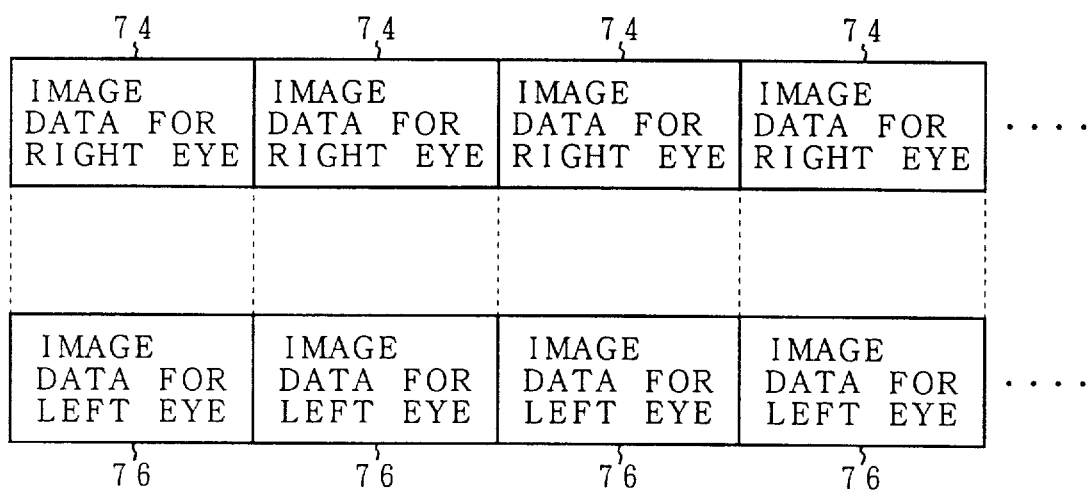
FIG. 44 is an explanatory diagram of a transfer display of image data for the right and left eyes by the space division.

FIG. 44 shows the reading operation of the right- and left-eye image data by the display control apparatus 30 in FIG. 43. The two display driving units 72-1 and 72-2 read out the image data 74 for the right eye and image data 76 for the left eye in parallel from the corresponding right-eye image frame buffer 66 and left-eye image frame buffer 68 and simultaneously display the corresponding images on the display 14-2 for the right eye and the display 14-1 for the left eye, respectively.

Figure 45:
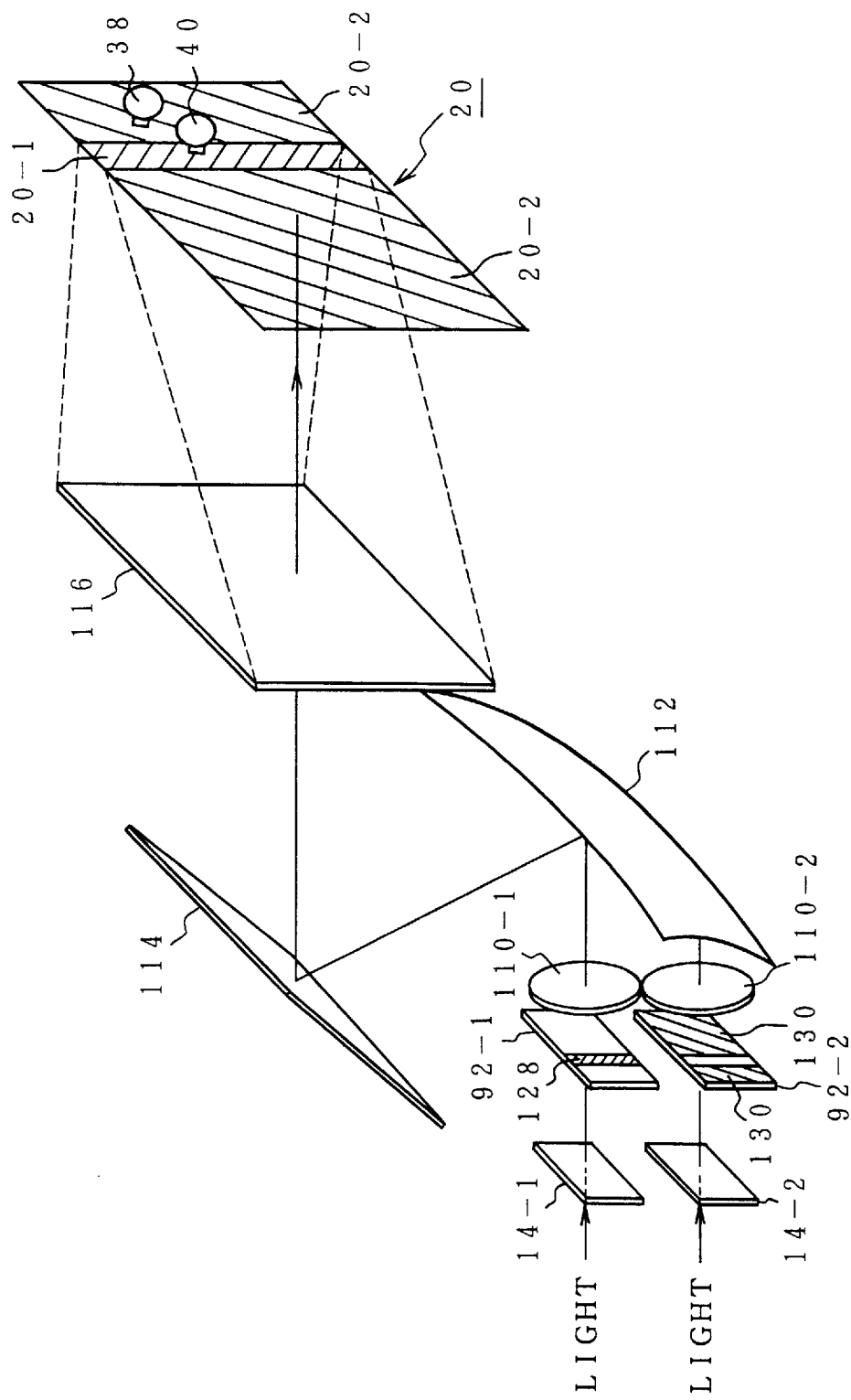
FIG. 45 is an explanatory diagram of the projection optical unit in FIG. 6 by the space division.

FIG. 45 shows an embodiment of a projection optical unit for projecting and displaying right- and left-eye images by the space division. The display 14-1 for the left eye and the display 14-2 for the right eye are individually arranged. In correspondence to the displays 14-1 and 14-2, the matrix liquid crystal shutters 92-1 and 92-2 for setting the aperture and the projection lenses 110-1 and 110-2 are provided. The concave surface mirror 112 and back surface mirror 114 provided subsequent to the projection lenses construct a common optical system. The convex Fresnel lens 116 having an image forming function is installed in the 3D observing region 20 at the screen position. On the other hand, although the light source unit side is not shown, in a manner similar to the embodiment of the space division in FIG. 21, the light source 98, reflector 100, lens 102, and Fresnel lens 104 are provided, a half mirror is used in place of the mirror 106, the reflection light of the half mirror is inputted to the display 14-2 for the right eye, the light transmitted through the half mirror is further reflected by the mirror, and the reflected light is inputted to the display 14-1 for the left eye. In such a projection optical unit by the space division, the right- and left-eye images corresponding in parallel to the displays 14-2 and 14-1 for the right and left eyes are displayed, and the apertures 130 and 128 are set into the matrix liquid crystal shutters 92-2 and 92-1 synchronously with the display of the right- and left-eye images, respectively. The aperture setting in this case is executed in a manner similar to the case of the space division in FIGS. 30 and 31. Namely, the slit-shaped aperture 128 of a small width corresponding to the detecting position of the left eye 40 of the observer existing in the 3D observing region 20 is set into the matrix liquid crystal shutter 92-2 corresponding to the display 14-2 for the right eye. The slit image 118 is formed in the 3D observing region 20 and forms the left-eye observing region 20-1. At the same time, the aperture 130 in which the whole region excluding the aperture 128 set in the matrix liquid crystal shutter 92-1 for the left eye is set into the transparent state is set into the matrix liquid crystal shutter 92-2 corresponding to the display 14-2 for the right eye. Therefore, the slit image 120 of the aperture 130 is formed in the 3D observing region 20 excluding the left-eye observing region 20-1 and forms the right-eye observing region 20-2.

Figure 46:
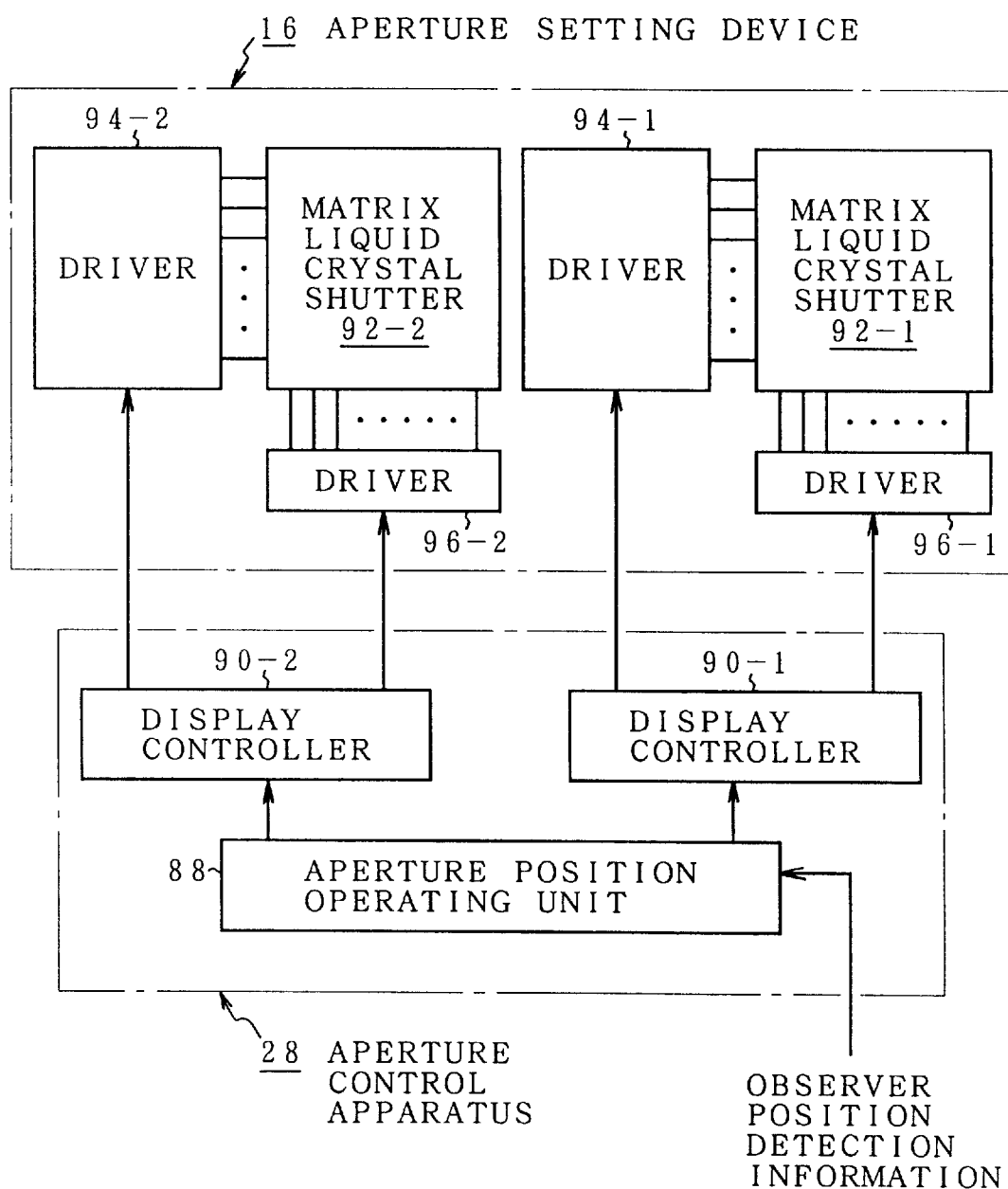
FIG. 46 is a block diagram of the aperture control apparatus and the aperture setting device by the space division.

FIG. 46 is a block diagram of the matrix liquid crystal shutters 92-1 and 92-2 and an aperture control apparatus provided for the projection optical unit of the space division in FIG. 45. As an aperture setting device 16, two matrix liquid crystal shutters 92-1 and 92-2 and their drivers 94-1, 94-2, 96-1, and 96-2 are provided. Display controllers 90-1 and 90-2 are provided for the aperture control apparatus 28 in correspondence to the two matrix liquid crystal shutters 92-1 and 92-2 and execute an aperture setting control in parallel. The aperture position operating unit 88 is the same as that in case of the time division in FIG. 20 and operates the aperture positions for the right and left eyes on the basis of the observer position detection information and instructs to the display controller 90.

Figure 47:
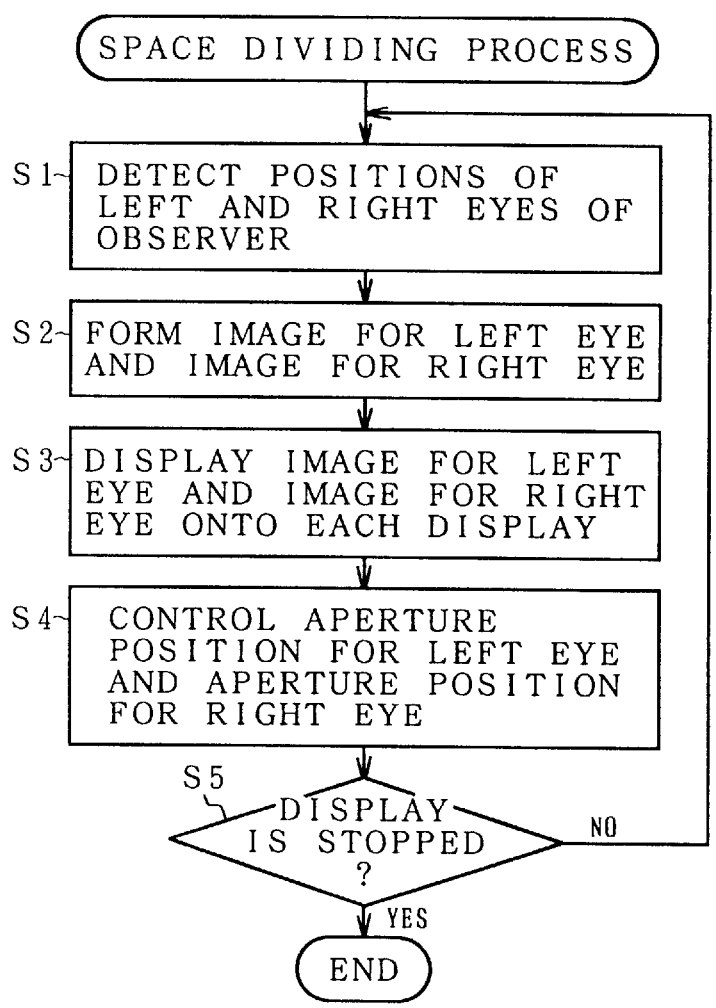
FIG. 47 is a flowchart for a display control and an aperture control by the space division.

FIG. 47 is a flowchart for the projection aperture control in the projection optical unit by the space division in FIG. 45. First in step S1, the positions of the right and left eyes of the observer are detected. In step S2, the images for the right and left eyes are formed. In step S3, the images for the right and left eyes are displayed in parallel on the displays provided separately. At the same time, in step S4, the aperture positions for the left and right eyes are set into the matrix liquid crystal shutters 92-1 and 92-2 provided as aperture setting devices for the left and right eyes, respectively. The above processes in steps S1 to S4 are repeated until the display is stopped in step S5. In FIG. 45, although the aperture setting operation in FIGS. 30 and 31 in the time division has been shown as an example, the aperture setting operation in FIGS. 21 and 22 or the aperture setting in FIGS. 27 and 28 can be also performed as other aperture setting operations.

FIG. 48 shows an embodiment for a control in the depth direction of the aperture in the space-division projection optical unit. In the embodiment, subsequent to the display 14-1 for the left eye and the display 14-2 for the right eye, stacked shutters 134-1 and 134-2 in which a plurality of matrix liquid crystal shutters 92-1 and 92-2 in FIG. 42 are stacked in the optical axial direction are set. In correspondence to the matrix liquid crystal shutters of the stacked shutters 134-1 and 134-2, slit image forming surfaces 132-1 to 132-n of the number as many as the number of shutters are formed in the front/rear direction in the 3D observing region 20 in front of the convex Fresnel lens 116 serving as a screen position. Therefore, by selecting the corresponding matrix liquid crystal shutters in the stacked shutters 134-1 and 134-2 and setting the apertures on the basis of the detecting position in the front/rear direction of the observer position in the 3D observing region 20, the slit image forming surface is formed at the position in the depth direction corresponding to the detecting position in the 3D observing direction. An image light by the formation of the slit image to observe the images for the right and left eyes can be projected. Further, as an embodiment of the aperture control in the front/rear direction in the space division, as a construction other than the stacked shutters in FIG. 48, a construction such that a focal distance is changed by the movement in the optical axial direction of the movable lens 182 provided in the projection lens unit 15 which is time-divisionally shown in FIG. 35 or a construction such that the matrix liquid crystal shutter shown in FIG. 41 is obliquely arranged in the front/rear direction of the optical axis and the vertical diffusion plate 140 is provided for the convex Fresnel lens 116 serving as a screen position.

[Projection aperture control by polarization division]

FIG. 49 shows an embodiment of the projection optical unit in FIG. 2 in which the projection of the right- and left-eye images to the 3D observing region and the aperture setting are realized by a polarization division. In the polarization division, the display 14-1 for the left eye and the display 14-2 for the right eye are separately provided as displays. Therefore, the same display control apparatus as that of the space division in FIG. 43 can be used as a display control apparatus. On the light source side, the light by the light source 98 and reflector 100 is converged by the lens 102 and, after that, it is converted into the parallel light by the Fresnel lens 104. Subsequently, the parallel light is separated into a P polarization component serving as a transmission light and an S polarization component serving as a reflected light by a polarization beam splitter (PBS) 144 for a beam. The S polarization component reflected by the PBS 144 for separation is reflected by a mirror 146 and enters the display 14-1 for the left eye. On the other hand, the P polarization component transmitted through the PBS 144 for separation is reflected by a mirror 148 and, after that, it enters the display 14-2 for the right eye. The S polarization component as a video image light which passed through the display 14-1 for the left eye and the P polarization component which passed through the display 14-2 for the right eye and becomes a video image light are transferred to a polarization beam splitter 150 for synthesis. The synthesizing PBS 150 synthesizes the S and P polarization components and, after that, supplies the synthesized component to a matrix π cell 152 which functions as an aperture setting device in the polarization division. Subsequent to the matrix π cell 152, the projecting lens 110 is provided. A subsequent optical system is constructed by the concave surface mirror 112, back surface mirror 114, and convex Fresnel lens 116 having the image forming function in the 3D observing region 20 in a manner similar to the cases of the time division and the space division.

Figure 51A:
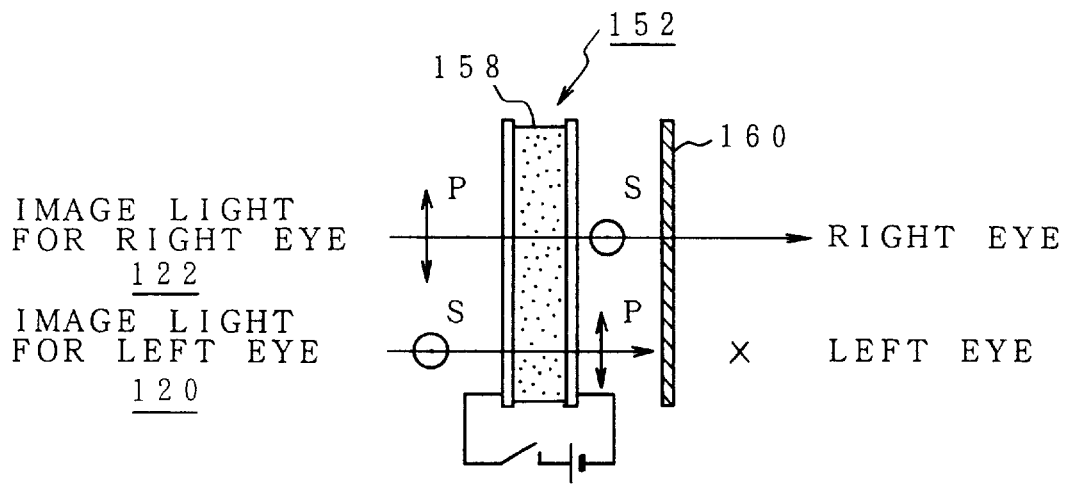
FIGS. 51A and 51B are explanatory diagrams of a structure of the aperture setting device in FIG. 50 and the aperture setting.
Figure 51B:
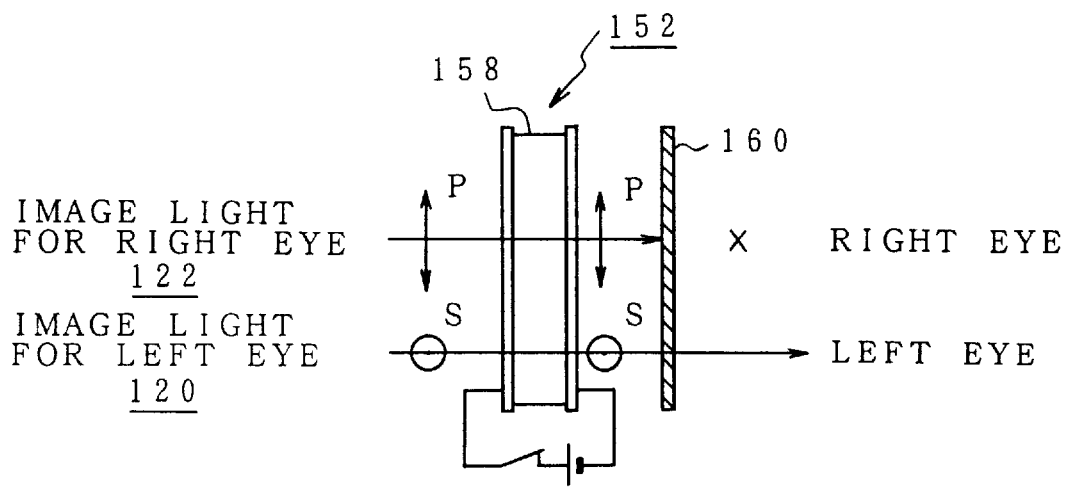

FIG. 50 shows the portions of the display 14-1 for the left eye, display 14-2 for the right eye, synthesizing PBS 150, and matrix π cell 152 in FIG. 49. The matrix π cell 152 which functions as an aperture setting device is constructed by a TN liquid crystal 158 and a polarization plate 160 as shown in FIG. 51A. The TN liquid crystal 158 forms a rotating and non-rotating states of a plane of polarization of the incident light by electrolyte on/off operations by applying a driving voltage to an interval between electrodes in which liquid crystal is laminated. That is, FIG. 51A shows an electrolyte off state in which the driving voltage between the electrodes of the TN liquid crystal 158 is turned off. In this electrolyte off state, when the P polarization component serving as a right-eye image light 122 passes through the TN liquid crystal 158, the plane of polarization is rotated by 90°, so that the P polarization component is converted to the S polarization component. On the other hand, the plane of polarization of the S polarization component serving as a left-eye image light 120 is also rotated by 90°, so that the S polarization component is converted to the P polarization component. The polarization plate 160 has polarizing characteristics such that only the S polarization component is transmitted and the P polarization component is shut off. Therefore, Only the S polarization component generated from the TN liquid crystal 158, namely, only the right-eye image light 122 passes through the polarization plate 160 and is projected to the right eye 38 side. Therefore, in the matrix π cell 152 in FIG. 50, it is sufficient to set an electrolyte off region 154 in which the electrolyte of the TN liquid crystal 158 is turned off with respect to the region where the aperture for the right eye has been set. On the other hand, in the electrolyte on state in which the driving voltage has been applied to the interval between the electrodes of the TN liquid crystal 158, a state as shown in FIG. 51B is obtained. In the electrolyte on state in which the driving voltage has been applied between the electrodes of the TN liquid crystal 158, the rotating function of the plane of polarization by the TN liquid crystal 158 is eliminated and a transparent state is obtained. The P polarization component as a right-eye image light 122 and the S polarization component as a left-eye image light 120 also pass through the TN liquid crystal 158 as they are. In this instance, since the polarization plate 160 has transmitting characteristics of only the S polarization component, the S component serving as a left-eye image light 120 is generated and projected to the left eye 40. Therefore, in the matrix π cell 152 in FIG. 50, it is sufficient to set the electrolyte on region 156 with respect to a region where it is intended to set an aperture for the left eye. By setting the electrolyte on region 156 corresponding to the aperture for the left eye in the matrix π cell 152 and the electrolyte off region 154 corresponding to the aperture for the right eye, as shown in FIG. 49, the left-eye observing region 20-1 and right-eye observing region 20-2 are set into the 3D observing region 20 in front of the convex Fresnel lens 116 serving as a screen position. By projecting the right- and left-eye images to those regions, the observer can observe a stereoscopic image by the parallax of both eyes. As for the observers other than the observer as a position detection target, in case of the embodiment, since the object is observed from the right-eye observing region 20-2, the right-eye image by the display 14-2 for the right eye can be clearly observed as a two-dimensional image.

FIG. 52 is a flowchart for a projection control and an aperture control by the polarization division in FIG. 49. First in step S1, the positions of the right and left eyes of the observer are detected. In step S2, the images for the right eye and left eye are formed. Subsequently, in step S3, the images for the left and right eyes are displayed on the displays 14-1 and 14-2, respectively. Further in step S4, the electrolyte on/off region to decide the presence or absence of the polarization rotation is controlled in accordance with the aperture positions for the right and left eyes. The projection and aperture control by the polarization division in steps S1 to S4 as mentioned above are repeated until the display is stopped in step S5. As for the aperture setting of the matrix π cell 152 by the polarization division in FIG. 49, although the same aperture setting operation as that in FIGS. 30 and 31 by the time division has been shown as an example, as another aperture setting, it is also obviously possible to perform the aperture setting in FIGS. 21 and 22 or the aperture setting in FIGS. 27 and 28.

FIG. 53 shows an embodiment of a projection optical unit for performing a control in the front/rear direction of the aperture in the polarization division. In the embodiment, a stacked matrix π cell 161 is provided subsequent to the polarization beam splitter 150 for synthesis. The stacked matrix π cell 161 is formed by laminating a plurality of matrix π cells 152 each of which was used in FIG. 49 in the optical axial direction. With the stacked matrix π cell 161 as mentioned above, a plurality of slit image forming regions 162-1 to 162-n are formed in the 3D observing region 20 in front of the convex Fresnel lens 116 serving as a screen position so as to be arranged in parallel in the front/rear direction along the optical axis. Therefore, the corresponding matrix π cell in the stacked matrix π cell 161 is selected in correspondence to the detecting position in the front/rear direction of the observer in the 3D observing region 20. The apertures for the right and left eyes are set by the setting of the electrolyte off region 154 and electrolyte on region 156 as shown in FIG. 50. Thus, a slit image of the matrix π cell is formed at the slit image forming position just before the detecting position of the observer in the 3D observing region 20, thereby enabling a stereoscopic observation by the observer to be performed.

Figure 54:
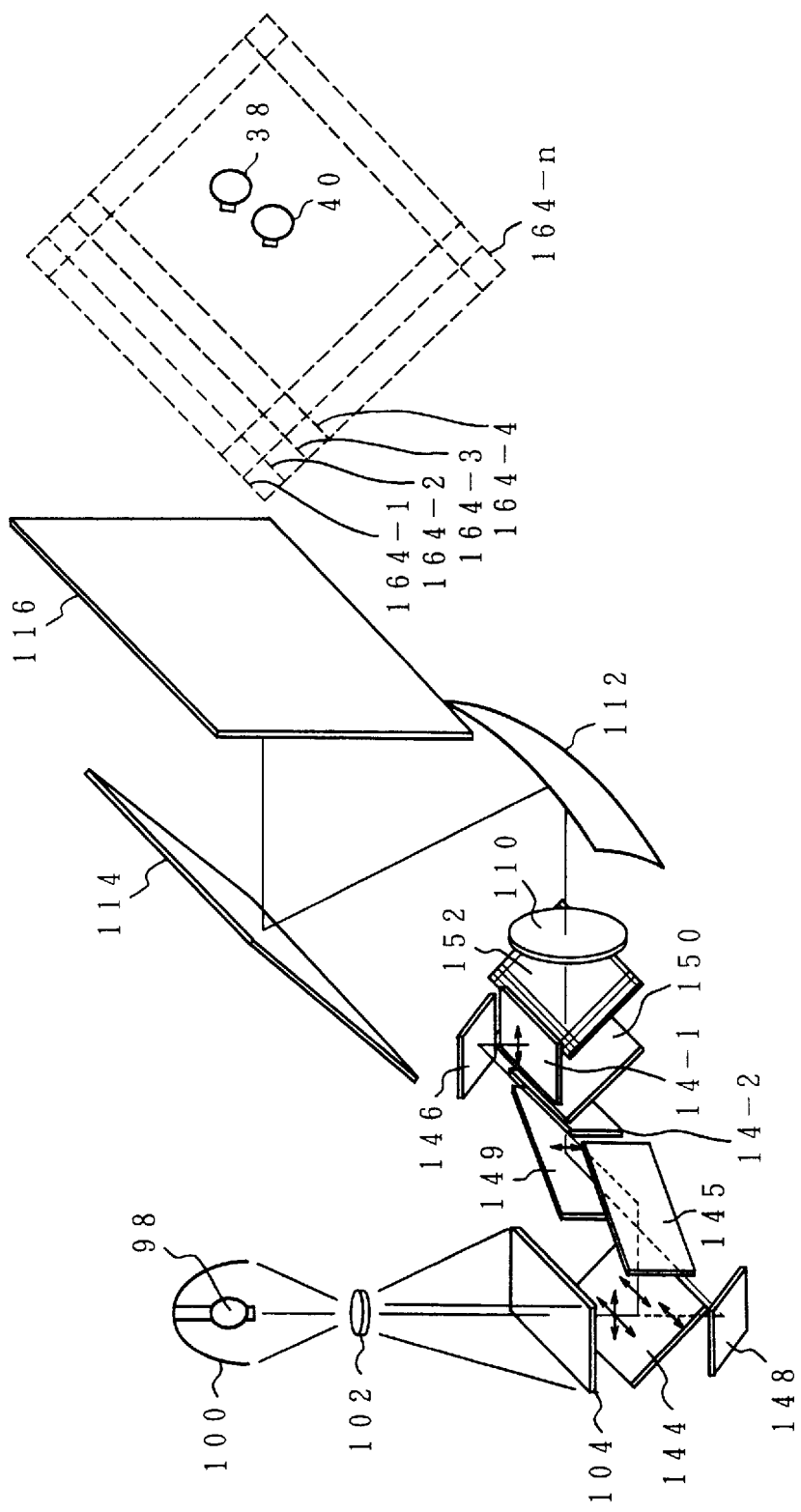
FIG. 54 is an explanatory diagram of the projection optical unit in FIG. 6 in which the aperture position is controlled in the front and rear direction by obliquely arranging the aperture setting device.
Figure 55:
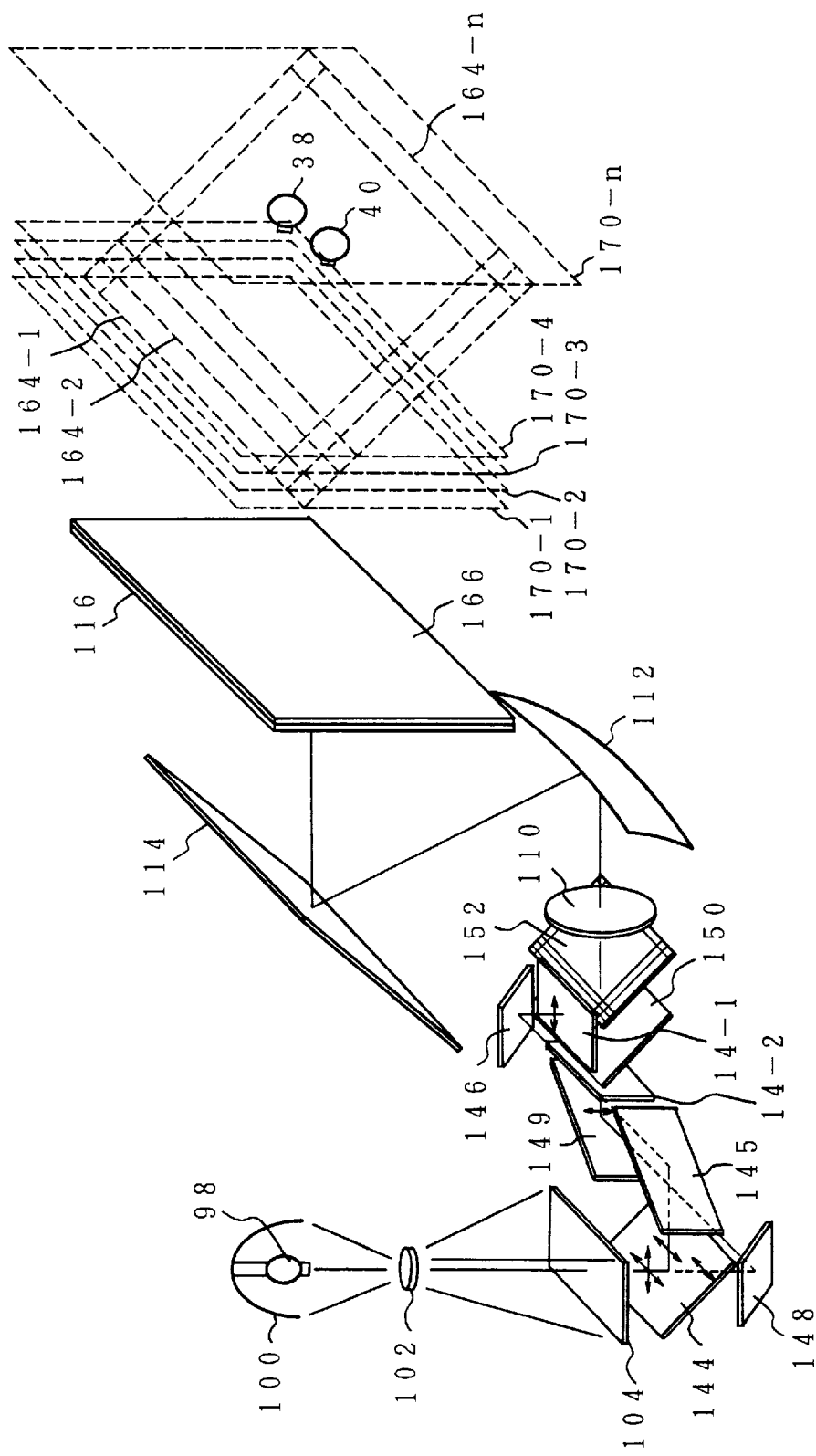
FIG. 55 is an explanatory diagram of a projection optical unit in which a vertical diffusion plate is arranged for a convex Fresnel lens in FIG. 54.

FIG. 54 shows another embodiment of a control in the front/rear direction of an aperture in the projection optical unit of the polarization division and is characterized in that the matrix π cell is obliquely arranged in the front/rear direction for the optical axis. Namely, subsequent to the PBS 150 for synthesis, the matrix π cell 152 is obliquely arranged in the front/rear direction for the optical axis. The matrix π cell 152 obliquely arranged sets apertures at different positions in the optical axial direction by a plurality of horizontal stripe apertures in a manner similar to the case of the matrix liquid crystal shutter in FIG. 38 in the space division. Therefore, horizontal stripe slit images 164-1 to 164-n corresponding to the horizontal stripe apertures of the matrix π cell 152 arranged obliquely are formed in the 3D observing region 20 in front of the convex Fresnel lens 116 serving as a screen position. In this case, a width in the vertical direction of each of the horizontal stripe slit images 164-1 to 164-n is extremely narrow. When the eyes of the observer are out of the narrow width, the observer cannot observe a stereoscopic image. To prevent such a situation, as shown in FIG. 55, a vertical diffusion plate 166 is provided for the convex Fresnel lens 116, thereby forming vertical enlarging regions 170-1 to 170-n in which the horizontal stripe slit images 164-1 to 164-n are enlarged in the vertical direction. As a control other than the control in the front/rear direction of the aperture by the polarization division, it will be obviously understood that the focal distance can be also changed by moving the projecting lens in the time division in FIG. 35 in the optical axial direction.

[Projection aperture control for a plurality of observers]

Figure 56:
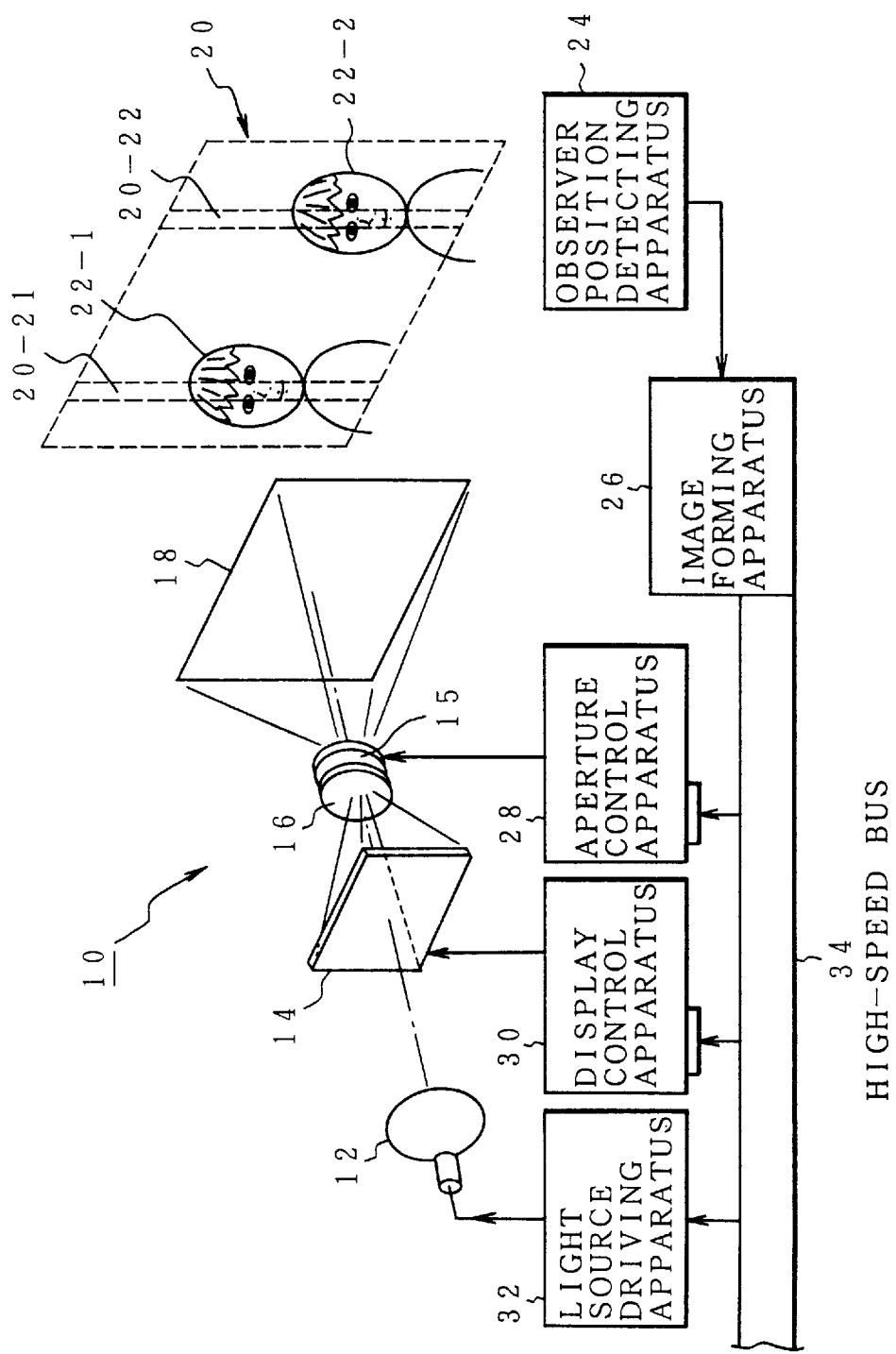
FIG. 56 is an explanatory diagram of a construction of an apparatus of the invention in which a stereoscopic image can be observed by a plurality of observers.

FIG. 56 shows another embodiment of an image display apparatus of the invention and is characterized in that positions of a plurality of observers existing in the 3D observing region are detected, thereby enabling each observer to individually perform a stereoscopic observation.

In FIG. 56, an apparatus construction of the image display apparatus 10 of the invention which enables a plurality of observers to perform a stereoscopic observation is fundamentally the same as that of the embodiment of FIG. 6 and is characterized in that the observer position detecting apparatus 24 can detect a plurality of observers existing, for example, two observers 22-1 and 22-2 existing in the 3D observing region 20, respectively. The image forming apparatus 26 forms images in accordance with the following mode on the basis of the detection information of, for example, two observers 22-1 and 22-2 by the observer position detecting apparatus 24.

Mode 1: A right-eye image and a left-eye image when they are seen by setting the right and left eyes of a specific one of the plurality of observers 22-1 and 22-2, for example, the observer 22-1 to observing point positions are formed.

Mode 2: A right-eye image and a left-eye image when they are seen by setting the right and left eyes of each of the observers 22-1 and 22-2 to observing point positions are formed.

In mode 1, therefore, since the right- and left-eye images corresponding to the detecting position of one observer are formed, it is sufficient to display the images onto the display 14 by the same image formation and display control apparatus 30 as those in the case for one observer as a target in the embodiments which have already been described. On the other hand, in case of forming the right- and left-eye images for each of the observers 22-1 and 22-2 in mode 2, for example, in the time division, since it is necessary to display the right- and left-eye images of two persons by using the single display 14, it is necessary to switch and display at a high speed at a display period that is obtained by multiplying a reciprocal number of the number (N) of observers as display targets to the display period such as (1/120) second corresponding to one person, namely, in case of two observers, at a period of (1/240) second. On the other hand, with respect to the aperture control by the aperture control apparatus 28 for the aperture setting device 16, the aperture setting corresponding to the positions of the right eye and left eye of each of the two observers 22-1 and 22-2 is carried out. In the 3D observing region 20 shown in the diagram, a state in which right-eye observing regions 20-21 and 20-22 of the observers 22-1 and 22-2 are set. In correspondence to it, the apertures for two right eyes are set in the aperture setting device 16.

Figure 57:
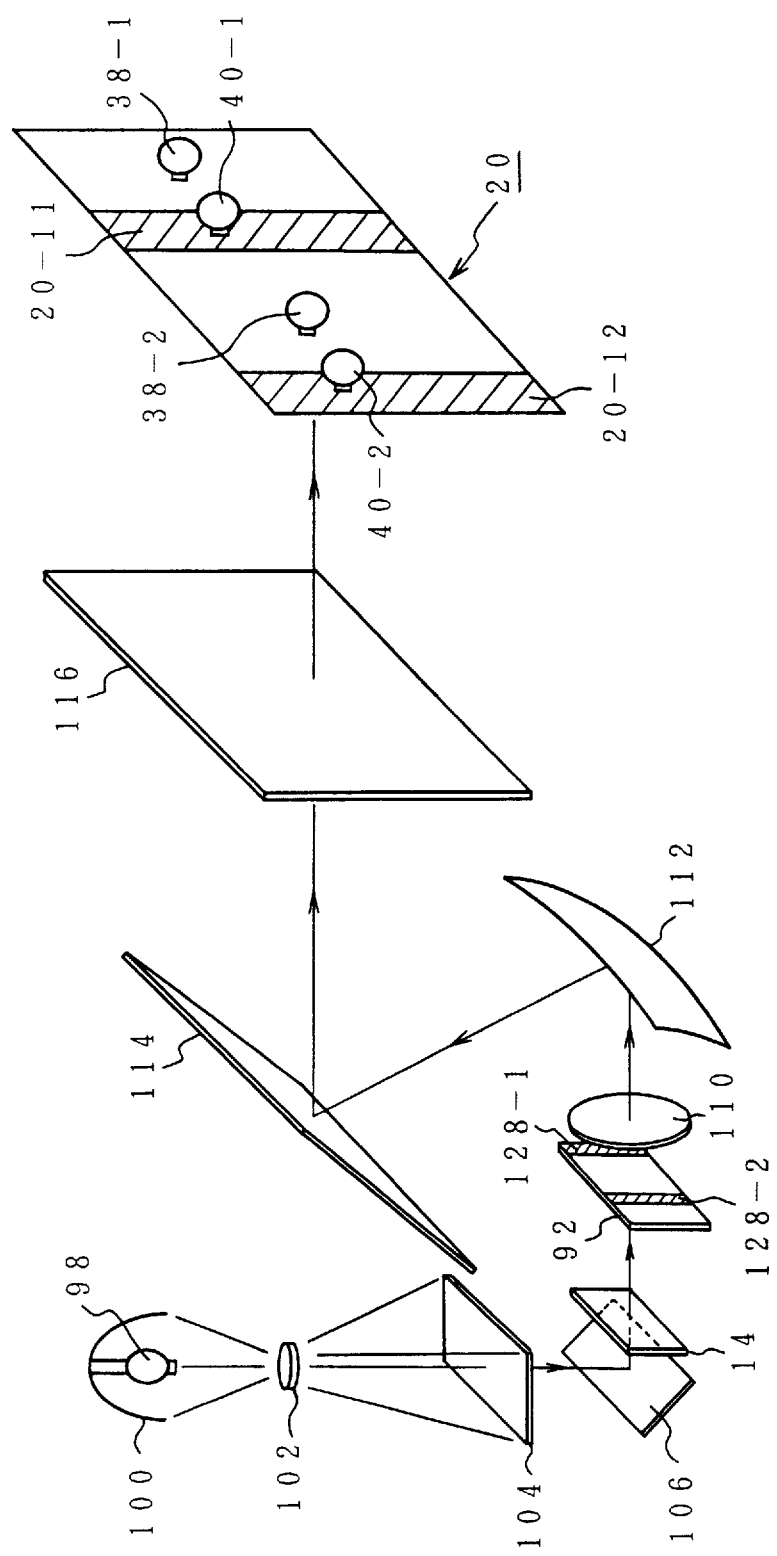
FIG. 57 is an explanatory diagram of the projection optical unit in FIG. 55 in a left-eye image projecting state by a plurality of observers.
Figure 58:
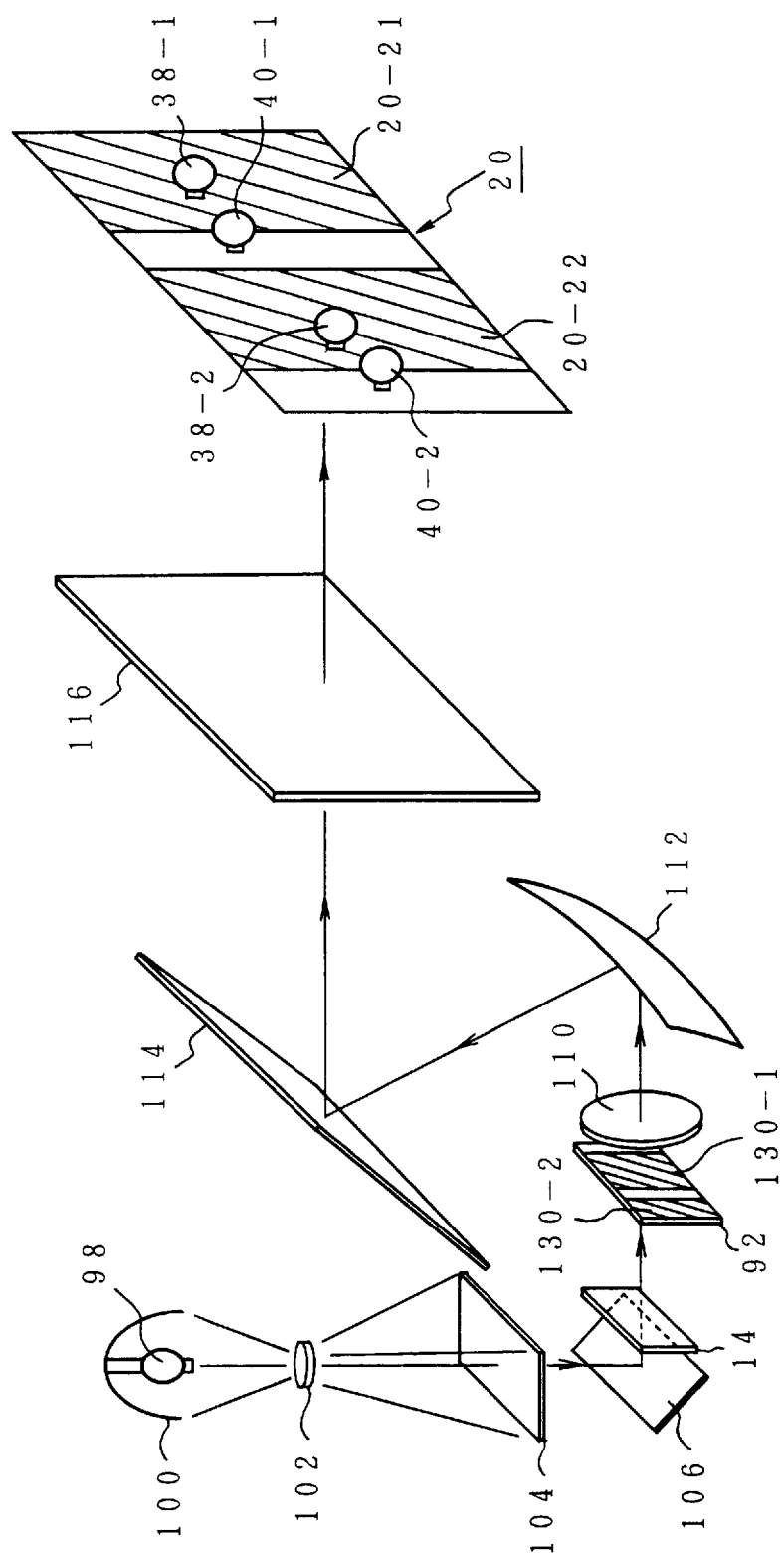
FIG. 58 is an explanatory diagram of the projection optical unit in FIG. 55 in a right-eye image projecting state by a plurality of observers.

FIG. 57 shows an embodiment of a projection optical unit of an apparatus for a plurality of observers in FIG. 56 as targets with respect to the time division as an example. In FIG. 57, apertures 128-1 and 128-2 corresponding to the detecting positions of left eyes 40-1 and 40-2 of two observers existing in the 3D observing region 20 are set into the matrix liquid crystal shutter 92. Thus, slit images of left-eye observing regions 20-11 and 20-12 are formed in the 3D observing region 20, respectively. Two observers can observe the left-eye image displayed on the same display 14 by the left eyes 40-1 and 40-2. FIG. 58 shows a state in which the operating mode is switched to the display and aperture setting of the right-eye image. The apertures 130-1 and 130-2 corresponding to the detecting positions of right eyes 38-1 and 38-2 of two observers existing in the 3D observing region 20 are set into the matrix liquid crystal shutter 92. Therefore, the right-eye observing regions 20-21 and 20-22 for the observers are formed in the 3D observing region 20, respectively. Two observers can observe the right-eye image on the display 14 by the right eyes 38-1 and 38-2. In the time division, since the displays of FIGS. 57 and 58 are alternately switched, two observers simultaneously see different parallax images by the right and left eyes, so that a solid can be observed. In this instance, in the display control of the display 14 in mode 1, two observers observe the same stereoscopic image. In mode 2, on the other hand, the right- and left-eye images are individually formed in correspondence to each position of the observers. For example, when there are two observers as shown in FIG. 56, the right- and left-eye images of the observer 22-1 are first displayed. Synchronously with it, the apertures for the right and left eyes are set into the matrix liquid crystal shutter 92. The projection and display for stereoscopic observation are performed for the observer 22-1. Subsequently, the right- and left-eye images formed from the detecting position of the next observer 22-2 are sequentially displayed onto the display 14. Synchronously with it, the apertures corresponding to the right- and left-eye positions of the observer 22-2 are sequentially set, thereby allowing a stereoscopic image to be observed by the observer 22-2. Therefore, in the projection display and aperture control in mode 2, even in case of the same display video image, the observers 22-1 and 22-2 can observe a stereoscopic image of the observing manner corresponding to each position.

As a projection optical unit of the apparatus for a plurality of observers as targets in FIG. 56, projection optical units other than the units by the time division in FIGS. 57 and 58, that is, all of the units by the space division and the polarization division can be used as they are in a manner similar to the embodiment of the projection optical unit for the single observer as a target in FIG. 6. Further, proper modifications of the present invention are possible without departing from the spirit and scope of the appended claims of the invention. In addition, the invention is not limited by the numerical values disclosed in the embodiments.

What is claimed is:

1. An image display apparatus for recognizing a stereoscopic image by a parallax of both eyes, comprising:

a position detecting unit for detecting a position of an observer existing in a stereoscopic observing region;

an image forming unit for forming a right-eye image and a left-eye image seen from the detecting position of said observer;

a display for displaying the right-eye image and a left-eye image formed by said image forming apparatus;

a projection optical unit for projecting the display images of said display to the detecting position of said observer by setting an aperture position; and an aperture control unit for controlling a position and a size of the aperture of said projection optical unit on the basis of the detecting position of said observer in a manner such that at least said right-eye image is projected to a position including a right eye of said observer and said left-eye image is projected to a position including a left eye of said observer, thereby allowing said observer to observe a stereoscopic image.

2. An apparatus according to claim 1, wherein said position detecting unit detects an eyeball position of the observer.

3. An apparatus according to claim 2, wherein said position detecting unit comprises:
two image pickup apparatuses arranged in the horizontal direction at a predetermined interval; and
a position operating unit for calculating the position of said observer from two images photographed by said image pickup apparatuses.

4. An apparatus according to claim 2, wherein said position detecting unit comprises:
a magnet attached to said observer;
two magnetic sensors arranged in the horizontal direction at a predetermined interval; and
a position operating unit for calculating the position of said observer from detection signals of said magnetic sensors.

5. An apparatus according to claim 2, wherein said position detecting unit comprises:
two ultrasonic sensors arranged in the horizontal direction at a predetermined interval; and
a position operating unit for calculating the position of said observer from detection signals of said ultrasonic sensors.

6. An apparatus according to claim 1, wherein said aperture control unit sets each of a right-eye aperture corresponding to the detecting position of the right eye of said observer and a left-eye aperture corresponding to the detecting position of the left eye and projects said right-eye image and said left-eye image to said observer, thereby allowing a stereoscopic image to be observed by parallax images of both eyes.

7. An apparatus according to claim 1, wherein said aperture control unit sets small aperture regions corresponding to the detecting positions of the right and left eyes of said observer as said right-eye aperture and said left-eye aperture.

8. An apparatus according to claim 1, wherein said aperture control unit sets apertures as said right-eye aperture and said left-eye aperture so as to project images to a predetermined range on the basis of an interval between both eyes of the observer obtained statistically.

9. An apparatus according to claim 1, wherein said aperture control unit sets apertures so as to project said right-eye image or said left-eye image to a position different from the detecting position of said observer, thereby allowing a same image to be seen to both eyes of another observer and allowing a two-dimensional image to be observed.

10. An apparatus according to claim 9, wherein said aperture control unit sets each of a right-eye aperture corresponding to the detecting position of the right eye of said observer and a left-eye aperture corresponding to the detecting position of the left eye, allows a stereoscopic image to be observed by a parallax of both eyes, further, widens either one of said right-eye aperture and said left-eye aperture to a position excluding the other aperture, projects the corresponding image, and allows a same image to be seen to both eyes of another observer, thereby allowing a two-dimensional image to be observed.

11. An apparatus according to claim 9, wherein said aperture position control unit sets a right-eye aperture and a left-eye aperture so that a boundary is located at a center of the detecting positions of the right eye and left eye of said observer, projects each of corresponding images, allows the observer at said detecting position to observe a stereoscopic image by parallax images of both eyes, and allows a same image to be seen to both eyes of another observer, thereby allowing a two-dimensional image to be observed.

12. An apparatus according to claim 1, wherein
said display has a single display device for sequentially displaying said right-eye image and said left-eye image,
said projection optical unit has a projection lens for enlargedly projecting the images from said display device,
an aperture setting device, arranged near said projection lens, for setting a position and a size of said aperture, and
a screen which is arranged at a focal position of said projection lens and has an image forming function of an aperture image for said stereoscopic observing region, and
said aperture control unit switches positions of a right-eye aperture and a left-eye aperture of said aperture setting device synchronously with a switching display of said right-eye image and said left-eye image by said display.

13. An apparatus according to claim 12, wherein
said display has a pair of display devices in correspondence to said right-eye image and said left-eye image,
said projection optical unit has a pair of projection lenses for individually enlargedly projecting images from said pair of display devices,
a pair of aperture setting devices, arranged near said pair of projection lenses, for setting a position and a size of said aperture, and
a screen which is arranged at a focal position of said pair of projection lenses and has an image forming function of the aperture image for said stereoscopic observing region, and
said aperture control unit simultaneously sets the positions of said right-eye aperture and said left-eye aperture into said pair of aperture setting devices synchronously with a parallel display of the right-eye image and the left-eye image to said pair of displays.

14. An apparatus according to claim 1, wherein
said display has a pair of display devices in correspondence to said right-eye image and said left-eye image,
said projection optical unit has a polarization beam splitter for separation for separating a light from a light source into two lights having different planes of polarization and allowing said two lights to enter said pair of display devices,
a polarization beam splitter for synthesis for synthesizing the image lights of the different planes of polarization from said pair of display devices,
a projection lens for enlargedly projecting the image light from said polarization beam splitter for synthesis,
an aperture setting device of a polarization control type, arranged near said projection lens, for setting an aperture position where image lights of different planes of polarization are selectively transmitted in dependence on the presence or absence of a rotation of a plane of polarization of an incident light, and
a screen which is arranged at a focal position of said projection lens and has an image forming function of an aperture image for said stereoscopic observing region, and
said aperture control unit executes a polarization control so that an image light corresponding to a position of each of a right-eye aperture and a left-eye aperture of said polarization control device is transmitted synchronously with a parallel display of the right-eye image and the left-eye image for said pair of display devices.

15. An apparatus according to claim 12, wherein said aperture setting device is a liquid crystal device for arbitrarily setting a transmitting position by a voltage control of liquid crystal segments which were segmented.

16. An apparatus according to claim 14, wherein said aperture setting device of said polarization control type has:
   a liquid crystal device for controlling a rotation of a plane of polarization of an incident light by the presence or absence of an application of a driving voltage to liquid crystal segments which were segmented; and
   a polarization plate for transmitting only the image light having a specific plane of polarization outputted from said liquid crystal device.

17. An apparatus according to claim 1, wherein said projection optical unit has an imaginary image forming member for enlarging an aperture of said projection lens.

18. An apparatus according to claim 12, wherein said aperture control unit controls said aperture position to the right and left by changing a transmitting position of said aperture setting device in the horizontal direction.

19. An apparatus according to claim 18, wherein said aperture control unit controls said aperture position in a front/rear direction by moving and controlling said projection lens in an optical axial direction.

20. An apparatus according to claim 18, wherein said aperture control unit controls said aperture position in a front/rear direction by changing a focal distance of said projection lens.

21. An apparatus according to claim 18, wherein a plurality of said aperture setting devices are stacked in an optical axial direction, and said aperture control unit controls a transmitting positions in a stacking direction of said plurality of aperture setting devices, thereby controlling said aperture position in a front/rear direction.

22. An apparatus according to claim 12, wherein
   said aperture setting device is obliquely arranged in a front/rear direction for an optical axis, a diffusion plate to diffuse the light in the vertical direction is provided for said screen, and
   said aperture control unit controls said aperture position to the right and left by a change in transmitting position in the lateral direction of said aperture setting device and also controls said aperture position to the front and rear by a change in transmitting position in the oblique vertical direction of said aperture setting device.

23. An apparatus according to claim 1, wherein said image forming unit forms two-dimensional image data of the right-eye image and the left-eye image which are seen from the detecting position of said observer on the basis of three-dimensional image data obtained by modeling.

24. An apparatus according to claim 1, wherein said image forming unit forms a two-dimensional image data of the right-eye image and the left-eye image which are seen from the detecting position of said observer by an interpolation of two-dimensional image data obtained by seeing an object from different positions in the horizontal direction.

25. An apparatus according to claim 1, wherein
   said position detecting unit detects a plurality of observers,
   said image forming unit forms the right-eye image and the left-eye image which are seen from each of said plurality of observers,
   said display sequentially displays the right-eye image and the left-eye image formed for each of said plurality of observers, and
   said aperture control unit controls a position and a size of the aperture of said projection optical unit on the basis of the detecting positions of said plurality of observers in a manner such that the right-eye image of each observer is projected to a position including the right eye and said left-eye image is projected to a position including the left eye, thereby allowing said plurality of observers to observe a peculiar stereoscopic image seen from each position.

26. An apparatus according to claim 1, wherein
   said position detecting unit detects a plurality of observers,
   said image forming unit forms a right-eye image and a left-eye image seen by any one of said plurality of observers,
   said display displays said right-eye image and said left-eye image, and
   said aperture control unit controls a position and a size of the aperture of said projection optical system on the basis of the detecting positions of said plurality of observers in a manner such that said right-eye image is projected to a position including the right eyes of said plurality of observers and said left-eye image is projected to a position including the left eyes of said plurality of observers, thereby allowing said plurality of observers to observe a same stereoscopic image.

27. An image display method of recognizing a stereoscopic image by a parallax of both eyes, comprising:
   a position detecting step of detecting a position of an observer existing in an observing region;
   an image forming step of forming a right-eye image and a left-eye image seen by the observer at said detecting position;
   an image display step of displaying said right-eye image and said left-eye image;
   a three-dimensional display step of projecting said right-eye image to a position including a right eye of said observer and projecting said left-eye image to a position including a left eye of said observer by controlling a position and a size of an aperture of a projection optical system on the basis of the detecting position of said observer, thereby allowing a stereoscopic image to be observed by the parallax of both eyes; and
   a two-dimensional display step of projecting either one of said right-eye image and said left-eye image to a position different from the detecting position of said observer by setting another aperture different from an aperture position of said projection optical system, thereby allowing a same image to be seen to both eyes of another observer and allowing a two-dimensional image to be observed.

* * * * *